*(12)* United States Patent
Kiso

(10) Patent No.: US 7,826,989 B2
(45) Date of Patent: Nov. 2, 2010

(54) COMPUTER-READABLE MEDIUM STORING ELECTROMAGNETIC FIELD ANALYSIS PROGRAM, AND METHOD OF CAUSING COMPUTER TO PERFORM ELECTROMAGNETIC FIELD ANALYSIS

(75) Inventor: Tatsuroh Kiso, Tenri (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 391 days.

(21) Appl. No.: 11/953,703

(22) Filed: Dec. 10, 2007

(65) Prior Publication Data

US 2009/0055121 A1    Feb. 26, 2009

(30) Foreign Application Priority Data

Dec. 11, 2006  (JP)  .............................. 2006-333132
Jun. 28, 2007  (JP)  .............................. 2007-170895

(51) Int. Cl.
*G06F 17/10*  (2006.01)
*G06F 17/40*  (2006.01)

(52) U.S. Cl. ........................... 702/65; 702/108; 702/66; 703/2; 703/3; 703/4

(58) Field of Classification Search ................. 702/108, 702/65, 64, 57, 66
See application file for complete search history.

(56) References Cited

U.S. PATENT DOCUMENTS 6,662,125 B2 * 12/2003  Namiki ........................ 702/66
6,772,076 B2 * 8/2004  Yamamoto et al. ............ 702/65
2005/0187723 A1 * 8/2005  Yamagajo et al. ............. 702/57
2006/0043968 A1 * 3/2006  Kiso ........................... 324/227

FOREIGN PATENT DOCUMENTS

JP    2004-38774 A    2/2004

OTHER PUBLICATIONS

Toru Uno, Finite Difference Time Domain Method for Electromagnetic Field and Antennas, 1st ed., Corona Publishing Co., LTD., 1998, pp. 141-149, (no translation).

* cited by examiner

*Primary Examiner*—Hal D Wachsman
(74) *Attorney, Agent, or Firm*—Birch, Stewart, Kolasch & Birch, LLP

(57) ABSTRACT

In Internal Analysis Space analysis, assuming that no structural body and the like are placed outside of a conversion surface, an electromagnetic field distribution u0 inside of a conversion surface, on a conversion surface, and close to the outside of the conversion surface is found. In External Analysis Space analysis, on the assumption that there exists a structural body and the like outside of the conversion surface, an entire electromagnetic field distribution u is found. At this time, for the inside of the closed surface, an electric field distribution, where a differential electromagnetic field distribution e between electromagnetic field distribution u0 and electromagnetic field distribution u on the closed surface is a wave source, is found. Also at this time, for the outside of the closed surface, an electromagnetic field distribution, obtained by synthesizing electromagnetic field distribution u0 and electromagnetic field distribution e on the closed surface is found.

9 Claims, 32 Drawing Sheets

FIG.3
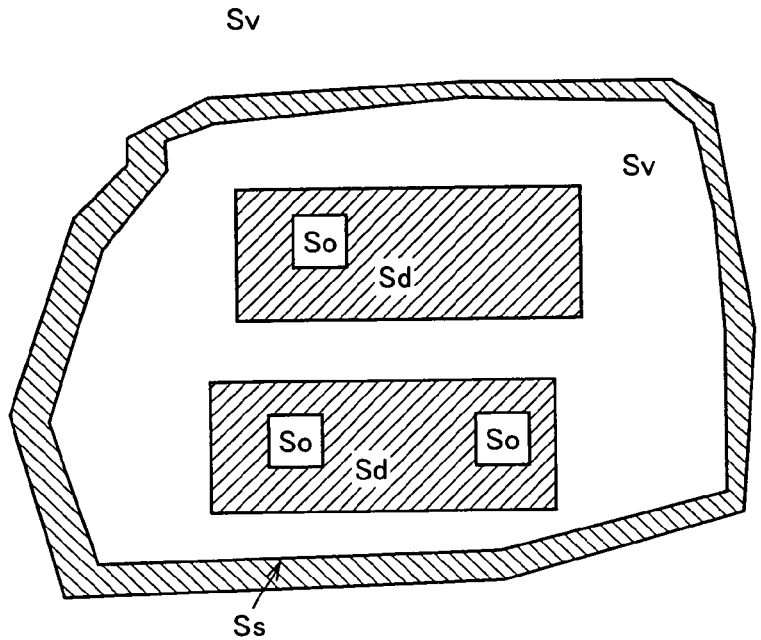
FIG.4 CELL INDEX (i,j,k)
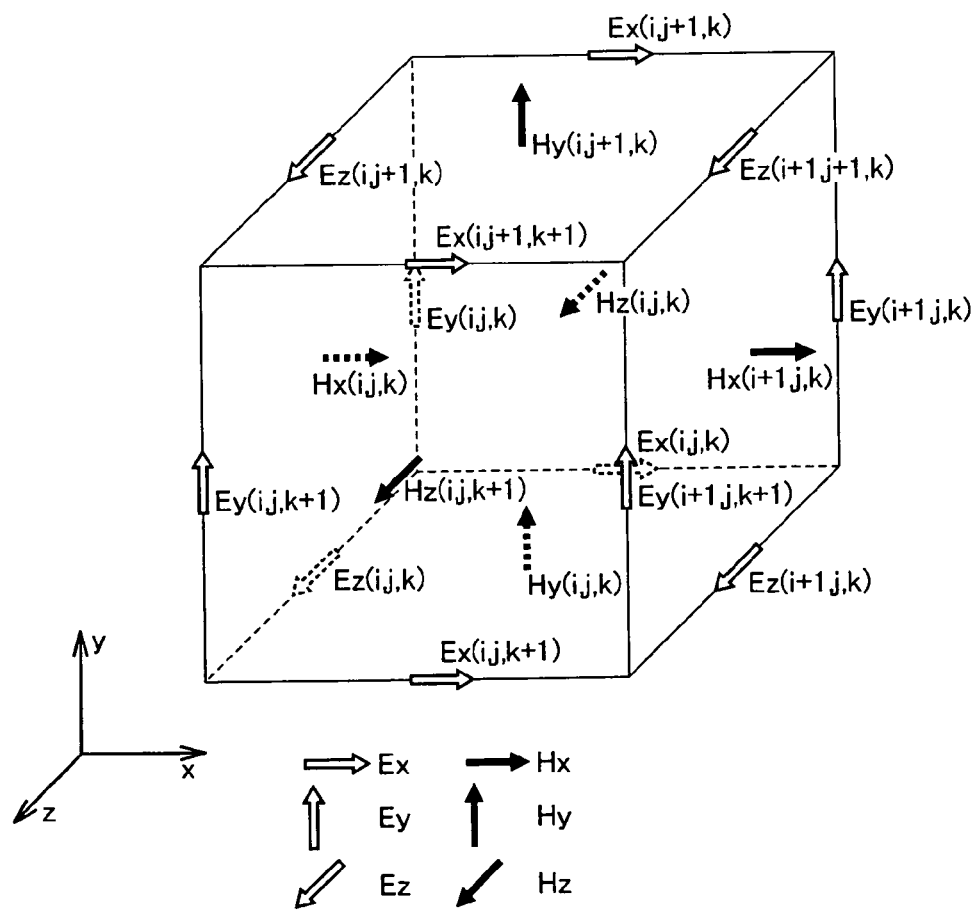

CONVERSION SURFACE INSIDE ELECTRIC FIELD VARIABLE Ey(i,j,k)

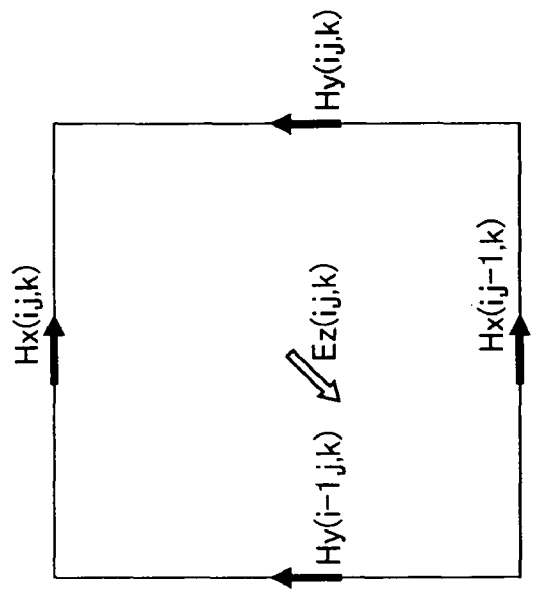
FIG.12C
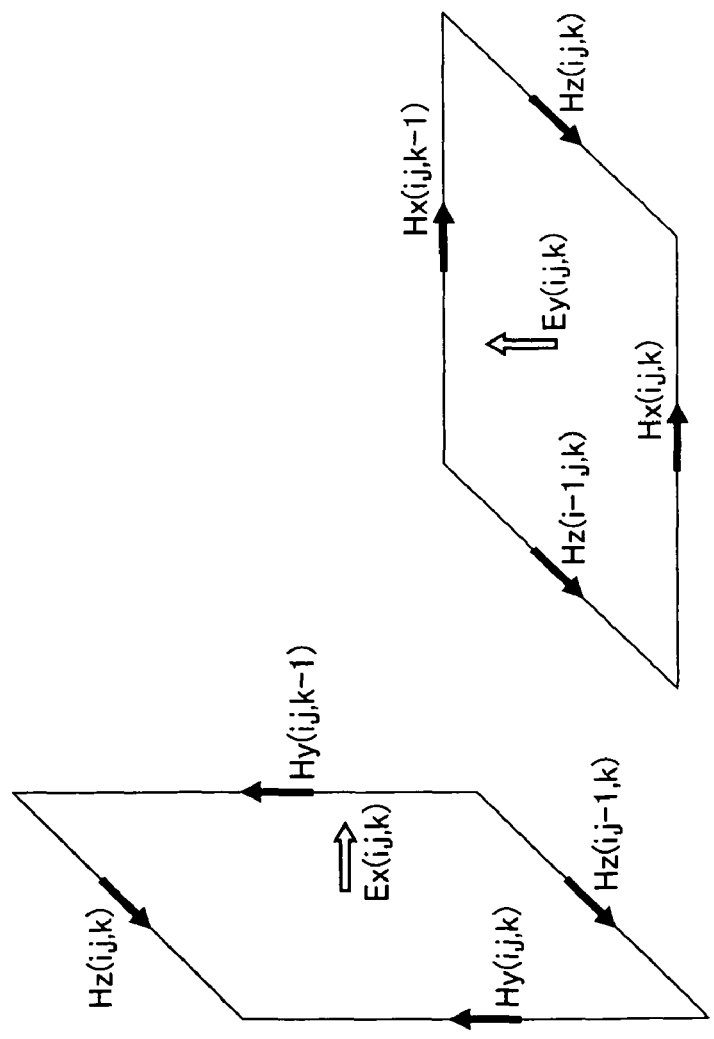
FIG.12B
FIG.12A
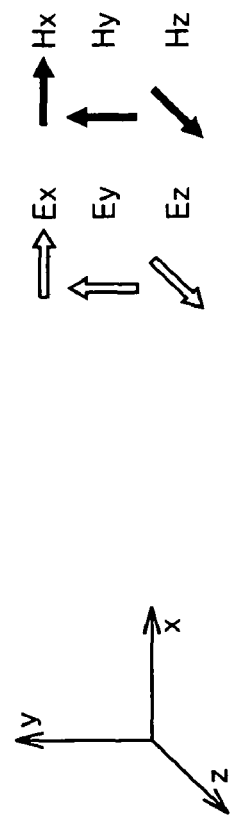

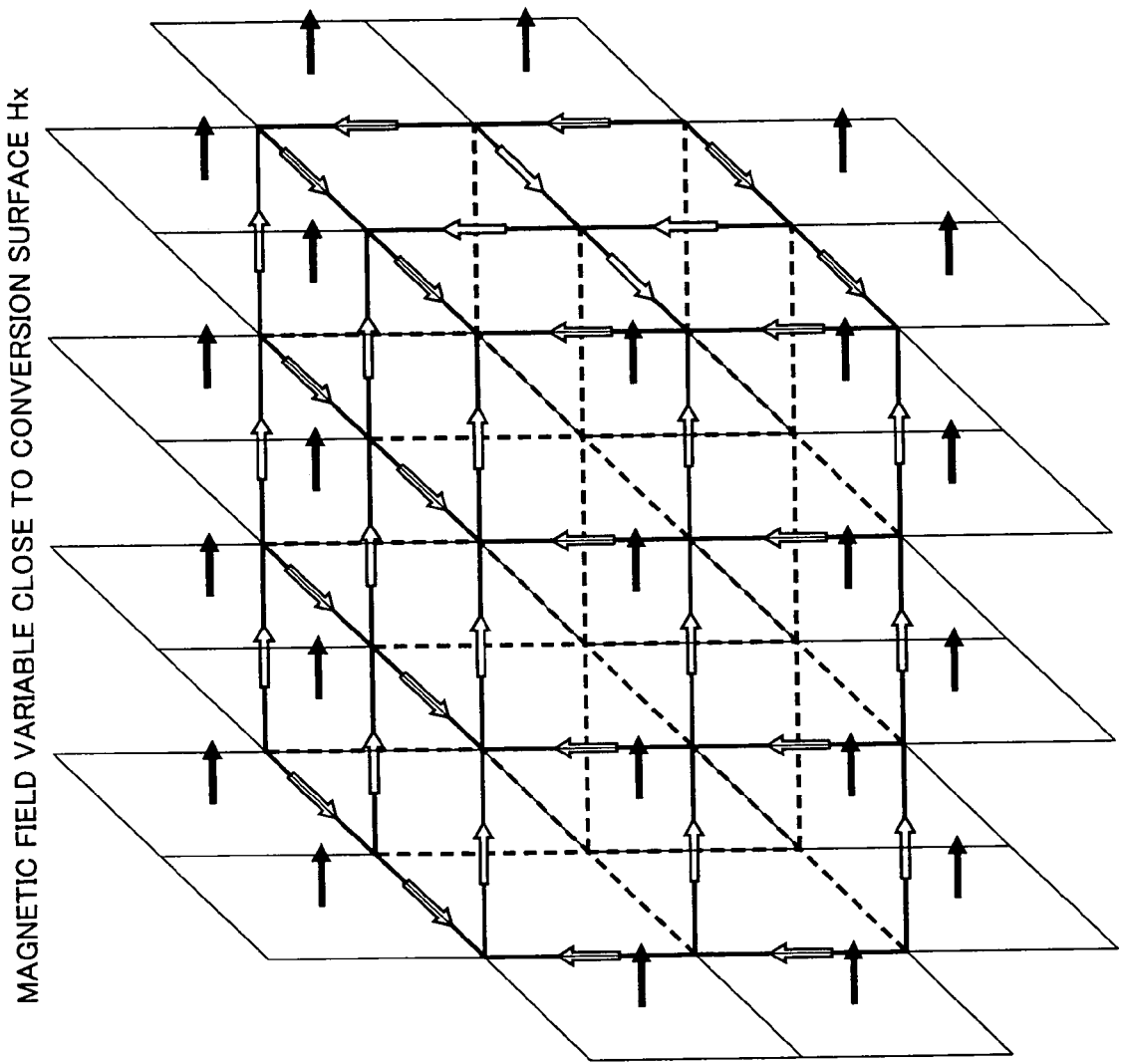
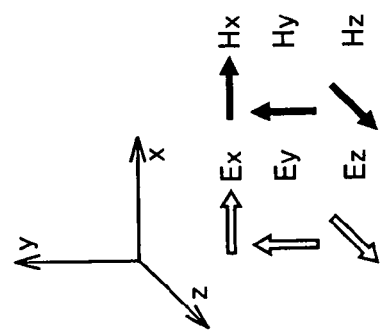
FIG.14

MAGNETIC FIELD VARIABLE CLOSE TO CONVERSION SURFACE Hz

FIG.25 CORRESPONDENCE OF CELLS BETWEEN EAS AND IAS (Ra=3)

TIME CORRESPONDENCE BETWEEN EAS AND IAS (Ra=3)

TIME CORRESPONDENCE OF EAS AND IAS (Ra=2)

ic gain=
COMPUTER-READABLE MEDIUM STORING ELECTROMAGNETIC FIELD ANALYSIS PROGRAM, AND METHOD OF CAUSING COMPUTER TO PERFORM ELECTROMAGNETIC FIELD ANALYSIS This nonprovisional application is based on Japanese Patent Applications Nos. 2006-333132 and 2007-170895 filed with the Japan Patent Office on Dec. 11, 2006 and Jun. 28, 2007, respectively, the entire contents of which are hereby incorporated by reference.

BACKGROUND OF THE INVENTION

1. Field of the Invention

The present invention relates to an electromagnetic field analysis performed by Finite Difference Time Domain method.

2. Description of the Background Art

As a simulation method of an electromagnetic wave radiated from an electronic device, various schemes have been suggested in Document 1 (Toru UNO, *Finite Difference Time Domain Method for Electromagnetic Field and Antennas*, 1st ed., CORONA PUBLISHING CO., LTD., 1998).

For example, one of the schemes of the electromagnetic field analysis is Finite Difference Time Domain method (hereinafter, referred to as FDTD). In the FDTD method, an analysis domain is divided by grid (into cells) to arrange an unknown electromagnetic field in a grid point.

FIG. 36 is a diagram showing a cell structure of the FDTD method. As shown in FIG. 36, in the FDTD method, an analysis is performed with a structure referred to as Yee grid that displaces a grid for arranging an unknown electric field E and a grid for arranging an unknown magnetic field H by half a width of the grids. The FDTD method is an analysis scheme in which a relational expression describing interaction between these unknown electric and magnetic fields and the adjacent unknown electric and magnetic fields is derived by differentiating Maxwell's electromagnetic field analysis equation, based on which the unknown electric and magnetic fields are modified on a certain time-step basis, whereby the entire electromagnetic field behavior is obtained. According to this analysis scheme, the electric field and the magnetic field can be obtained alternately by repeating the procedures of modifying the electric field at a certain time step, modifying the magnetic field after ½ time steps, and modifying the electric field after one time step. However, a step size of the time step needs to satisfy a Courant stability condition with respect to a size of the cell.

Thus, the FDTD method is an analysis method in which by selecting and modeling a cell size in accordance with the fineness of a structure indicating the size of the cell at least necessary for precisely representing a shape of the structure included in an analysis space, and the precision necessary for a required electromagnetic field analysis, the analysis can be applied whatever structure is included inside of the analysis space. However, in the case where an extremely fine structure is included in part of the analysis space as compared with the other parts, if an analysis model is generated using enough small cell to represent the fine structure for all the analysis domain, a differential modifying equation between extremely many electromagnetic field variables will be analyzed using an extremely small time step. This makes calculation resource necessary for the analysis extremely large, and analysis time extremely long.

In contrast, in a sub-grid method introduced in Document 1, the analysis domain is divided, and modeled using different cell sizes. In a boundary section, interpolation is used for connection, and calculation is simultaneously proceeded with while transmitting bi-directional influence to thereby perform the electromagnetic field analysis efficiently. However, since around the boundary section, the analysis becomes unstable, there is a problem in that it is difficult to stably perform the analysis for a long time.

Consequently, in an FDTD-MAS (Finite Difference Time Domain with Multiple-Analysis-Space) method suggested in Japanese Patent Laying-Open No. 2004-038774, a closed surface (hereinafter, referred to as "conversion surface") surrounding a portion that includes a fine structure and serves as a radiation source, in the entire analysis domain, is considered. In this case, the conversion surface inside is an internal analysis space (hereinafter, referred to as "IAS (Internal Analysis Space)"), and a portion filled with a uniform medium including the IAS is an external analysis space (hereinafter, referred to as "EAS (External Analysis Space)"). For IAS, a small cell is used for modeling, and for EAS, a large cell is used for modeling.

In the FDTD-MAS method, first, for the IAS portion, an analysis is performed on the assumption that a uniform medium similar to that of EAS is filled circumferentially as a boundary condition, and a radiated electromagnetic field on the conversion surface of IAS is stored. Subsequently, the EAS portion is analyzed with the stored radiated electromagnetic field on the conversion surface as a wave source. The calculation of EAS is performed independently from the calculation of IAS, which allows stable analysis to be executed for a long time.

However, in the FDTD-MAS method suggested in Japanese Patent Laying-Open No. 2004-038774, in EAS other than IAS, the analysis cannot be performed with an additional structure or an additional wave source placed besides the uniform medium. This is because in the analysis of IAS, the calculation is executed on the assumption that no wave source exists outside of IAS, and that it is filled with the uniform medium similar to that of the EAS. That is, if an additional structure or an additional wave source is placed at the time of EAS calculation, the influence of scattering in the additional structure portion or the external wave source on EAS causes a different electromagnetic wave from that of the assumption to reach the conversion surface. Since the conversion surface in the FDTD-MAS method behaves as a complete reflector with respect to an electromagnetic wave component different from that of the assumption at the time of IAS calculation, the theoretically proper analysis cannot be performed.

Therefore, although the FDTD-MAS method can be applied to the analysis of the antenna radiation and the like, it is difficult to apply the same to general electromagnetic field analysis. For example, it cannot be applied in a case where in a precision instrument, a detailed analysis is performed with a substrate assumed to a radiative source, and further an electromagnetic field distribution generated outside is found by an analysis with a housing or the like arranged thereoutside as a scattering body, and so on.

SUMMARY OF THE INVENTION

The present invention has been made to solve the foregoing problems, and an object thereof is to provide a computer-readable medium that stores an electromagnetic field program for performing an efficient electromagnetic field analysis, and a method of causing a computer to perform the efficient electromagnetic field analysis.

According to a first aspect of the present invention, in a computer-readable medium storing an electromagnetic field analysis program for causing a computer with an arithmetic processing unit to perform an electromagnetic field analysis, the electromagnetic field analysis program causes the arithmetic processing unit to perform a first electromagnetic field analysis step of dividing a first analysis space surrounded by a closed surface and including a wave source of an electromagnetic field in a first cell size to find a first electromagnetic field distribution in the closed surface inside, on the closed surface, and close to the closed surface outside, and a second electromagnetic field analysis step of dividing a second analysis space including the first analysis space in a second cell size larger than the first cell size to find a second electromagnetic field distribution in the closed surface inside, and on the closed surface, and a third electromagnetic field distribution in the closed surface outside. The second electromagnetic field analysis step includes a step of finding the second electromagnetic field distribution where a differential electromagnetic field distribution between the third electromagnetic field distribution and the first electromagnetic field distribution close to the closed surface outside is a wave source, for the closed surface inside, and on the closed surface, and finding the third electromagnetic field distribution where an electromagnetic field distribution obtained by synthesizing the first electromagnetic field distribution and the second electromagnetic field distribution on the closed surface is a wave source, for the closed surface outside.

According to a second aspect of the present invention, in a computer-readable medium storing an electromagnetic field analysis program for causing a computer with an arithmetic processing unit to perform an electromagnetic field analysis, the electromagnetic field analysis program causes the arithmetic processing unit to perform a first electromagnetic field analysis step of dividing a first analysis space surrounded by a closed surface and including a wave source of an electromagnetic field in a first cell size to find a first electromagnetic field distribution in the closed surface inside, and on the closed surface, a second electromagnetic field analysis step of dividing a second analysis space including the first analysis space in a second cell size larger than the first cell size to find a second electromagnetic field distribution close to the closed surface outside, and a third electromagnetic field analysis step of dividing a third analysis space including the first analysis space in the second cell size to find a third electromagnetic field distribution in the closed surface inside, and on the closed surface, and a fourth electromagnetic field distribution in the closed surface outside. The third electromagnetic field analysis step includes a step of finding the third electromagnetic field distribution where a differential electromagnetic field distribution between the fourth electromagnetic field distribution and the second electromagnetic field distribution close to the closed surface outside is a wave source, for the closed surface inside, and on the closed surface, and finding the fourth electromagnetic field distribution where an electromagnetic field distribution obtained by synthesizing the first electromagnetic field distribution and the third electromagnetic field distribution on the closed surface is a wave source, for the closed surface outside.

Regarding the first and second aspects of the present invention, preferably, the first electromagnetic field analysis step includes a step of performing the electromagnetic field analysis on the assumption that there is no structural body outside of the closed surface.

Regarding the second aspect of the present invention, preferably, the second electromagnetic field analysis step includes a step of performing the electromagnetic field analysis on the assumption that there is no structural body outside of the closed surface.

Regarding the first aspect of the present invention, preferably, the second electromagnetic field analysis step includes a step of performing the electromagnetic field analysis on the assumption that there is a structural body outside of the closed surface.

Regarding the second aspect of the present invention, preferably, the third electromagnetic field analysis step includes a step of performing the electromagnetic field analysis on the assumption that there is a structural body outside of the closed surface.

Regarding the first aspect of the present invention, preferably, the computer has a storage, and the first electromagnetic field analysis step includes a step of finding an electric field value in the first analysis space, a step of determining timing when an electric field value on the closed surface is outputted, a step of writing, in the storage, an electric field value of an electric field variable corresponding to an electric field variable assigned in a second cell divided in the second cell size among electric field variables assigned in a first cell divided in the first cell size, based on the determination result of the step of determining the timing when the electric field value is outputted, a step of finding a magnetic field value in the first analysis space, a step of determining timing when a magnetic field value close to the closed surface outside, and a step of writing, in the storage, a magnetic field value of a magnetic field variable corresponding to a magnetic field variable assigned in the second cell among magnetic field variables assigned in the first cell, based on the determination result of the step of determining the timing when the magnetic field value is outputted. The second electromagnetic field analysis step includes a step of finding an electric field value in the closed surface outside, a step of reading the magnetic field value written in the storage as the first electromagnetic field distribution close to the closed surface outside, a step of finding electric field values in the closed surface inside, and on the closed surface, based on the read magnetic field value and the magnetic field value close to the closed surface outside, a step of finding a magnetic field value in the closed surface inside, a step of reading the electric field values written in the storage as the first electromagnetic field distribution on the closed surface, and a step of finding a magnetic field value in the closed surface outside, based on the read electric field value and the electric field value on the closed surface.

Regarding the second aspect of the present invention, preferably, the computer has a storage, and the first electromagnetic field analysis step includes a step of finding an electric field value in the first analysis space, a step of determining timing when an electric field value on the closed surface is outputted, a step of writing, in the storage, an electric field value of an electric field variable corresponding to an electric field variable assigned in a second cell divided in the second cell size among electric field variables assigned in a first cell divided in the first cell size, based on the determination result of the step of determining the timing when the electric field value is outputted, and a step of finding a magnetic field value in the first analysis space. The second electromagnetic field analysis step includes a step of finding an electric field value in the second analysis space, a step of reading the electric field written in the storage as the first electromagnetic field distribution on the closed surface and overwriting as the second electromagnetic field distribution, a step of finding a magnetic field value in the second analysis space, a step of determining timing when a magnetic field value close to the closed surface outside is outputted, and a step of writing, in the storage, the magnetic field value of the magnetic field variable close to the closed surface outside based on the determination result of the step of determining the timing when the magnetic field value close to the closed surface outside is outputted. The third electromagnetic field analysis step includes a step of finding an electromagnetic field value in the closed surface outside, a step of reading the magnetic field value written in the storage as the second electromagnetic field distribution close to the closed surface outside, a step of finding electric field values in the closed surface inside, and on the closed surface based on the read magnetic field value and the magnetic field value close to the closed surface outside, a step of finding a magnetic field value in the closed surface inside, a step of reading the electric field value written in the storage as the first electromagnetic field distribution on the closed surface, and a step of finding a magnetic field value in the closed surface outside, based on the read electric field value and the electric field value on the closed surface.

Regarding the first and second aspects of the present invention, preferably, the electromagnetic field analysis uses a finite difference time domain method.

According to another aspect of the present invention, there is a program product according to the electromagnetic field analysis program in the above-described first aspect.

According to another aspect of the present invention, there is a program product according to the electromagnetic field analysis program in the above-described second aspect.

In an electromagnetic field analysis apparatus corresponding to the first aspect of the present invention, the electromagnetic field analysis apparatus includes electromagnetic field analysis means for performing electromagnetic field analysis, and the electromagnetic field analysis means includes first electromagnetic field analysis means for dividing a first analysis space surrounded by a closed surface and including a wave source of an electromagnetic field in a first cell size to find a first electromagnetic field distribution in the closed surface inside, on the closed surface, and close to the closed surface outside, and second electromagnetic field analysis means for dividing a second analysis space including the first analysis space in a second cell size larger than the first cell size to find a second electromagnetic field distribution in the closed surface inside, and on the closed surface, and a third electromagnetic field distribution in the closed surface outside, wherein the second electromagnetic field analysis means finds the second electromagnetic field distribution where a differential electromagnetic field distribution between the third electromagnetic field distribution and the first electromagnetic field distribution close to the closed surface outside is a wave source, for the closed surface inside, and on the closed surface, and finds the third electromagnetic field distribution where an electromagnetic field distribution obtained by synthesizing the first electromagnetic field distribution and the second electromagnetic field distribution on the closed surface is a wave source, for the closed surface outside.

In an electromagnetic field analysis apparatus corresponding to the second aspect of the present invention, the electromagnetic field analysis apparatus includes first electromagnetic field analysis means for dividing a first analysis space surrounded by a closed surface, and the electromagnetic field analysis means includes a wave source of an electromagnetic field in a first cell size to find a first electromagnetic field distribution in the closed surface inside, and on the closed surface, second electromagnetic field analysis means for dividing a second analysis space including the first analysis space in a second cell size larger than the first cell size to find a second electromagnetic field distribution close to the closed surface outside, and third electromagnetic field analysis means for dividing a third analysis space including the first analysis space in the second cell size to find a third electromagnetic field distribution in the closed surface inside, and on the closed surface, and a fourth electromagnetic field distribution in the closed surface outside, wherein the third electromagnetic field analysis means finds the third electromagnetic field distribution where a different electromagnetic field distribution between the fourth electromagnetic field distribution and the second electromagnetic field distribution close to the closed surface outside is a wave source, for the closed surface inside, and on the closed surface, and finds the fourth electromagnetic field distribution where an electromagnetic field distribution obtained by synthesizing the first electromagnetic field distribution and the third electromagnetic field distribution on the closed surface is a wave source, for the closed surface outside.

In a method for causing a computer with an arithmetic processing unit to perform an electromagnetic field analysis, corresponding to the first aspect of the present invention, the method includes a first electromagnetic field analysis step of the arithmetic processing unit dividing a first analysis space surrounded by a closed surface and including a wave source of an electromagnetic field in a first cell size to find a first electromagnetic field distribution in the closed surface inside, on the closed surface and close to the closed surface outside, and a second electromagnetic field analysis step of the arithmetic processing unit dividing a second analysis space including the first analysis space in a second cell size larger than the first cell size to find a second electromagnetic field distribution in the closed surface inside, and on the closed surface, and a third electromagnetic field distribution in the closed surface outside. The second electromagnetic field analysis step includes a step of finding the second electromagnetic field distribution where a differential electromagnetic field distribution between the third electromagnetic field distribution and the first electromagnetic field distribution close to the closed surface outside is a wave source, for the closed surface inside, and on the closed surface, and finding the third electromagnetic field distribution where an electromagnetic field distribution obtained by synthesizing the first electromagnetic field distribution and the second electromagnetic field distribution on the closed surface is a wave source, for the closed surface outside.

In a method for causing a computer with an arithmetic processing unit to perform an electromagnetic field analysis, corresponding to the second aspect of the present invention, the method includes a first electromagnetic field analysis step of the arithmetic processing unit dividing a first analysis space surrounded by a closed surface and including a wave source of an electromagnetic field in a first cell size to find a first electromagnetic field distribution in the closed surface inside, and on the closed surface, a second electromagnetic field analysis step of the arithmetic processing unit dividing a second analysis space including the first analysis space in a second cell size larger than the first cell size to find a second electromagnetic field distribution close to the closed surface outside, and a third electromagnetic field analysis step of the arithmetic processing unit dividing a third analysis space including the first analysis space in the second cell size to find a third electromagnetic field distribution in the closed surface inside, and on the closed surface, and a fourth electromagnetic field distribution in the closed surface outside. The third electromagnetic field analysis step includes a step of finding the third electromagnetic field distribution where a differential electromagnetic field distribution between the fourth electromagnetic field distribution and the second electromagnetic field distribution close to the closed surface outside is a wave source, for the closed surface inside, and on the closed surface, and finding the fourth electromagnetic field distribution where an electromagnetic field distribution obtained by synthesizing the first electromagnetic field distribution and the third electromagnetic field distribution on the closed surface is a wave source, for the closed surface outside.

According to the present invention, the electromagnetic field analysis can be performed efficiently. This enables a precise analysis to be performed even if an additional structure, a wave source, and another IAS domain are placed outside of the closed surface surrounding a portion that includes a fine structure and serves as a radiation source, in the entire analysis domain.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram showing one example of an analysis space.

FIG. 4 is a diagram showing the arrangement of electric field variables and magnetic field variables in an electric field cell.

FIGS. 12A to 12C are diagrams each showing an electric field variable and four magnetic field variables existing closest to the same.

FIG. 14 is a diagram showing a magnetic field variable Hx close to the conversion surface in the conversion surface shown in FIG. 5.

DESCRIPTION OF THE PREFERRED EMBODIMENTS

Figure 1:
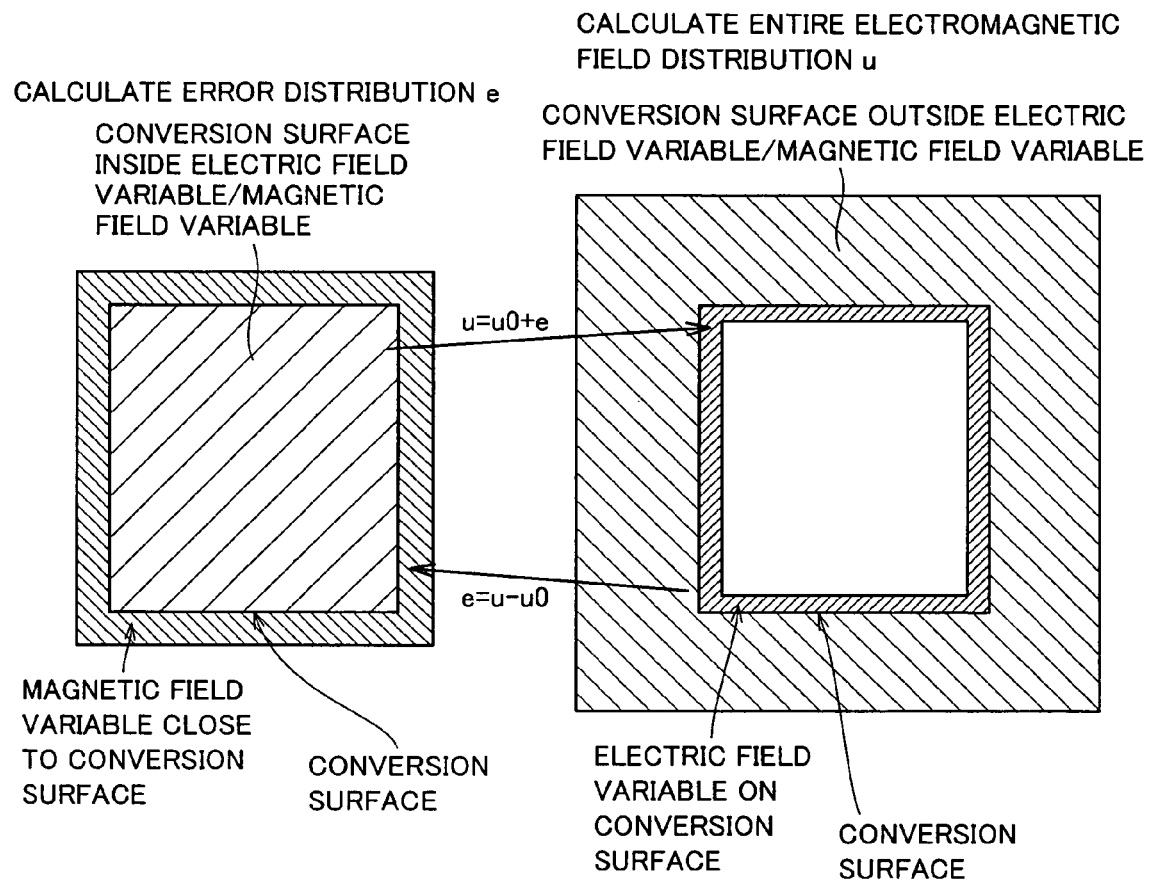
FIG. 1 is a diagram for describing processing of a conversion surface inside and a conversion surface outside in an electromagnetic field analysis according to the present invention.

In the following, referring to the drawings, embodiments of the present invention will be described. In the following description, identical components are denoted by identical reference characters. Their labels and functions are also the same. Accordingly, detailed description thereof will not be repeated.

Prior to description of the embodiments of the present invention, an overview of the present invention will be given.

(Overview of the Invention)

In the FDTD-MAS method suggested in Japanese Patent Laying-Open No. 2004-038774, in the IAS analysis, an electromagnetic field distribution (electromagnetic field value) u0 on the conversion surface is obtained on the assumption that an outside of a closed surface (conversion surface) surrounding a portion that includes a fine structure and serves as a radiation source in the entire analysis domain is circumferentially filled with a uniform medium. In the EAS analysis, the entire space is analyzed on the assumption that it is filled with a uniform medium including the IAS, and at this time, processing of writing an electromagnetic field value u on the conversion surface and in the conversion surface outside over electromagnetic field value u0 on the conversion surface found in the IAS analysis is performed.

In the FDTD-MAS method, in the IAS analysis and the EAS analysis, since the analyses are performed in the identical condition such that no structural body and the like are placed in the conversion surface outside, electromagnetic field value u in the conversion surface outside can be considered to be equal to u0. Therefore, utilizing the result of the IAS analysis is utilized in the EAS analysis as it is, the electromagnetic field value in the conversion surface outside can be precisely found. On the other hand, as for an electromagnetic field value in the conversion surface inside found in the EAS analysis, the obtained value does not substantially contribute to the electromagnetic field analysis. Moreover, in the FDTD-MAS method, since the ISA analysis and the EAS analysis are performed in the identical condition, an analysis with a structural body and a wave source added to the conversion surface outside cannot bring about a correct analysis result.

In contrast, in the electromagnetic field analysis method according to the present invention, the analyses are performed in different conditions between the IAS analysis and the EAS analysis.

In the IAS analysis, as in the FDTD-MAS method, assuming that no structural body and the like are placed in the conversion surface outside, electromagnetic field distribution u0 in the conversion surface inside, on the conversion surface, and close to the conversion surface outside is obtained.

In the EAS analysis, the domain is divided into the conversion surface outside and the conversion surface inside, and the analysis is performed in a different boundary condition from the boundary condition used in the IAS analysis. When two analyses of the conversion surface outside and the conversion surface inside are performed, by exchanging electromagnetic field values on the conversion surface at each time, the analyses are performed with a mutual link.

Furthermore, in the electromagnetic field analysis method according to the present invention, when after the IAS analysis, the analysis is performed by the normal FDTD-MAS method on the assumption that the conversion surface outside is circumferentially filled with a uniform medium, and a procedure is added in which an electromagnetic field distribution close to the conversion surface outside arising from an electromagnetic field distribution on the conversion surface resulting from the IAS analysis on the assumption that the conversion surface outside is circumferentially filled with the uniform medium is found precisely in a cell size for the EAS analysis, calculation precision can be further enhanced.

DESCRIPTION COMMON TO THE
INVENTIONS OF RESPECTIVE
EMBODIMENTS

FIG. 1 is a diagram for describing processing in the conversion surface inside and the conversion surface outside in the electromagnetic field analysis method according to the present invention.

Referring to FIG. 1, the processing in the conversion surface inside and the conversion surface outside in the EAS analysis will be described. For the conversion surface inside, an error distribution (electromagnetic field value) e is calculated, where an error component is a wave source, the error component being generated in an electromagnetic field distribution closest to the conversion surface by the influence caused by performing the EAS analysis in the different condition from the boundary condition used in the IAS analysis, that is, on the assumption that there is a structural body or the like in the conversion surface outside. In this case, error distribution e is obtained by subtracting electromagnetic field distribution on the conversion surface u0 found by the IAS analysis from electromagnetic field distribution u in the conversion surface outside.

Furthermore, for the domain of the conversion surface outside, entire electromagnetic field distribution u in the conversion surface outside is calculated. In this case, electromagnetic field distribution u in the conversion surface outside is obtained by adding electromagnetic field value e, which an error in the domain of the conversion surface inside creates on the conversion surface, to electromagnetic field distribution u0 on the conversion surface found by the IAS analysis.

The above-described processing enables a precise analysis to be performed in the EAS analysis even if an additional structure, a wave source, and another IAS domain are placed in the conversion surface outside.

(1. System Configuration of the Invention)

Figure 2:
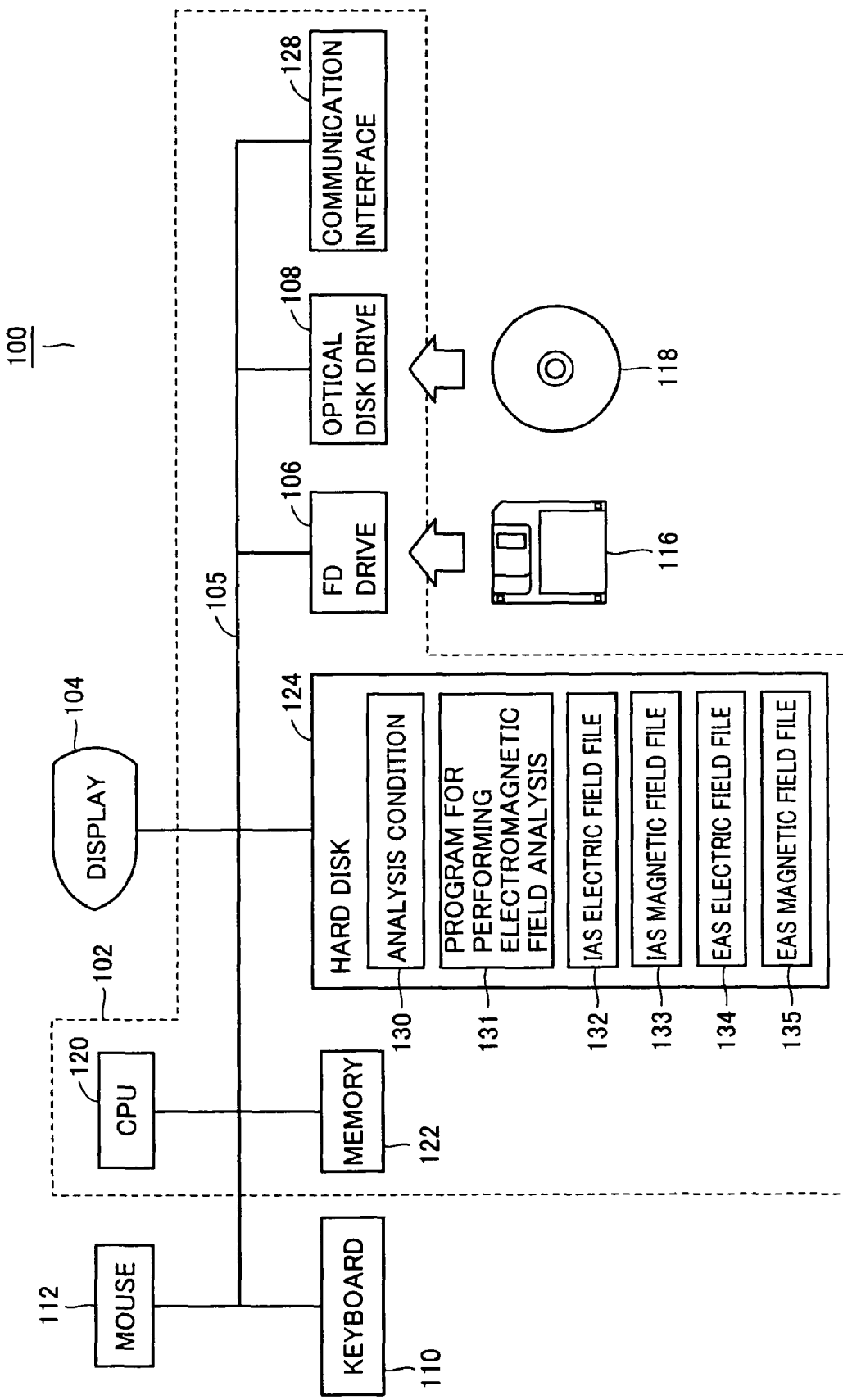
FIG. 2 is a conceptual diagram showing one example of a computer 100 executing an electromagnetic field analysis program according to the present invention.

FIG. 2 is a conceptual diagram showing one example of a computer 100 that performs an electromagnetic field analysis program according to the present invention.

Referring to FIG. 2, computer 100 performing the electromagnetic field analysis program will be described.

Computer 100 has a computer unit 102, a display 104 as a display device connected to computer unit 102, and a key board 110 and a mouse 112 as input devices connected to computer unit 102 similarly.

Computer unit 102 includes an optical disk drive 108 for reading information on optical disk such as a CD-ROM (Compact Disc Read-Only Memory) 118, and an FD drive 106 for reading and writing information with respect to a flexible disk (hereinafter, referred to as "FD") 116, and additionally, a CPU (Central Processing Unit) 120 and a memory 122 including a ROM (Read Only Memory) and a RAM (Random Access Memory), which are connected to a bus 105, respectively, a direct access memory device, for example, a hard disk 124, and a communication interface 128 for supplying and receiving data with respect to the outside. On optical disk drive 108, the optical disk such as CD-ROM 118 is loaded. On FD drive 106, FD 116 is loaded.

In hard disk 124, an analysis condition 130 indicating a cell size when the analysis domain is divided into cells, medium information, a time step size and the like in a position where an electric field or magnetic field variable exists, a program 131 for performing the electromagnetic field analysis (FDTD method) and the like are stored. In this case, for example, analysis condition 130 may be supplied from an external database through communication interface 128. Moreover, the program for performing the electromagnetic field analysis may be supplied by the storage medium such as FD 116 or CD-ROM 118, or may be supplied via a communication line by another computer. Moreover, the execution of the electromagnetic field analysis may be performed by an external computer through communication interface 128, and the result may be stored in hard disk 124.

Moreover, a storage device, for example, a storage area of hard disk 124 is provided with an IAS electric field file 132 and an IAS magnetic field file 133 for storing an electric field value and a magnetic field value in the IAS analysis, and an EAS electric field file 134 and an EAS magnetic field file 135 for storing an electric field value and a magnetic field value in the EAS analysis.

CPU 120 functioning as an arithmetic processing device performs processing corresponding to program 131, which performs the electromagnetic field analysis, with memory 122 serving as a working memory.

CD-ROM 118 may be another medium, for example, a DVD-ROM (Digital Versatile Disc-Read Only Memory), a memory card or the like, as long as it is a medium capable of recording information such as a program installed in the computer unit. In this case, computer unit 102 is provided with a drive device capable of reading these media.

Program 131 for performing the electromagnetic field analysis is software executed by CPU 120, as described above. Generally, such software is stored in a storage medium such as CD-ROM 118 and FD 116 to be distributed, and is read from the storage medium by optical disk drive 108, FD drive 106 or the like to temporarily store in hard disk 124. Alternatively, when computer 100 is connected to a network, it is temporarily copied to hard disk 124 from a server on the network. Further, it is read out from hard disk 124 onto the RAM in memory 122 to be executed by CPU 120. In the case where the network connection is performed, it may be directly loaded on the RAM to be executed without being stored in hard disk 124.

Hardware itself of the computer as shown in FIG. 2 and an operational principle thereof are prevailing ones. Accordingly, an essential part in realizing the functions of the present invention is the software stored in the storage medium such as FD 116, CD-ROM 118, and hard disk 124.

As a general tendency, a method in which various program modules are prepared as part of an operating system of the computer, and an application program calls out these modules in a predetermined array as needed to advance the processing is common. In such a case, the relevant software itself does not include these modules, and thus it is not until the software cooperates with the operating system in the relevant computer that the electromagnetic field analysis is enabled. However, as long as a general platform is used, software including these modules does not need to be distributed, and it can be considered that the software itself that does not include these modules and the storage medium on which the software is recorded (a data signal when the software is distributed on the network) constitute the embodiments.

(2. Theory of Electromagnetic Field Analysis Method According to Embodiments)

(2.1 FDTD Method)

Prior to the electromagnetic field analysis method according to the present embodiment, the FDTD method will be described in brief.

The FDTD method is a method of differentiating Maxwell's electromagnetic field equation to numerically calculate. A structure of so-called Yee grid is taken, in which the analysis domain is first divided by grid, and an electric field is arranged in the center of each side of the grid, and a magnetic field is arranged in the center of each surface. Once Maxwell's equation is differentiated, the electric field and magnetic field are arranged in a position displaced by a half cell in space, and by a half time step in time. In this case, if relational expressions describing interaction between a known electric field and a known magnetic field one time step before, adjacent to an unknown electric field and an unknown magnetic field desired to be found are derived from Maxwell equation based on electromagnetics, the following expression (1) and expression (2) are given.

$$E^n = \frac{1 - \frac{\sigma \Delta t}{2\varepsilon}}{1 + \frac{\sigma \Delta t}{2\varepsilon}} E^{n-1} + \frac{\frac{\Delta t}{\varepsilon}}{1 + \frac{\sigma \Delta t}{2\varepsilon}} \nabla \times H^{n-\frac{1}{2}} \quad (1)$$

$$H^{n+\frac{1}{2}} = H^{n-\frac{1}{2}} - \frac{\Delta t}{\mu} \nabla \times E^n \quad (2)$$

where bold face letters indicate that the relevant variables are vectors.

Expression (1) is a relational expression about an electric field E (vector) at an n time step, and Expression (2) is a relational expression about a magnetic field H (vector) of an (n+½) time step. Here, $\Delta t_{em}$, $\mu$, $\in$, and $\sigma$ are a step size of the time step, magnetic permeability, dielectric constant, and conductance, respectively.

Based on these, the unknown electric and magnetic fields are modified on a certain time-step basis, whereby the electromagnetic field behavior of the entire analysis domain can be found in a time domain.

Figure 36:
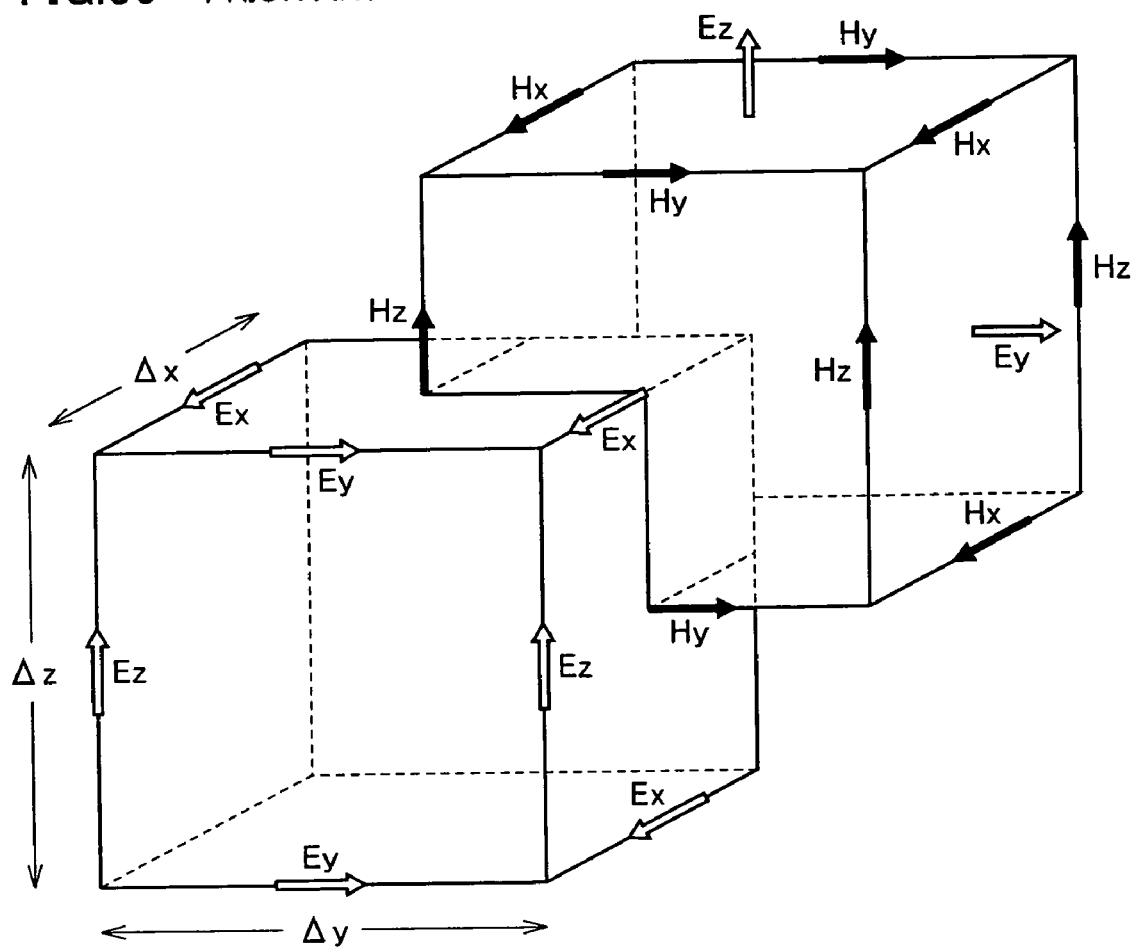
FIG. 36 is a diagram showing a cell structure in an FDTD method.

However, since electric field variables Ex, Ey, Ez and magnetic field variables Hx, Hy, Hz are arranged in different positions as shown in FIG. 36, in actual calculation of Expressions (1) and (2), the calculation of only a corresponding directional component is performed for each position corresponding to a suffix (i,j,k) of each variable as indicated in the following expressions. Expression (1) is calculated as indicated in Expressions (3), (4) and (5), and Expression (2) is calculated as indicated in Expression (6), (7), and (8).

$$E_x^n(i,j,k) = \frac{1 - \frac{\sigma \Delta t}{2\varepsilon}}{1 + \frac{\sigma \Delta t}{2\varepsilon}} E_x^{n-1}(i,j,k) + \frac{\frac{\Delta t}{\varepsilon}}{1 + \frac{\sigma \Delta t}{2\varepsilon}} \left\{ \frac{H_z^{n-\frac{1}{2}}(i,j,k) - H_z^{n-\frac{1}{2}}(i,j-1,k)}{\Delta y} - \frac{H_y^{n-\frac{1}{2}}(i,j,k) - H_y^{n-\frac{1}{2}}(i,j,k-1)}{\Delta z} \right\} \quad (3)$$

$$E_y^n(i,j,k) = \frac{1 - \frac{\sigma \Delta t}{2\varepsilon}}{1 + \frac{\sigma \Delta t}{2\varepsilon}} E_y^{n-1}(i,j,k) + \frac{\frac{\Delta t}{\varepsilon}}{1 + \frac{\sigma \Delta t}{2\varepsilon}} \left\{ \frac{H_x^{n-\frac{1}{2}}(i,j,k) - H_x^{n-\frac{1}{2}}(i,j,k-1)}{\Delta z} - \frac{H_z^{n-\frac{1}{2}}(i,j,k) - H_z^{n-\frac{1}{2}}(i-1,j,k)}{\Delta x} \right\} \quad (4)$$

$$E_z^n(i,j,k) = \frac{1 - \frac{\sigma \Delta t}{2\varepsilon}}{1 + \frac{\sigma \Delta t}{2\varepsilon}} E_z^{n-1}(i,j,k) + \frac{\frac{\Delta t}{\varepsilon}}{1 + \frac{\sigma \Delta t}{2\varepsilon}} \left\{ \frac{H_y^{n-\frac{1}{2}}(i,j,k) - H_y^{n-\frac{1}{2}}(i-1,j,k)}{\Delta x} - \frac{H_x^{n-\frac{1}{2}}(i,j,k) - H_x^{n-\frac{1}{2}}(i,j-1,k)}{\Delta y} \right\} \quad (5)$$

-continued $$H_x^{n+\frac{1}{2}}(i, j, k) = H_x^{n-\frac{1}{2}}(i, j, k) - \frac{\Delta t}{\mu} \left\{ \frac{E_z^n(i, j+1, k) - E_z^n(i, j, k)}{\Delta y} - \frac{E_y^n(i, j, k+1) - E_y^n(i, j, k)}{\Delta z} \right\} \quad (6)$$

$$H_y^{n+\frac{1}{2}}(i, j, k) = H_y^{n-\frac{1}{2}}(i, j, k) - \frac{\Delta t}{\mu} \left\{ \frac{E_x^n(i, j, k+1) - E_x^n(i, j, k)}{\Delta z} - \frac{E_z^n(i+1, j, k) - E_z^n(i, j, k)}{\Delta x} \right\} \quad (7)$$

$$H_z^{n+\frac{1}{2}}(i, j, k) = H_z^{n-\frac{1}{2}}(i, j, k) - \frac{\Delta t}{\mu} \left\{ \frac{E_y^n(i+1, j, k) - E_y^n(i, j, k)}{\Delta x} - \frac{E_x^n(i, j+1, k) - E_x^n(i, j, k)}{\Delta y} \right\} \quad (8)$$

Since in accordance with the above-described processing, the calculation of the FDTD method is performed, in respective electromagnetic field variable calculations, the electromagnetic field distribution obtained in the FDTD method has linearity unless a calculation having nonlinearity is performed exceptionally.

Moreover, step size $\Delta t_{em}$ of the time step in the FDTD method needs to satisfy the Courant stability condition as indicated in the following expression (9) with respect to the size of the cell.

$$\Delta t_{em} \leq \frac{1}{c\sqrt{\left(\frac{1}{\Delta x}\right)^2 + \left(\frac{1}{\Delta y}\right)^2 + \left(\frac{1}{\Delta z}\right)^2}} \quad (9)$$

where c indicates a light velocity, and $\Delta x$, $\Delta y$, $\Delta z$ indicate lengths of respective sides of the cell.

It is generally known that if step size $\Delta t_{em}$ of the time step does not satisfy Expression (9), the calculated value is diffused.

In this manner, in the FDTD method, by sequentially calculating unknown electric fields and unknown magnetic fields within the analysis domain by explicit scheme, a time domain electromagnetic field response in the analysis space can be analyzed.

(2.2 Analysis Space)

Here, the analysis space in the electromagnetic field analysis according to the present embodiment will be described.

FIG. 3 is a diagram showing one example of the analysis space.

Referring to FIG. 3, there are three wave sources So inside of the entire analysis domain, and around the wave sources So, structural bodies Sd each belonging to a domain to be analyzed in a detailed cell size (hereinafter, referred to as "fine structural body Sd") exist. Furthermore, around it, a structural body Ss belonging to a domain to be analyzed in a rough cell size (hereinafter, referred to as "rough structural body Ss") exists. Around rough structural body Ss, there exists a space Sv where no structural body exists. In such an assumption, wave source So can be considered to an LSI (Large Scale Integration), fine structural body Sd to be a circuit board, rough structural body Ss to be a shield case or housing, which well coincides with an actual precision instrument product.

In the electromagnetic field analysis according to the first embodiment, in the above-described entire analysis domain, a two-step analysis is performed as follows. The analysis using a detailed mesh (IAS analysis) is performed only in partial domains (IAS) surrounding n (n is a natural number) wave sources So and fine structural bodies Sd, and an radiated electromagnetic field from each of the IAS surfaces and an electromagnetic field distribution close to its outside are recorded. In the entire analysis domain (EAS), a rougher mesh is used to perform the analysis (EAS analysis). Thereby, the electromagnetic field distribution of the entire analysis domain can be found at high speed and with precision.

In a more precise electromagnetic field analysis as described later in a second embodiment, in the above-described entire analysis domain, a three-step analysis is executed as follows. The analysis using the detailed mesh (IAS analysis) is performed only in the partial domains (IAS) surrounding n (n is a natural number) wave sources So and fine structural bodies Sd, and the radiated electromagnetic field from each of the IAS surfaces is recorded. For each of the n partial domains, the same rougher mesh as that for the entire analysis domain (EAS) is used to calculate an electromagnetic field distribution close to the ISA outside with the radiated electromagnetic field from the IAS calculated by the IAS analysis in the FDTD-MAS method (additional analysis for improving precision). In the entire analysis domain (EAS), using the radiated electromagnetic field from each IAS and the electromagnetic field distribution close to its outside, which have been found by the IAS analysis and the additional analysis for improving precision, the EAS analysis is performed. Thereby, the electromagnetic field distribution of the entire analysis domain can be found at high speed and with precision.

The following description will be given on the assumption that the electromagnetic field analysis is performed in the analysis space shown in FIG. 3.

(2.3 Definition of Terms)

Here, a conversion surface, and electric field cells and variables when the conversion surface is set are defined.

The conversion surface refers to a closed surface surrounding a portion that includes a fine structure and serves as a radiation source in the entire analysis domain. For example, in FIG. 3, the conversion surface refers to a closed surface that surrounds wave sources So and fine structural body Sd existing close to the same. The conversion surface is made of surfaces of electric field cells of EAS. In this case, the electric field cell refers to a cell to each side of which an electric field variable is assigned. Moreover, if EAS includes a plurality of conversion surfaces, the conversion surfaces do not make contacts with each other.

In this manner, in the entire analysis domain, if a conversion surface i ($1 \leq i \leq n$) is set with respect to n wave sources So and fine structural body Sd, respectively, the electric field cells of EAS can be classified into two; a group existing in the conversion surface inside and a group existing in the conversion surface outside. The electric field cell belonging to the group existing in the conversion surface inside is referred to as "conversion surface inside electromagnetic field cell in conversion surface i", and the electric field cell belonging to the group existing in the conversion surface outside is referred to as "conversion surface outside electromagnetic field cell in conversion surface i".

Moreover, among all the electric field variables, an electric field variable, where at least one of four electric field cells each including the relevant electric field variable is the conversion surface inside electric field cell in conversion surface i is referred to as "conversion surface inside electric field variable in conversion surface i". Also, among all the magnetic field variables, a magnetic field variable, where at least one of two electric field cells each including the relevant magnetic field variable is the conversion surface inside electric field cell in conversion surface i is referred to as "conversion surface inside magnetic field variable in conversion surface i".

Moreover, among all the electric field variables, an electric field variable that is not the conversion surface inside electric field variable in conversion surface i is referred to as "conversion surface outside electric field variable in conversion surface i". Also, among all the magnetic field variables, a magnetic field variable that is not the conversion surface inside magnetic field variable in conversion surface i is referred to as "conversion surface outside magnetic field variable in conversion surface i".

Moreover, among all the conversion surface inside electric field variables in conversion surface i, an electric field variable, where at least one of four magnetic field variables existing closest to the relevant electric field variable is the conversion surface outside magnetic field variable in conversion surface i is referred to as "electric field variable on the conversion surface in conversion surface i". Also, among all the conversion surface outside magnetic field variables in conversion surface i, a magnetic field variable, where at least one of four electric field variables existing closest to the relevant magnetic field variable is the electric field variable on the conversion surface in conversion surface i, is referred to as "magnetic field variable close to the conversion surface in conversion surface i". "Closest to a variable" refers to each side of a surface when the variable is arranged in the center of the surface of a cell.

Moreover, in the case where there exit several conversion surfaces, for all the conversion surfaces, electric field variables that are the conversion surface outside electric field variables are referred to as "outside electric field variables of all the conversion surfaces". Similarly, for all the conversion surfaces, magnetic field variables that are the conversion surface outside magnetic field variables are referred to as "outside magnetic field variables of all the conversion surfaces".

Hereinafter, the above-described definitions will be described using brief concrete examples.

FIG. 4 is a diagram showing arrangement of electric field variables and magnetic field variables in an electric field cell.

Referring to FIG. 4, the electric field variables and magnetic field variables in the electric field cell will be described. Here, (i,j,k) is a cell index indicating a position of the electric field cell in the analysis space.

As shown in FIG. 4, electric field E (an electric field in an x direction Ex, an electric field in a y direction Ey, an electric field in a z direction Ez) is assigned in a direction of an outline arrow along the side of the electric field cell. Magnetic field H (magnetic field in an x direction Hx, magnetic field in a y direction Hy, magnetic field in a z direction Hz) is assigned in a direction of a black arrow at a center of a surface of the electric field cell, being displaced by a half cell from the electric field cell.

Figure 5:
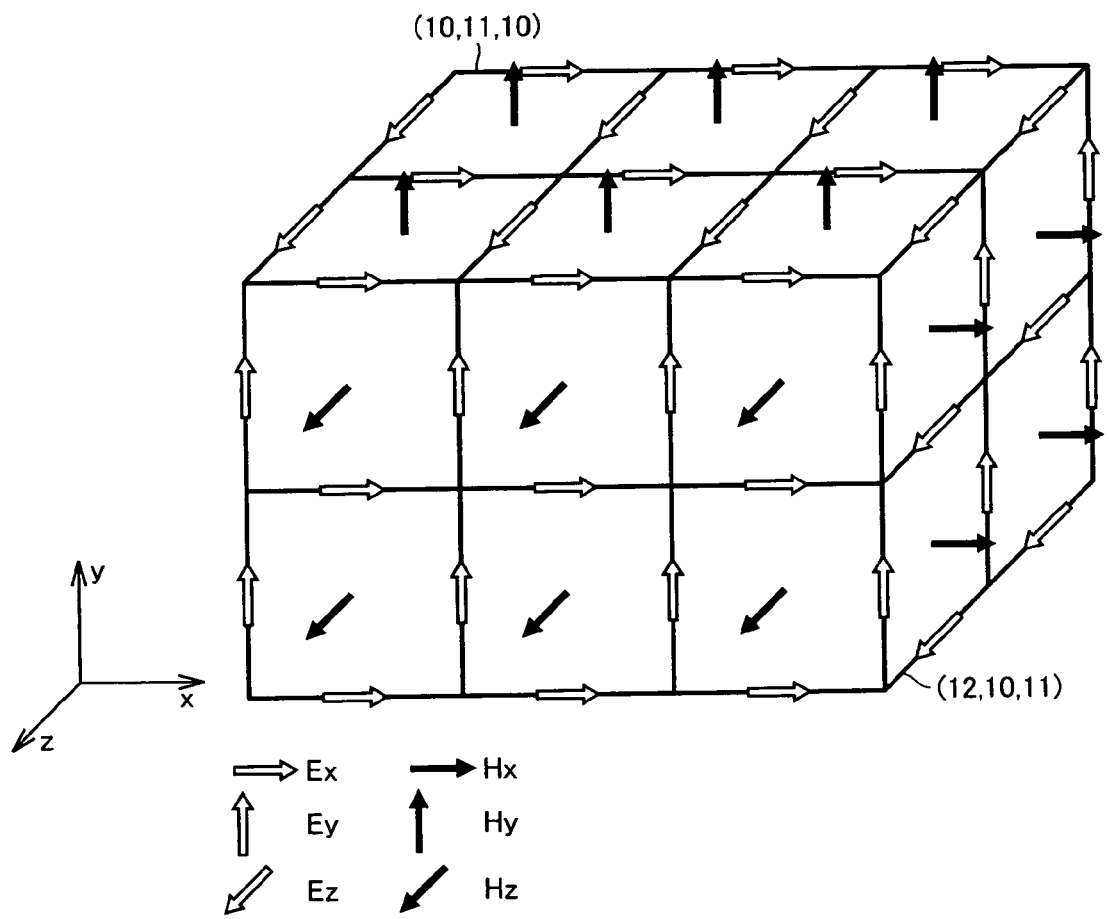
FIG. 5 is a diagram showing a conversion surface.

FIG. 5 is a diagram showing a conversion surface.

Referring to FIG. 5, the conversion surface, the conversion surface inside electric field cell and the conversion surface outside electric field cell will be described. In the following description, the analysis space is in a range indicated by $0 \leq i \leq 15$, $0 \leq j \leq 15$, $0 \leq k \leq 15$, when cell index (i,j,k) is used.

A rectangular parallelepiped shown in FIG. 5 is a rectangular parallelepiped configured by electric field cells whose cell indexes (i,j,k) are indicated by $\{(i,j,k)|10 \leq i \leq 12, 10 \leq j \leq 11, 10 \leq k \leq 11\}$. A surface of this rectangular parallelepiped is a conversion surface. In the following description, the electric field cells and variables with respect to this conversion surface will be described.

The conversion surface inside electric field cells (i,j,k) in this conversion surface are electric field cells indicated by $\{(i,j,k)|10 \leq i \leq 12, 10 \leq j \leq 11, 10 \leq k \leq 11\}$.

Moreover, the conversion surface outside electric field cells (i,j,k) in this conversion surface are electric field cells indicated by $\{(i,j,k)|0 \leq i \leq 9, 13 \leq i \leq 15, 0 \leq j \leq 9, 12 \leq j \leq 15, 0 \leq k \leq 9, 12 \leq k \leq 15\}$.

Figure 6:
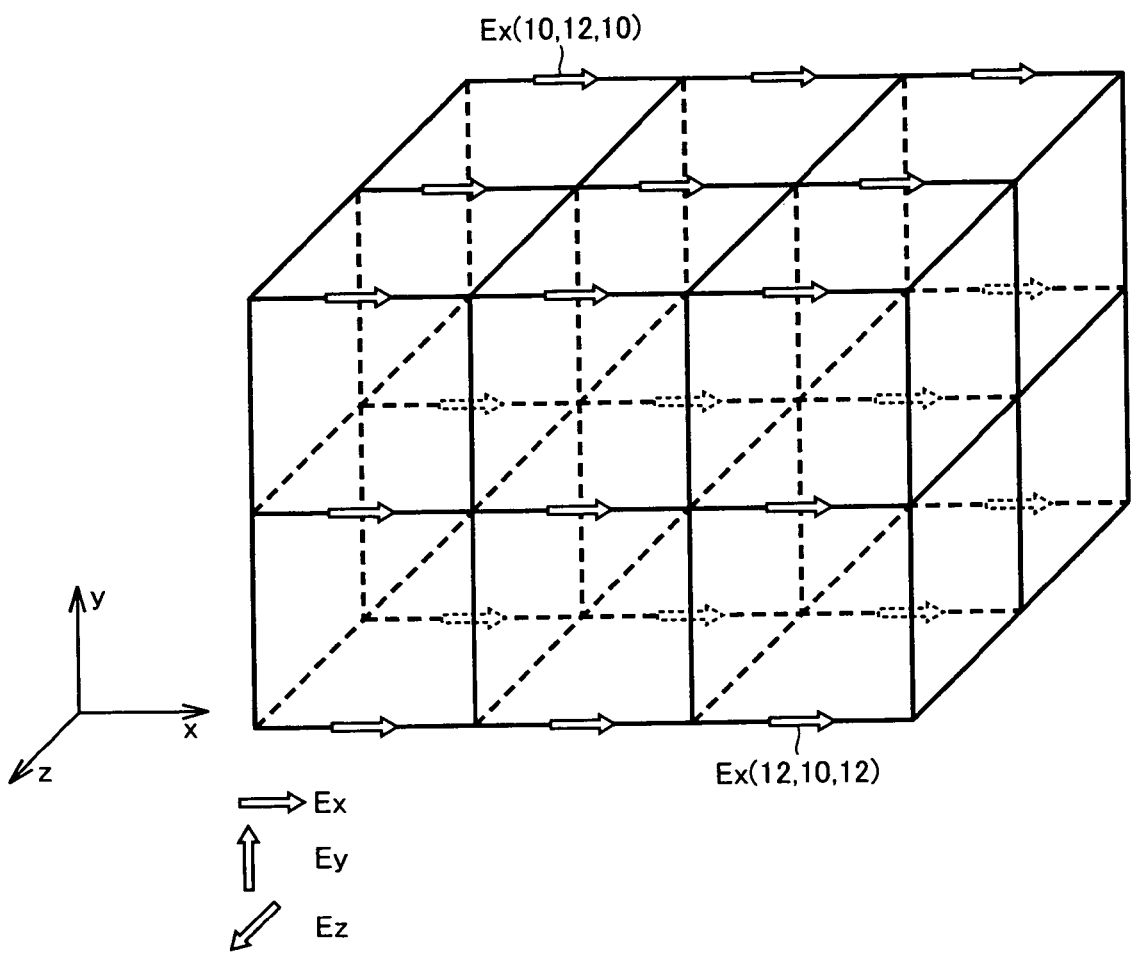
FIG. 6 is a diagram showing a conversion surface inside electric field variable Ex in the conversion surface shown in FIG. 5.

FIG. 6 is a diagram showing conversion surface inside electric field variable Ex in the conversion surface shown in FIG. 5.

Referring to FIG. 6, conversion surface inside electric field variable Ex(i,j,k) in the x direction will be described.

Conversion surface inside electric field variable Ex(i,j,k) in the x direction in the conversion surface shown in FIG. 5 is an electric field variable indicated by $\{Ex(i,j,k)|10 \leq i \leq 12, 10 \leq j \leq 12, 10 \leq k \leq 12\}$.

Figure 7:
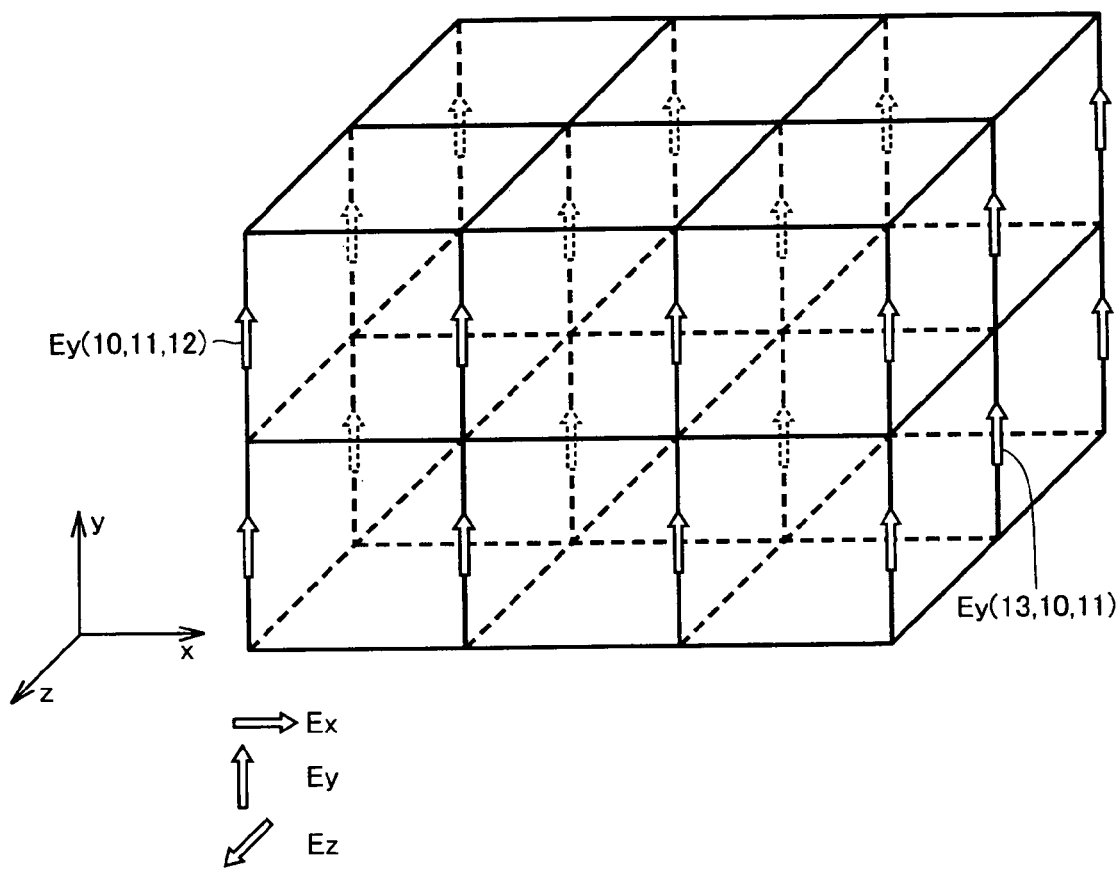
FIG. 7 is a diagram showing a conversion surface inside electric field variable Ey in the conversion surface shown in FIG. 5.

FIG. 7 is a diagram showing conversion surface inside electric field variable Ey in the conversion surface shown in FIG. 5.

Referring to FIG. 7, conversion surface inside electric field variable Ey(i,j,k) in the y direction will be described.

Conversion surface inside electric field variable Ey (i,j,k) in the y direction in the conversion surface shown in FIG. 5 is an electric field variable indicated by $\{Ey(i,j,k)|10 \leq i \leq 13, 10 \leq j \leq 11, 10 \leq k \leq 12\}$.

Figure 8:
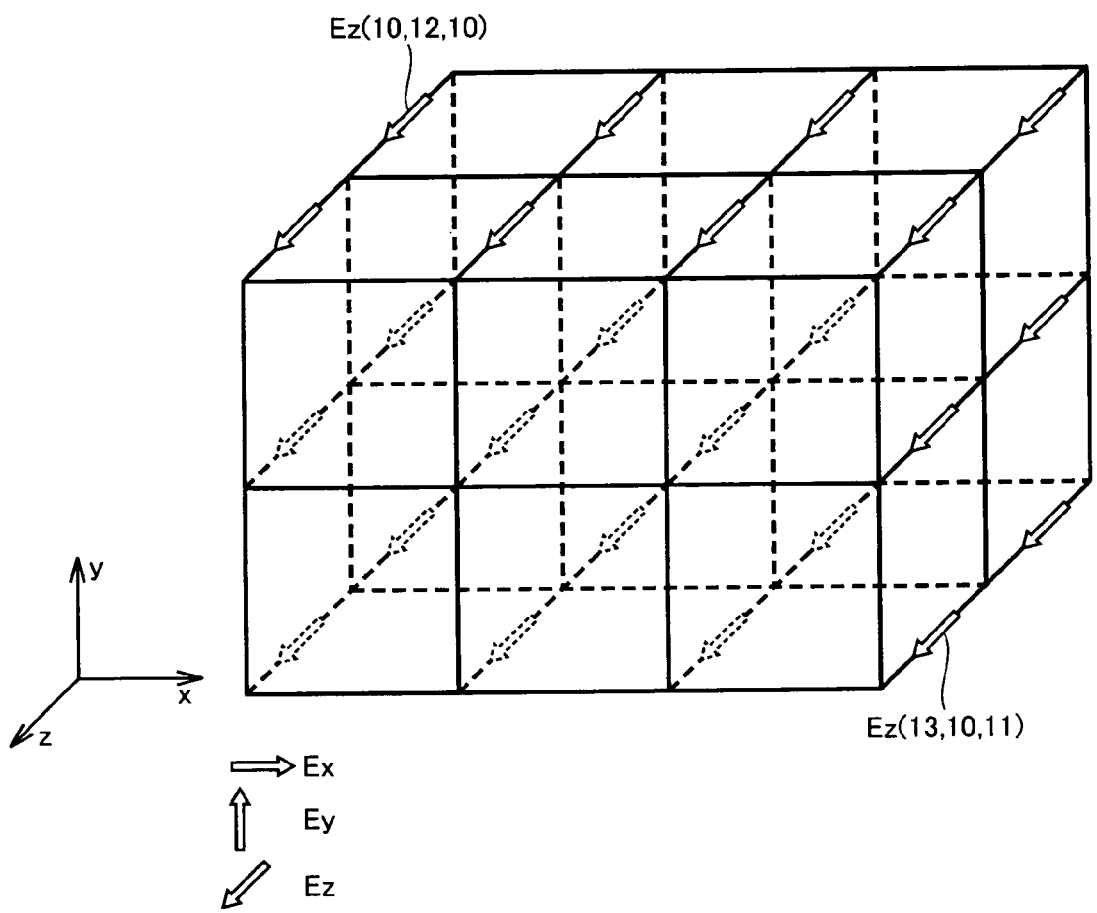
FIG. 8 is a diagram showing a conversion surface inside electric field variable Ez in the conversion surface shown in FIG. 5.

FIG. 8 is a diagram showing conversion surface inside electric field variable Ez in the conversion surface shown in FIG. 5.

Referring to FIG. 8, conversion surface inside electric field variable Ez(i,j,k) in the z direction will be described.

Conversion surface inside electric field variable Ez (i,j,k) in the z direction in the conversion surface shown in FIG. 5 is an electric field variable indicated by $\{Ez(i,j,k)|10 \leq i \leq 13, 10 \leq j \leq 12, 10 \leq k \leq 11\}$.

Moreover, the conversion surface outside electric field variables in the conversion surface shown in FIG. 5 are electric field variables other than the above-mentioned conversion surface inside electric field variables among all the electric field variables in the analysis space.

Figure 9:
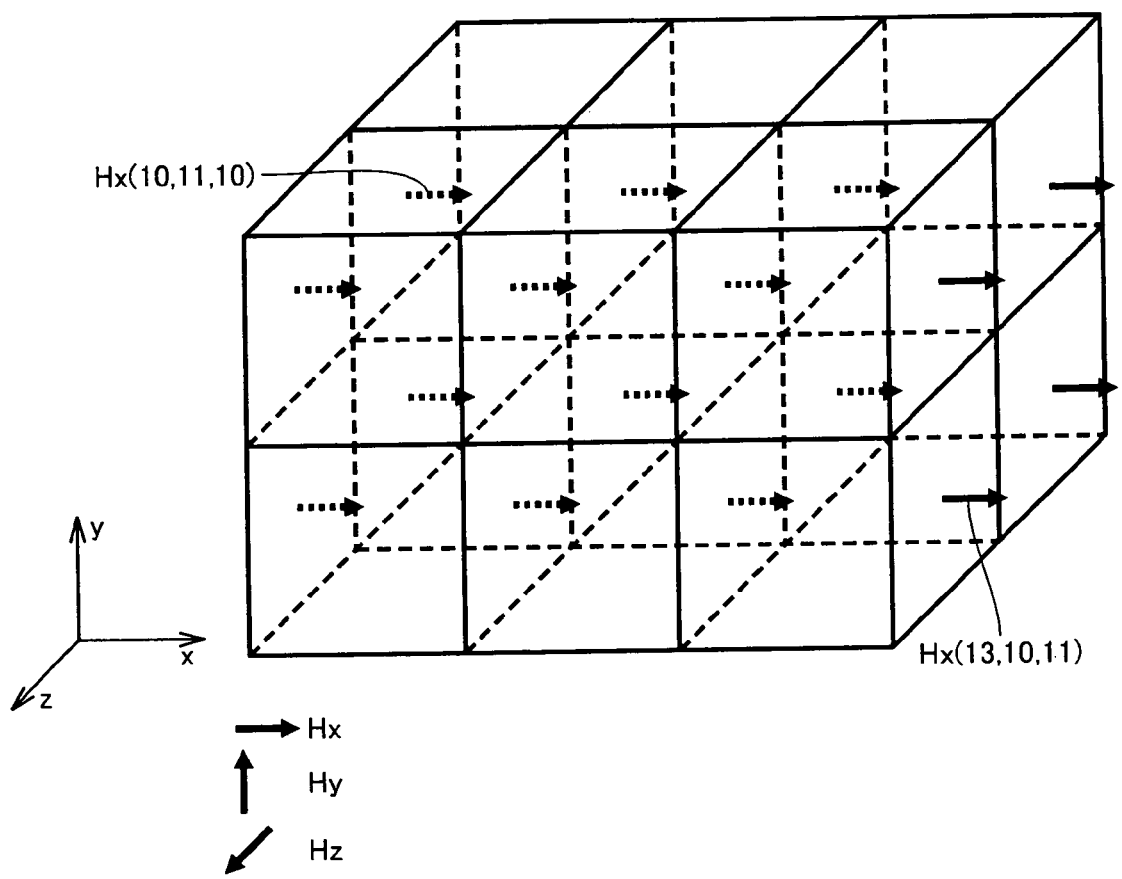
FIG. 9 is a diagram showing a conversion surface inside magnetic field variable Hx in the conversion surface shown in FIG. 5.

FIG. 9 is a diagram showing conversion surface inside magnetic field variable Hx in the conversion surface shown in FIG. 5.

Referring to FIG. 9, conversion surface inside magnetic field variable Hx(i,j,k) in the x direction will be described.

Conversion surface inside magnetic field variable Hx(i,j,k) in the x direction in the conversion surface shown in FIG. 5 is a magnetic field variable indicated by $\{Hx(i,j,k)|10 \leq i \leq 13, 10 \leq j \leq 11, 10 \leq k \leq 11\}$.

Figure 10:
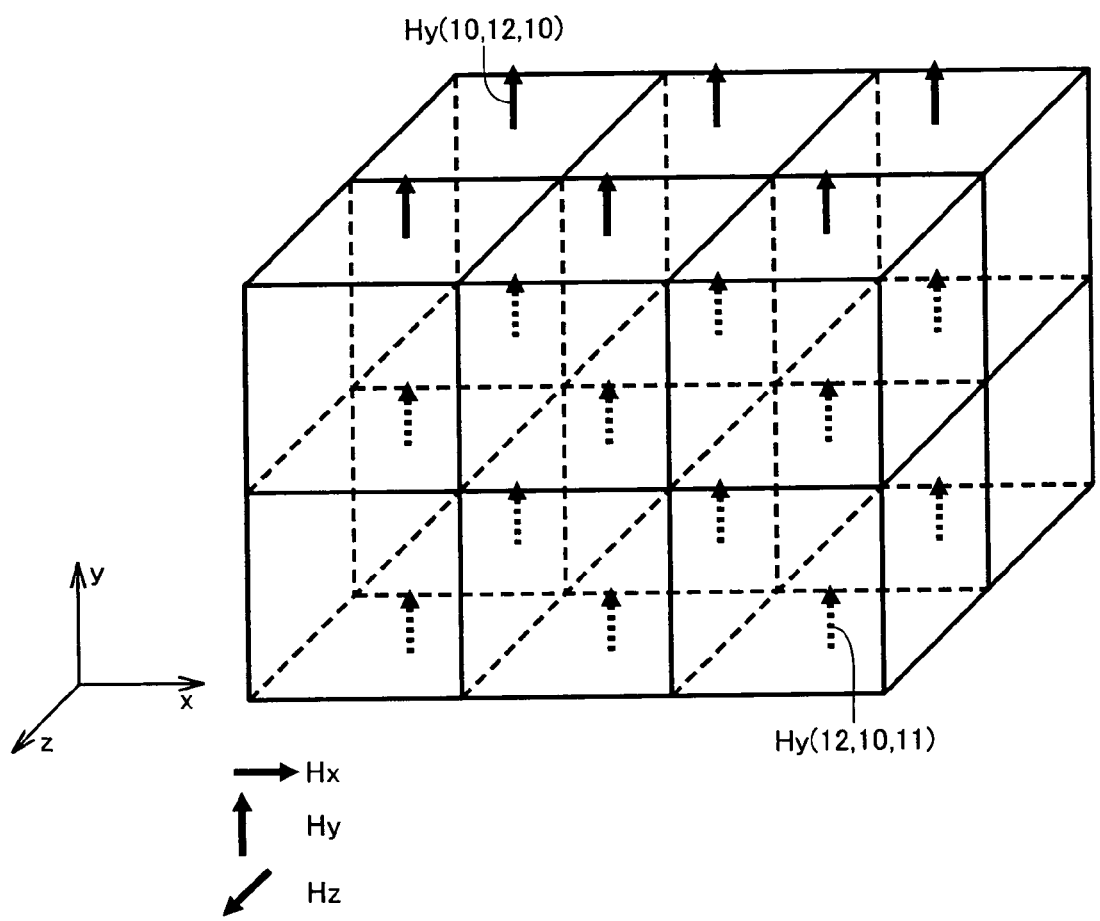
FIG. 10 is a diagram showing a conversion surface inside magnetic field variable Hy in the conversion surface shown in FIG. 5.

FIG. 10 is a diagram showing conversion surface inside magnetic field variable Hy in the conversion surface shown in FIG. 5.

Referring to FIG. 10, conversion surface inside magnetic field variable Hy(i,j,k) in the y direction will be described.

Conversion surface inside magnetic field variable Hy (i,j,k) in the y direction in the conversion surface shown in FIG. 5 is a magnetic field variable indicated by $\{Hy(i,j,k)|10 \leq i \leq 12, 10 \leq j \leq 12, 10 \leq k \leq 11\}$.

Figure 11:
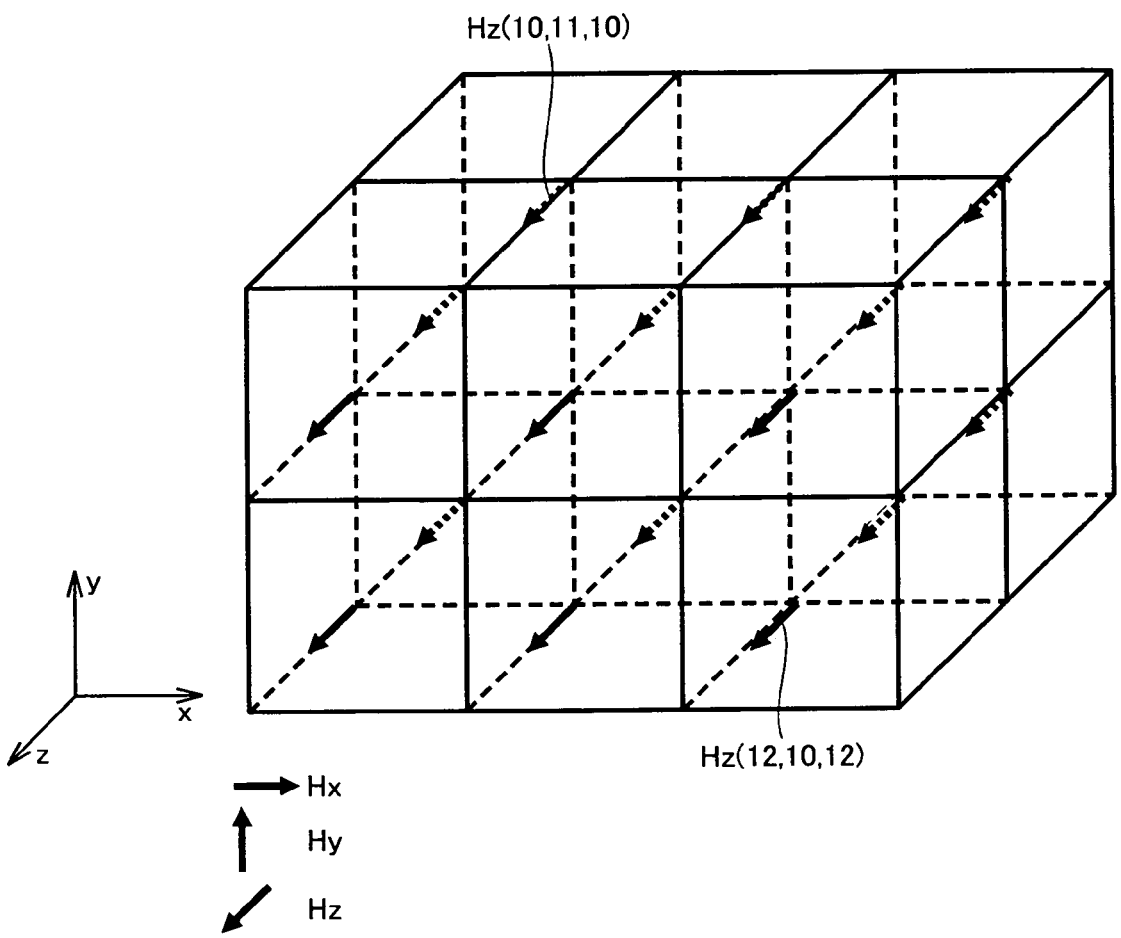
FIG. 11 is a diagram showing a conversion surface inside magnetic field variable Hz in the conversion surface shown in FIG. 5.

FIG. 11 is a diagram showing conversion surface inside magnetic field variable Hz in the conversion surface shown in FIG. 5.

Referring to FIG. 11, conversion surface inside magnetic field variable Hz(i,j,k) in the z direction will be described.

Conversion surface inside magnetic field variable Hz (i,j,k) in the z direction in the conversion surface shown in FIG. 5 is a magnetic field variable indicated by {Hz(i,j,k)|10≦i≦12, 10≦j≦11, 10≦k≦12}.

Moreover, the conversion surface outside magnetic field variables in the conversion surface shown in FIG. 5 are magnetic field variables other than the above-mentioned conversion surface inside magnetic field variables among all the magnetic field variables in the analysis space.

FIGS. 12A to 12C are diagrams each showing an electric field variable and four magnetic field variables existing closest to the same. FIG. 12A shows four magnetic field variables existing closest to electric field variable Ex in the x direction, FIG. 12B shows four magnetic field variables existing closest to electric field variable Ey in the y direction, and FIG. 12C shows four magnetic field variables existing closest to electric field variable Ez in the z direction.

Referring to FIGS. 12A to 12C, the electric field variables on the conversion surface will be described.

Electric field variable Ex on the conversion surface is an electric field variable, where either of closest magnetic fields Hy, Hz shown in FIG. 12A is a conversion surface outside magnetic field variable, in the conversion surface inside electric field variable Ex(i,j,k) (where 10≦i≦12, 10≦j≦12, 10≦k≦12) shown in FIG. 6. Its indexes (i,j,k) are listed as follows:

(10,10,10),(11,10,10),(12,10,10),
(10,10,11),(11,10,11),(12,10,11),
(10,10,12),(11,10,12),(12,10,12),
(10,11,10),(11,11,10),(12,11,10),
(10,11,12),(11,11,12),(12,11,12),
(10,12,10),(11,12,10),(12,12,10),
(10,12,11),(11,12,11),(12,12,11),
(10, 12,12),(11,12,12),(12,12,12)

The electric field variables with the above-listed 24 indexes are electric field variable Ex on the conversion surface in the conversion surface shown in FIG. 5. That is, in conversion surface inside electric field variable Ex(i,j,k) shown in FIG. 6, ones with other indexes than (10,11,11),(11,11,11),(12,11,11) are electric field variable Ex on the conversion surface.

Electric field variable Ey on the conversion surface is an electric field variable, where either of closest magnetic fields Hx, Hz shown in FIG. 12B is a conversion surface outside magnetic field variable, in the conversion surface inside electric field variable Ey(i,j,k) (where 10≦i≦13, 10≦j≦11, 10≦k≦12) shown in FIG. 7. Its indexes (i,j,k) are listed as follows:

(10,10,10),(11,10,10),(12,10,10),(13,10,10),
(10,10,11),(13,10,11),
(10,10,12),(11,10,12),(12,10,12),(13,10,12),
(10,11,10),(11,11,10),(12,11,10),(13,11,10),
(10,11,11),(13,11,11),
(10,11,12),(11,11,12),(12,11,12),(13,11,12)

The electric field variables with the above-listed 20 indexes are electric field variable Ey on the conversion surface in the conversion surface shown in FIG. 5. That is, in conversion surface inside electric field variable Ey(i,j,k) shown in FIG. 7, ones with other indexes than (11,10,11),(12,10,11),(11,11,11),(12,11,11) are electric field variable Ey on the conversion surface.

Electric field variable Ez on the conversion surface is an electric field variable, where either of closest magnetic fields Hx, Hy shown in FIG. 12C is a conversion surface outside magnetic field variable, in the conversion surface inside electric field variable Ez(i,j,k) (where 10≦i≦13, 10≦j≦12, 10≦k≦11) shown in FIG. 8. Its indexes (i,j,k) are listed as follows:

(10,10,10),(11,10,10),(12,10,10),(13,10,10),
(10,10,11),(11,10,11),(12,10,11),(13,10,11),
(10,11,10),(13,11,10),
(10,11,11),(13,11,11),
(10,12,10),(11,12,10),(12,12,10),(13,12,10),
(10,12,11),(11,12,11),(12,12,11),(13,12,11)

The electric field variables with the above-listed 20 indexes are electric field variable Ez on the conversion surface in this conversion surface. That is, in conversion surface inside electric field variable Ez(i,j,k) shown in FIG. 8, ones with other indexes than (11,11,10),(12,11,10),(11,11,11), (12,11,11) are electric field variable Ez on the conversion surface.

Figures 13A, 13B, 13C:
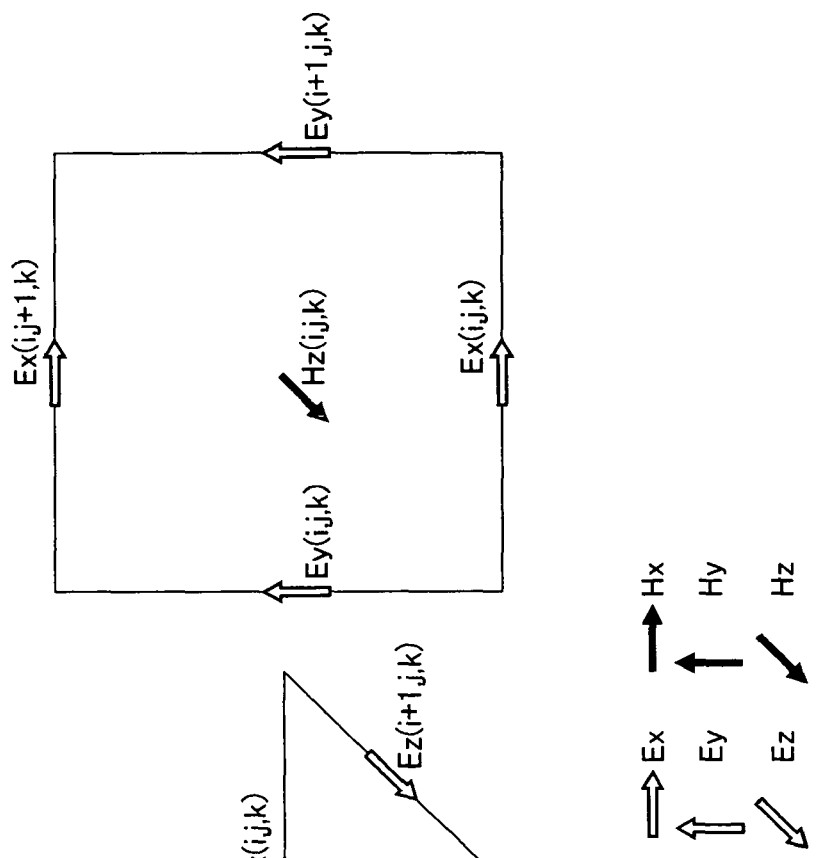
FIGS. 13A to 13C are diagrams each showing a magnetic field variable and four electric field variables existing closest to the same.

FIGS. 13A to 13C are diagrams each showing a magnetic field variable and four electric field variables existing closest to the same. FIG. 13A shows four electric field variables existing closest to magnetic field variable Hx in the x direction, FIG. 13B shows four electric field variables existing closest to magnetic field variable Hy in the y direction, and FIG. 13C shows four electric field variables existing closest to magnetic field variable Hz in the z direction.

Referring to FIGS. 13A to 13C, the magnetic field variables close to the conversion surface will be described.

As shown in FIG. 13A, magnetic field variable Hx close to the conversion surface is a magnetic field variable that is the closest to electric field variable Ey on the conversion surface and a magnetic field variable that is the closest to electric field variable Ez on the conversion surface, in the conversion surface outside magnetic field variable Hx.

FIG. 14 is a diagram showing magnetic field variable Hx close to the conversion surface in the conversion surface shown in FIG. 5.

Referring to FIG. 14, 16 indexes (i,j,k) of magnetic field variable Hx closest to electric field variable Ey on the conversion surface are listed as follows:

(10,10,9),(11,10,9),(12,10,9),(13,10,9),
(10,10,12),(11,10,12),(12,10,12),(13,10,12),
(10,11,9),(11,11,9),(12,11,9),(13,11,9),
(10,11,12),(11,11,12),(12,11,12),(13,11,12)

Moreover, 16 indexes (i,j,k) of magnetic field variable Hx closest to electric field variable Ez on the conversion surface are listed as follows:

(10,9,10),(11,9,10),(12,9,10),(13,9,10),
(10,9,11),(11,9,11),(12,9,11),(13,9,11),
(10,12,10),(11,12,10),(12,12,10),(13,12,10),
(10,12,11),(11,12,11),(12,12,11),(13,12,11)

That is, a total of 32 magnetic field variables as mentioned above are magnetic field variable Hx close to the conversion surface in the conversion surface shown in FIG. 5.

As shown in FIG. 13B, magnetic field variable Hy close to the conversion surface is a magnetic field variable that is the closest to electric field variable Ex on the conversion surface and a magnetic field variable that is the closest to electric field variable Ez on the conversion surface, in the conversion surface outside magnetic field variable Hy.

Figure 15:
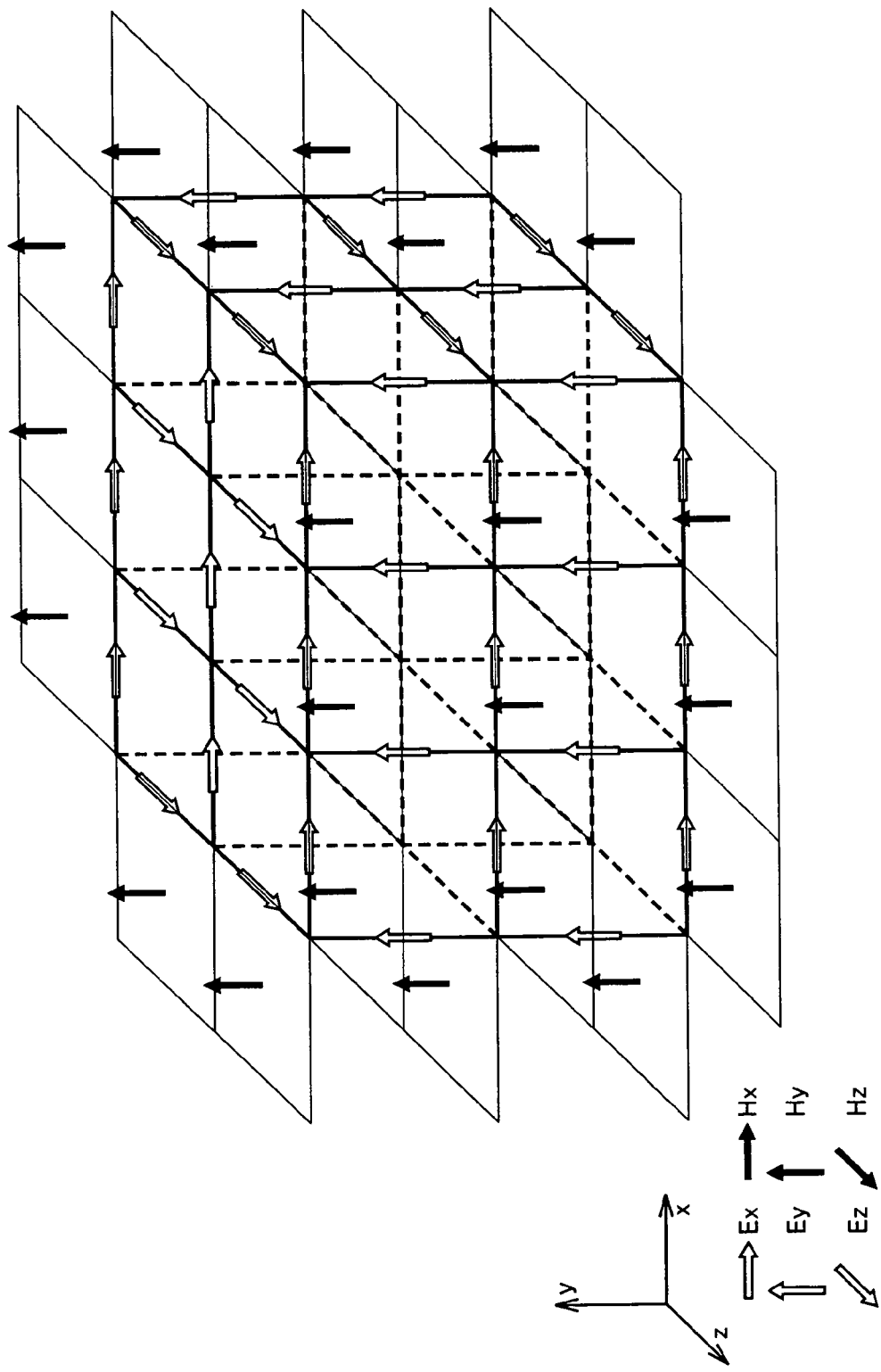
FIG. 15 is a diagram showing a magnetic field variable Hy close to the conversion surface in the conversion surface shown in FIG. 5.

FIG. 15 is a diagram showing magnetic field variable Hy close to the conversion surface in the conversion surface shown in FIG. 5.

Referring to FIG. 15, 18 indexes (i,j,k) of magnetic field variable Hy closest to electric field variable Ex on the conversion surface are listed as follows:
(10,10,9),(11,10,9),(12,10,9),
(10,10,12),(11,10,12),(12,10,12),
(10,11,9),(11,11,9),(12,11,9),
(10,11,12),(11,11,12),(12,11,12),
(10,12,9),(11,12,9),(12,12,9),
(10,12,12),(11,12,12),(12,12,12)

Moreover, 12 indexes (i,j,k) of magnetic field variable Hy closest to electric field variable Ez on the conversion surface are listed as follows:
(9,10,10),(13,10,10),
(9,10,11),(13,10,11),
(9,11,10),(13,11,10),
(9,11,11),(13,11,11),
(9,12,10),(13,12,10),
(9,12,11),(13,12,11)

That is, a total of 30 magnetic field variables as mentioned above are magnetic field variable Hy close to the conversion surface in the conversion surface shown in FIG. 5.

As shown in FIG. 13C, magnetic field variable Hz close to the conversion surface is a magnetic field variable that is the closest to electric field variable Ex on the conversion surface and a magnetic field variable that is closest to electric field variable By on the conversion surface, in the conversion surface outside magnetic field variable Hz.

Figure 16:
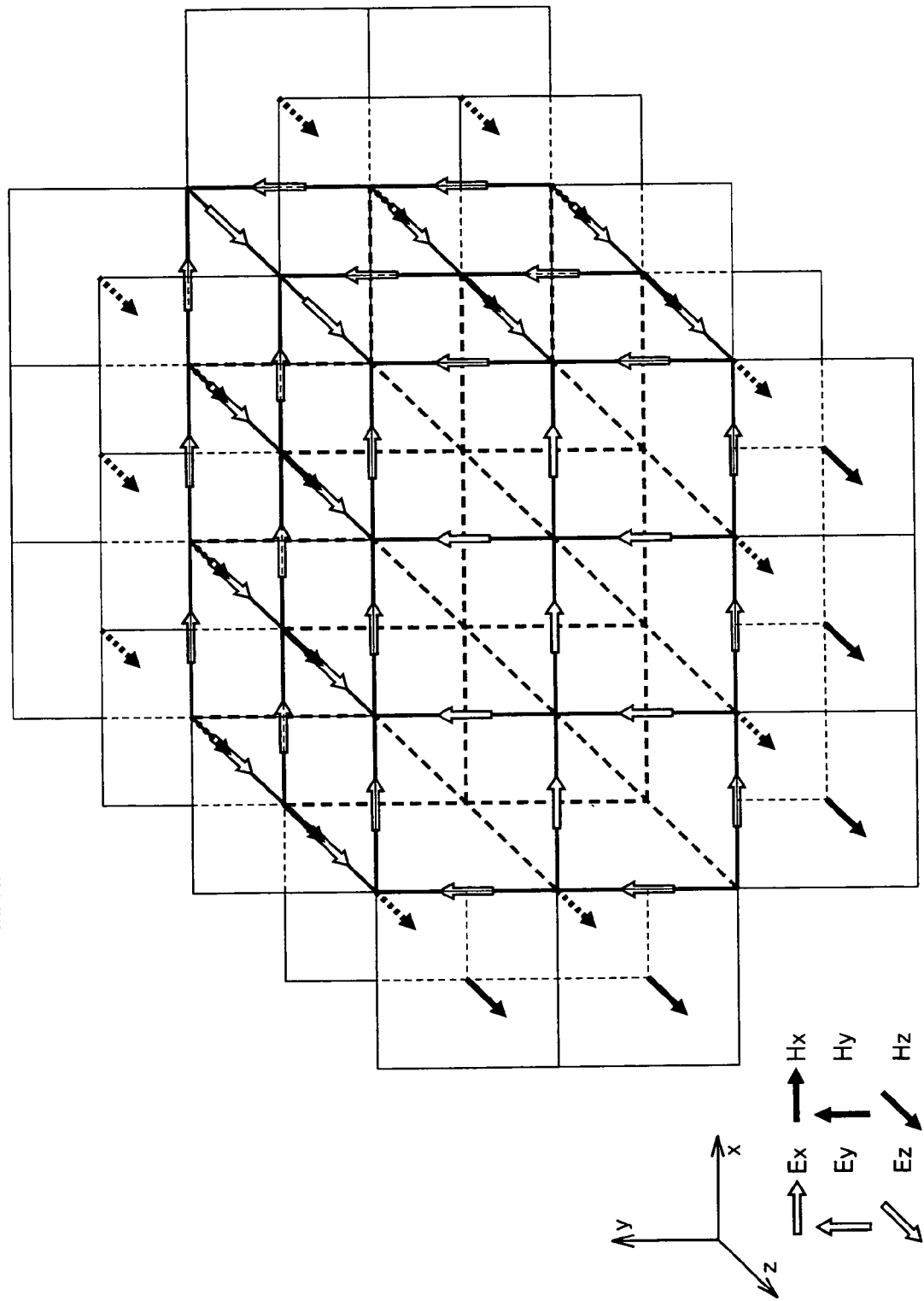
FIG. 16 is a diagram showing a magnetic field variable Hz close to the conversion surface in the conversion surface shown in FIG. 5.

FIG. 16 is a diagram showing magnetic field variable Hz close to the conversion surface in the conversion surface shown in FIG. 5.

Referring to FIG. 16, 18 indexes (i,j,k) of magnetic field variable Hz closest to electric field variable Ex on the conversion surface are listed as follows:
(10,9,10),(11,9,10),(12,9,10),
(10,9,22),(11,9,11),(12,9,11),
(10,9,12),(11,9,12),(12,9,12),
(10,12,10),(11,12,10),(12,12,10),
(10,12,11),(11,12,11),(12,12,11),
(10,12,12),(11,12,12),(12,12,12)

Moreover, 12 indexes (i,j,k) of magnetic field variable Hy closest to electric field variable Ey on the conversion surface are listed as follows:
(9,10,10),(13,10,10),
(9,10,11),(13,10,11),
(9,10,12),(13,10,12),
(9,11,10),(13,11,10),
(9,11,11),(13,11,11),
(9,11,12),(13,11,12)

That is, a total of 30 magnetic field variables as mentioned above are magnetic field variable Hz close to the conversion surface in the conversion surface shown in FIG. 5.

Magnetic variables Hx, Hy, Hz close to the conversion surface as shown in FIGS. 14 to 16 are each an electric field variable, where one of the four electric field variables existing closest to the relevant magnetic field variable is the electric field variable on the conversion surface. In the case where the electric field cells in the conversion surface inside do not make up a simple rectangular parallelepiped but a projected or depressed structure, two or more of the four electric field variables existing closest can be electric field variables on the conversion surface.

Figure 17:
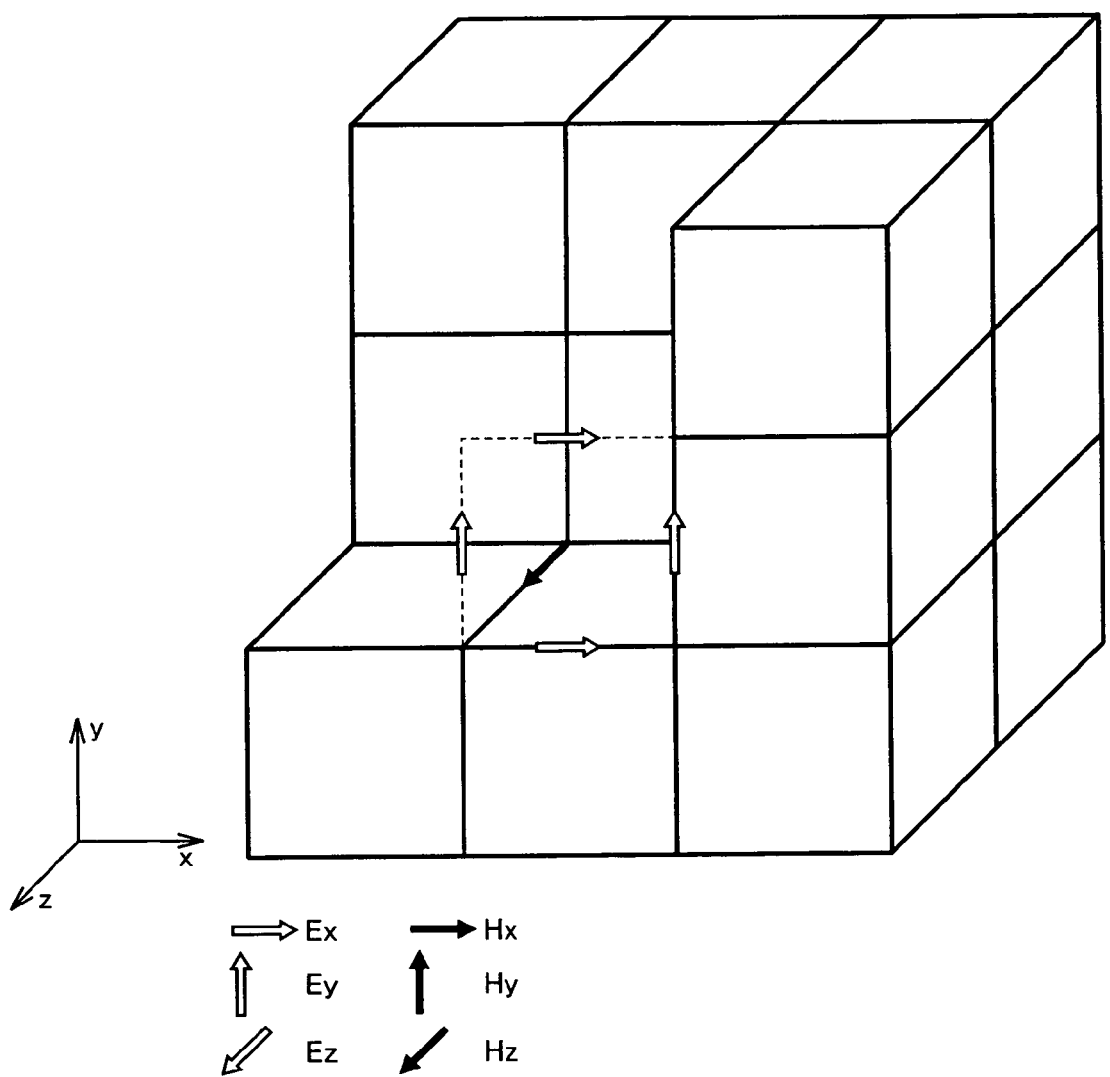
FIG. 17 is a diagram showing an example of a magnetic field variable Hz close to the conversion surface, where two of the electric field variables existing closest are electric field variables on the conversion surface.

FIG. 17 is a diagram showing an example of magnetic field variable Hz close to the conversion surface, where two of the electric field variables existing closest are electric field variables on the conversion surface.

As shown in FIG. 17, in the case where the shape that the electric field cells in the conversion surface inside make up is a projected shape, there exists magnetic field variable Hz, where two of the electric field variables existing closest are electric field variables on the conversion surface.

Figure 18:
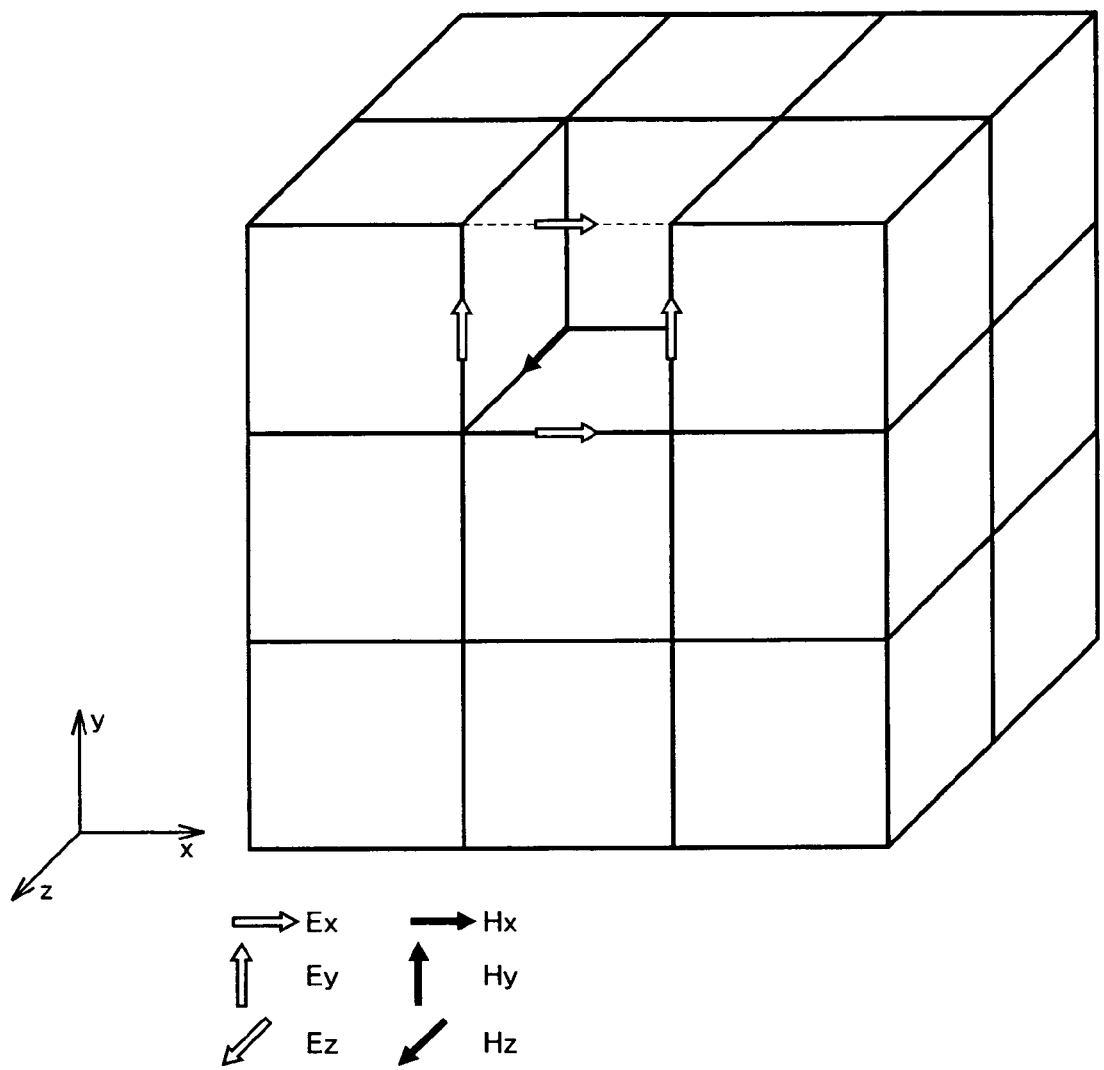
FIG. 18 is a diagram showing an example of a magnetic field variable Hz close to the conversion surface, where three of the electric field variables existing closest are electric field variables on the conversion surface.

FIG. 18 is a diagram showing an example of magnetic field variable Hz close to the conversion surface, where three of the electric field variables existing closest are electric field variables on the conversion surface.

As shown in FIG. 18, in the case where the shape that the electric field cells in the conversion surface inside make up is a depressed structure made by removing one electric field cell whose four surfaces are in contact with the electric field cells in the conversion surface inside from a rectangular parallelepiped, there exists magnetic field variable Hz, where three of the electric field variables existing closest are electric field variables on the conversion surface.

Figure 19:
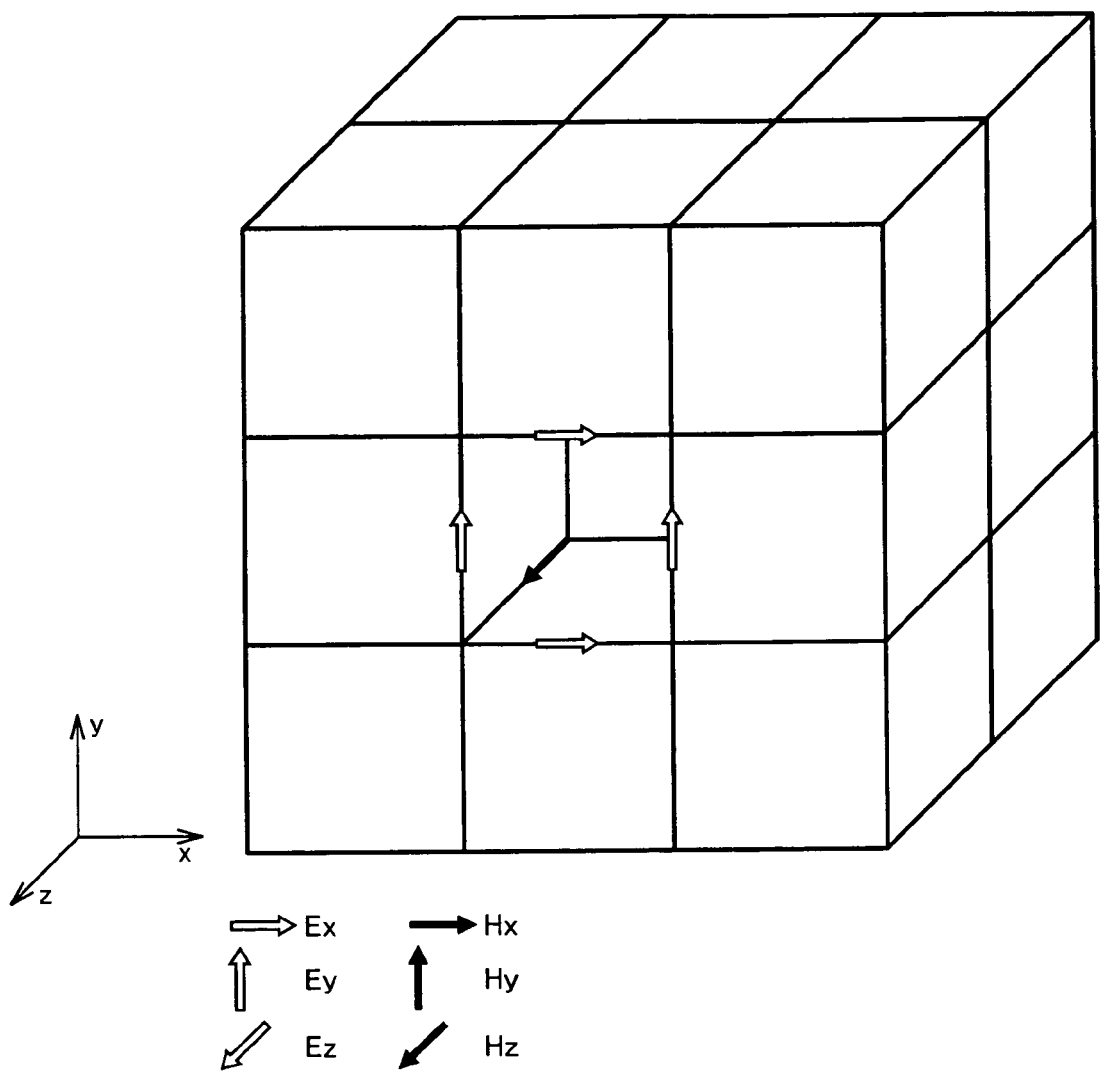
FIG. 19 is a diagram showing an example of a magnetic field variable Hz close to the conversion surface, where four of the electric field variables existing closest are electric field variables on the conversion surface.

FIG. 19 is a diagram showing an example of magnetic field variable Hz close to the conversion surface, where four of the electric field variables existing closest are electric field variables on the conversion surface.

As shown in FIG. 19, in the case where the shape that the electric field cells in the conversion surface inside make up is a depressed structure made by removing one electric field cell whose five surfaces are in contact with the electric field cells in the conversion surface inside from a rectangular parallelepiped, there exists magnetic field variable Hz, where four of the electric field variables existing closest are each an electric field variable on the conversion surface.

(2.4 Analysis Model)

Analysis models used in the EAS analysis, the IAS analysis, and the additional analysis for improving precision will be described.

Figure 20:
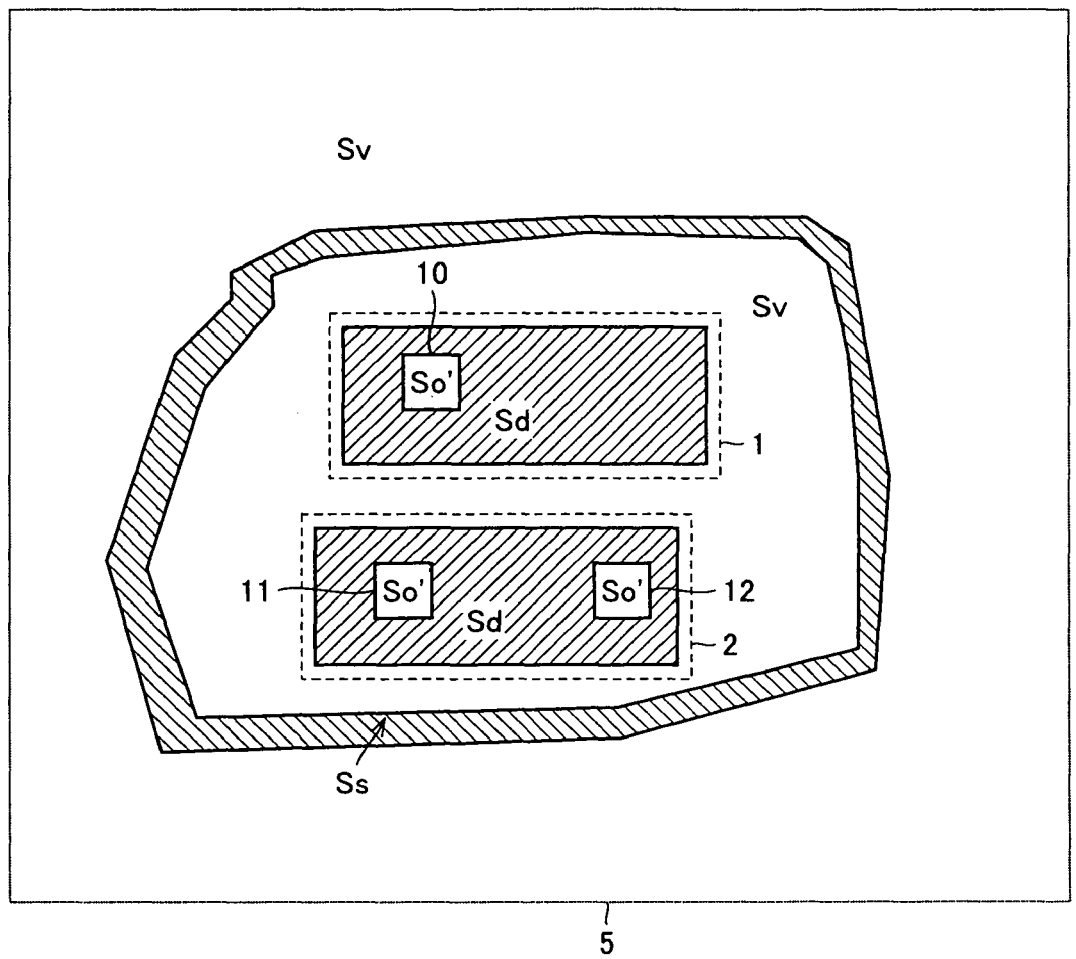
FIG. 20 is a diagram showing an EAS analysis model.

FIG. 20 is a diagram showing an EAS analysis model.

Referring to FIG. 20, the EAS analysis model in the analysis space shown in FIG. 3 will be described. In the EAS analysis, the cell size (EAS cell size) of the FDTD analysis in EAS is first determined based on the fineness of the structure of rough structural body Ss.

Next, an absorption boundary 5 such as a PML (Perfectly Matched Layer) is set outside of EAS. Based on the determined EAS cell size, the structure inside of EAS is divided into cells to determine the model for EAS analysis. At this time, since fine structural body Sd cannot be modeled in the EAS cell size with a sufficient precision, for the medium of each EAS cell, one obtained by averaging medium characteristics of the structures included inside is used for a substitute. Moreover, in place of each wave source So, a wave source So' (represented by codes 10, 11, 12) is arranged, where a waveform function given to wave source So is replaced with a function taking zero value constantly. Several conversion surfaces 1, 2 surrounding wave sources So and fine structural body Sd existing close to the same are set.

Next, the IAS analysis model will be described. In the IAS analysis, a coefficient Ra is first determined in accordance with the fineness of fine structural body Sd included in the conversion surface inside. As the IAS cell when the IAS analysis is performed is used one obtained by dividing the EAS cell into Ra pieces in the respective x, y, z directions. The time step of the IAS analysis at this time is 1/Ra of the EAS analysis from Expression (9). A value of Ra may be, for example, set uniquely by a user for each conversion surface, or the fineness of the structural body and the value of Ra may be associated with each other in advance, and based on this association, it may be set automatically.

In the IAS analysis space, wave source So and fine structural body Sd are arranged in the conversion surface inside. In the conversion surface outside, a vacuum layer and an absorption boundary are arranged as a space where nothing exists.

Figure 21:
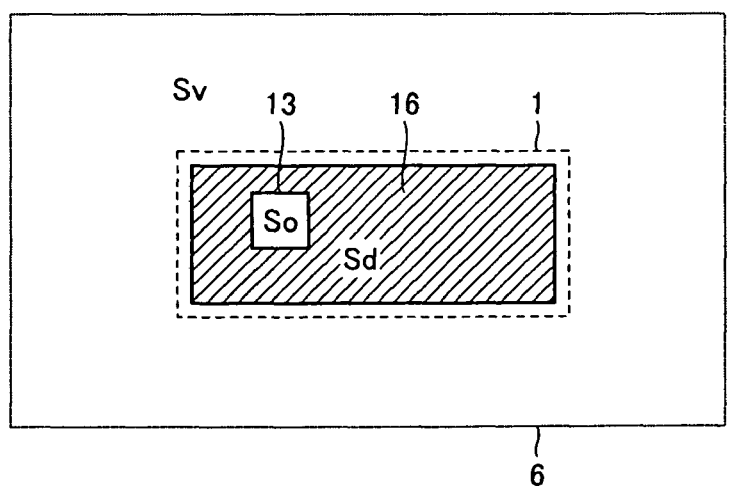
FIG. 21 is a diagram showing an IAS analysis model for calculating an electromagnetic field of a conversion surface 1.

FIG. 21 is a diagram showing an IAS analysis model for calculating an electromagnetic field of conversion surface 1.

As shown in FIG. 21, wave source So (reference numeral 13) and fine structural body Sd (reference numeral 16) are arranged inside of conversion surface 1. A vacuum layer and an absorption boundary 6 are arranged outside of conversion surface 1 as space Sv where no structural body exists.

Figure 22:
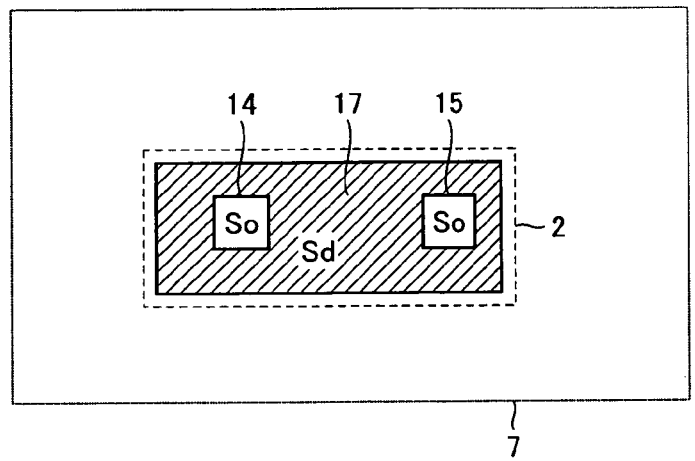
FIG. 22 is a diagram showing an IAS analysis model for calculating an electromagnetic field of a conversion surface 2.

FIG. 22 is a diagram showing an IAS analysis model for calculating an electromagnetic field of the conversion surface 2.

Figure 23:
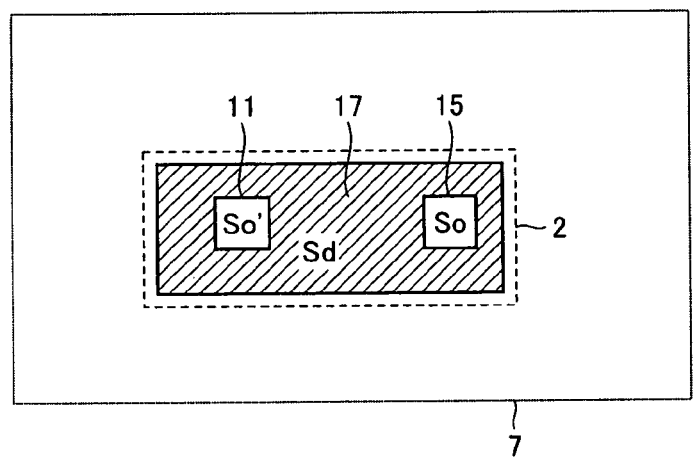
FIG. 23 is a diagram for describing an IAS analysis.

FIG. 23 is a diagram for describing the IAS analysis.

Figure 24:
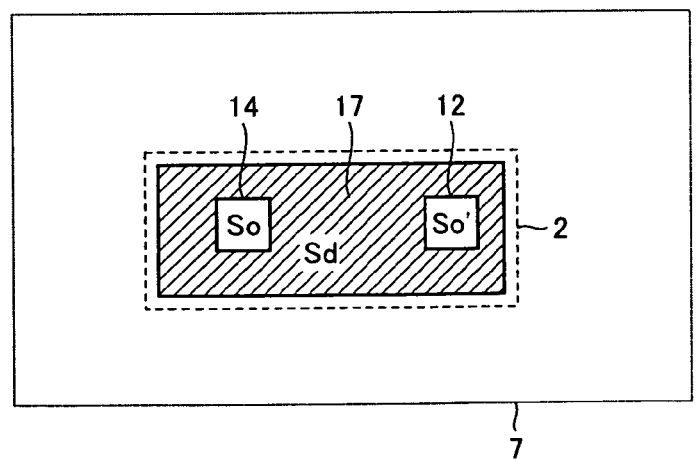
FIG. 24 is a diagram different from FIG. 23 for describing the IAS analysis.

FIG. 24 is a diagram different from FIG. 23 for describing the IAS analysis.

As shown in FIG. 22, two or more wave sources So (reference numerals 14, 15) and fine structural body Sd (reference numeral 17) are arranged inside of conversion surface 2. Moreover, a vacuum layer and an absorption boundary 7 are arranged outside of the conversion surface outside 2 as space Sv where no structural body exists.

Figure 33:
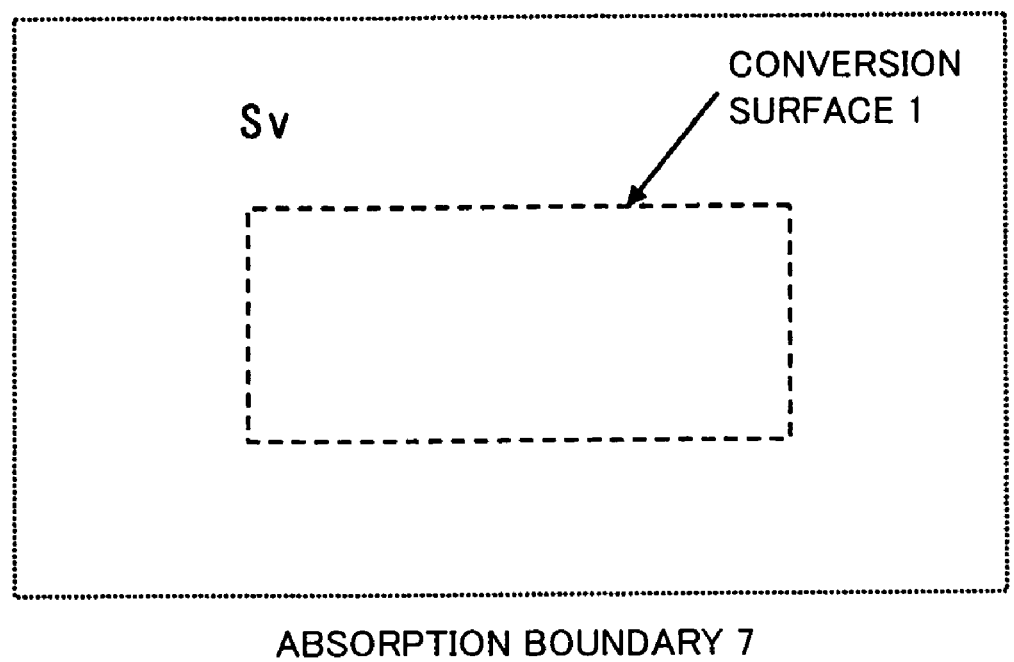
FIG. 33 is a diagram showing a model of an additional analysis for improving precision for calculating the electromagnetic field of conversion surface 1.

FIG. 33 is a diagram showing an additional analysis model in conversion surface 1 in the case where the additional analysis for improving precision is performed, as will be described later in the second embodiment. For the additional analysis model for improving precision, the same size as that of the EAS analysis is used for the cell. The vacuum layer and absorption boundary 7 are arranged in the conversion surface outside as space Sv where no structural body exists. In the additional analysis for improving precision, since the analysis is performed by the FDTD-MAS method, whatever structure is arranged in the structure in the conversion surface inside, it does not affect the calculation for the conversion surface outside. Thus, the structure in the conversion surface inside is not particularly referred to.

Here, two or more wave sources So are arranged inside of conversion surface 2. In this case, as shown FIGS. 23, 24, each wave source So (reference numerals 14, 15) is selected sequentially, and others than selected wave source So are replaced with wave source So' (reference numerals 11, 12). In this manner, the same number of IAS analysis models as the number of wave sources So are generated, and using these models, the electromagnetic fields radiated from the respective conversion surfaces can also be calculated to be synthesized at the time of EAS analysis described later.

(2.5 IAS Analysis)

In the IAS analysis, the above-described IAS analysis models are used to perform the FDTD calculation. At this time, a value of the electric field variable on the conversion surface corresponding to the electric field variable on the conversion surface in the EAS analysis, which is defined on EAS, is stored in the electric-field-on-the-conversion-surface file (IAS electric field file 132) every electric field calculation time in the EAS analysis. Moreover, if the additional analysis for improving precision is not performed, a value of the magnetic field variable close to the conversion surface corresponding to the magnetic variable close to the conversion surface in the EAS analysis, which is defined on EAS, is stored in the magnetic-field-close-to-the-conversion-surface file (IAS magnetic field file 133) every magnetic field calculation time in the EAS analysis.

Here, the corresponding electric field variables on the conversion surface and magnetic field variables close to the conversion surface, and relationships of the electric field calculation time and the magnetic field calculation time between the IAS cell and the EAS cell will be described.

As described above, the IAS cells are obtained by dividing the EAS cell into Ra pieces in the respective x, y, z directions. The time step of the IAS analysis at this time is 1/Ra of the EAS analysis from Expression (9).

Figure 25:
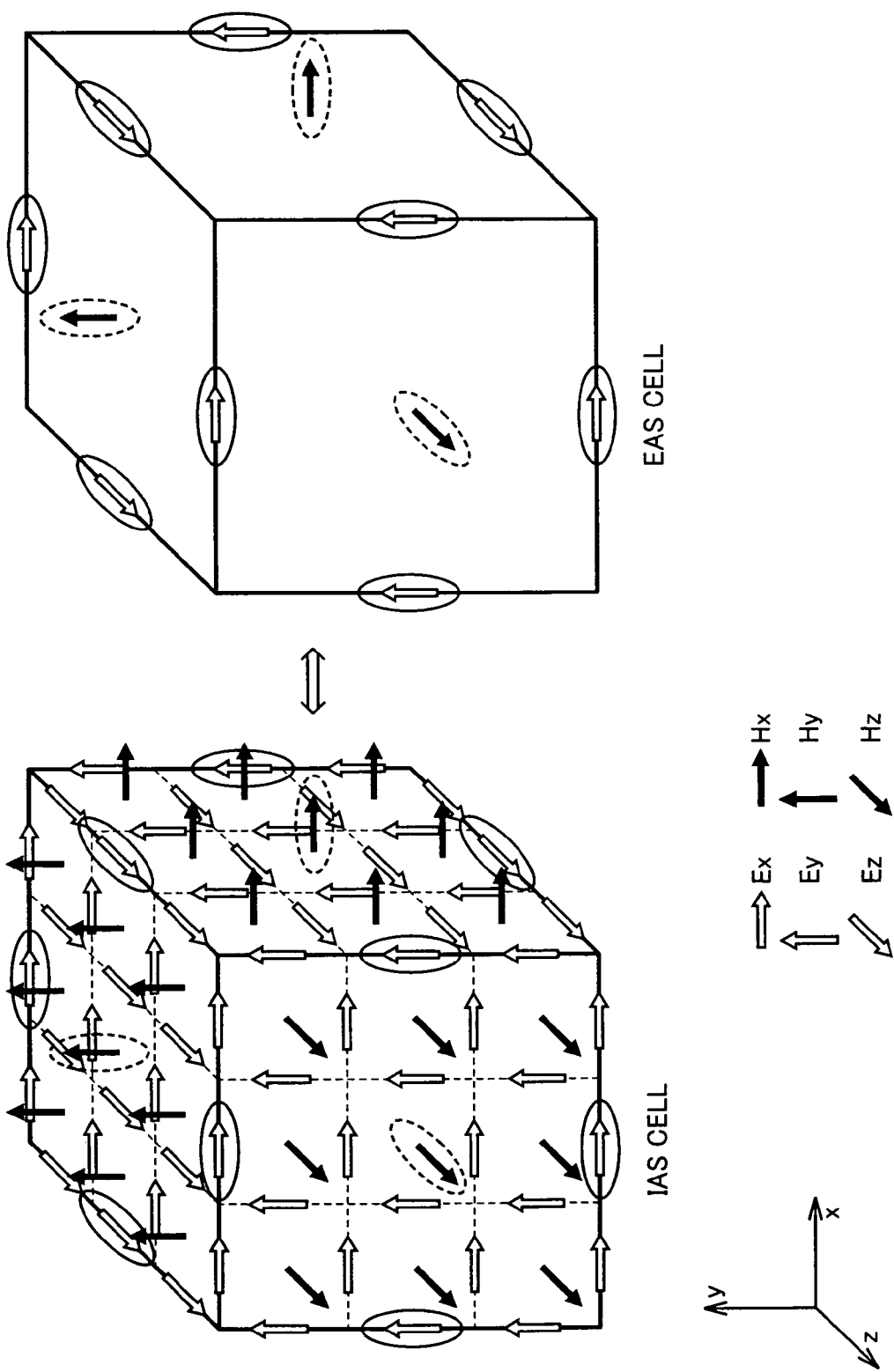
FIG. 25 is a diagram showing correspondence relationships of electric field and magnetic field variables between IAS cells and an EAS cell when Ra=3.

FIG. 25 is a diagram showing correspondence relationships between the IAS cells and the EAS cell when Ra=3 is set.

In FIG. 25, the surface of the EAS cell is the conversion surface, and the IAS cells are obtained by dividing the EAS cell into three in the x, y, z directions. Outline arrows and black arrows indicate electric field variables and magnetic field variables in these cells, respectively.

As shown in FIG. 25, if Ra is an odd number, some of the electric field variables on the conversion surface of the EAS cell and some of the electric field variables of the IAS exist in the same positions. Moreover, some of the magnetic field variables close to the conversion surface of the EAS cell, and some of the magnetic field variables of IAS exist in the same position.

Figure 26:
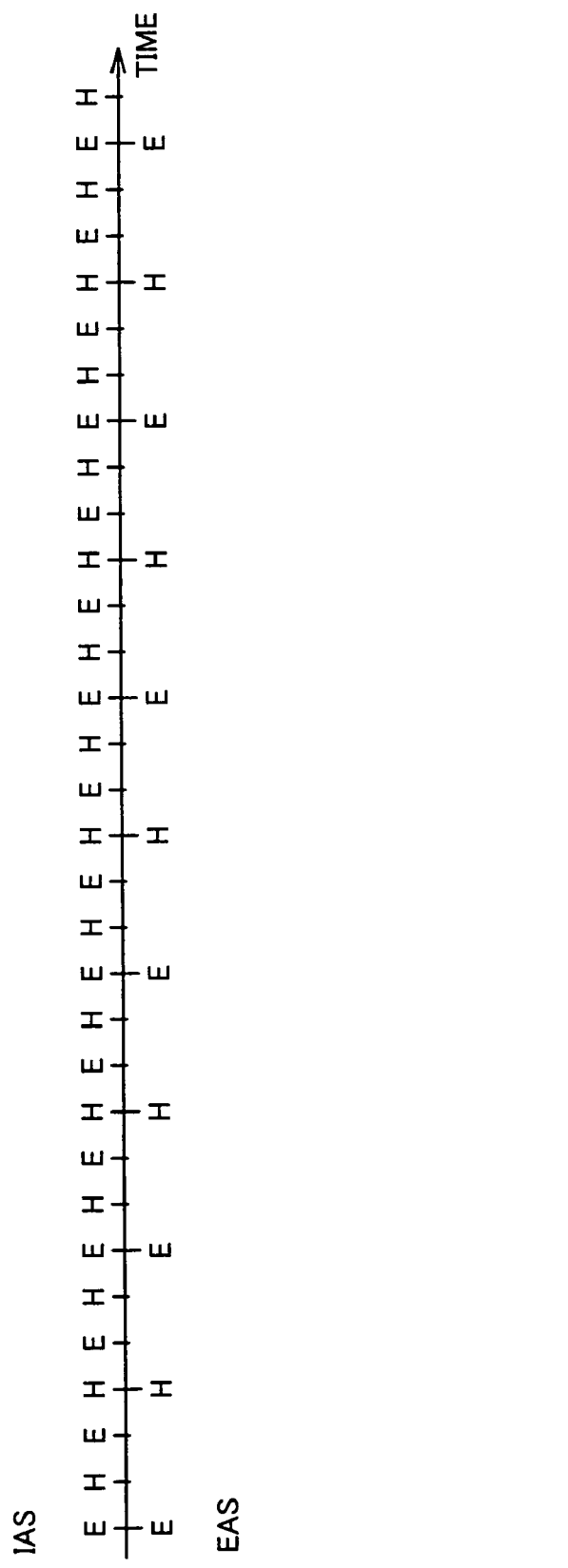
FIG. 26 is a diagram showing relationships of electric field calculation time and magnetic field calculation time between the IAS analysis and the EAS analysis when Ra=3.

FIG. 26 is a diagram showing the relationships of the electric field calculation time and the magnetic field calculation time between the IAS analysis and the EAS analysis when Ra=3 is set.

As shown in FIG. 26, if Ra is an odd number, some electric field calculation times and magnetic field calculation times in the EAS analysis and some electric field calculation times and magnetic field calculation times in the IAS analysis exist at the same time.

In this manner, if Ra is an odd number, since in both the electric field variables and the magnetic field variables, there are some existing in the same positions and at the same time, values of the electric field variables of IAS existing in the same positions and at the same time as the electric field variables on the conversion surface of EAS are stored as electric field variable values on the conversion surface, and values of the magnetic field variables of IAS existing in the same positions and at the same time as the magnetic field variables close to the conversion surface of EAS are stored as magnetic field variable values close to the conversion surface, respectively.

Figure 27:
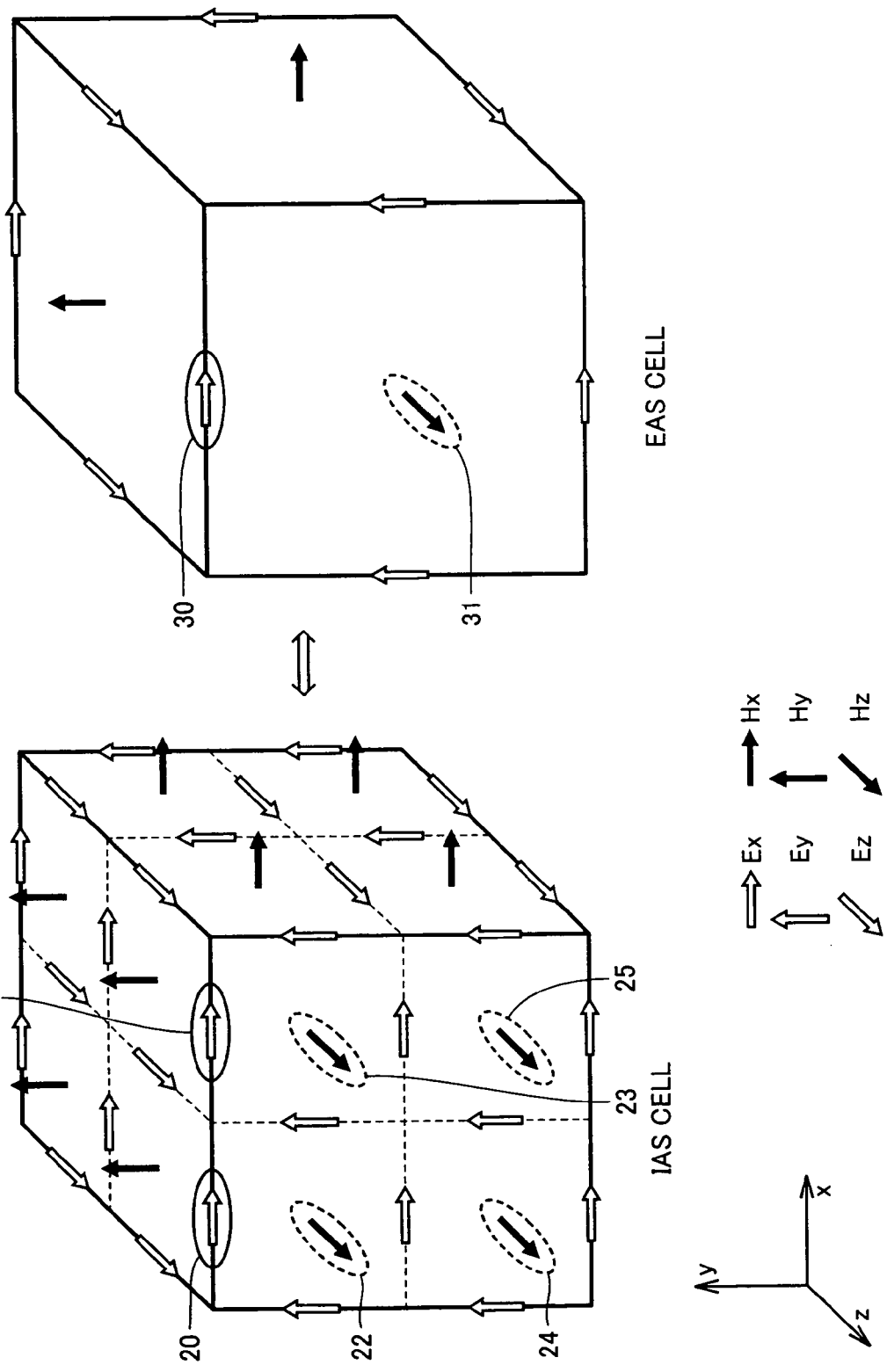
FIG. 27 is a diagram showing correspondence relationships of electric field and magnetic field variables between IAS cells and an EAS cell when Ra=2.

FIG. 27 is a diagram showing correspondence relationships between the IAS cells and the EAS cell when Ra=2 is set.

In FIG. 27, the surface of the EAS cell is the conversion surface, and the IAS cells are obtained by dividing the EAS cell into two in the x, y, z directions. Outline arrows and black arrows indicate electric field variables and magnetic field variables in these cells, respectively.

As shown in FIG. 27, if Ra is an even number, no electric field variable on the conversion surface of the EAS cell and no electric field variable of IAS exist in the same position. Moreover, no magnetic field variable close to the conversion surface of the EAS cell and no magnetic field variable of IAS exist in the same position.

Figure 28:
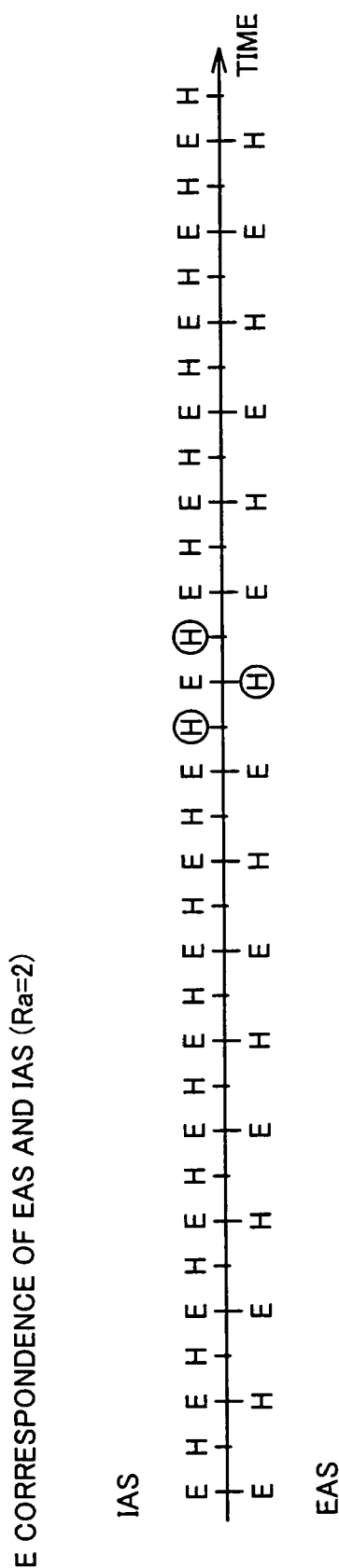
FIG. 28 is a diagram showing relationships of electric field calculation time and magnetic field calculation time between the IAS analysis and the EAS analysis when Ra=2.

FIG. 28 is a diagram showing the relationships of the electric field calculation time and the magnetic field calculation time between the IAS analysis and the EAS analysis when Ra=2 is set.

As shown in FIG. 28, if Ra is an even number, no magnetic field variable is calculated at the same time in the EAS analysis and the IAS analysis.

In this manner, if Ra is an even number, no electric field variable exists in the same position in the EAS analysis and the IAS analysis, and no magnetic field variable exists in the same position and at the same time. Therefore, an average of the two close electric field variables in the IAS cells is stored as the electric field variable value on the conversion surface.

For example, an average value of electric field variables 20, 21 is a value of an electric field variable 30 on the conversion surface in the EAS cell.

As a magnetic field variable value close to the conversion surface, an average of four close magnetic field variables in the IAS cells is stored. For example, an average value of magnetic field variables 22, 23, 24, 25 is stored as a value of a magnetic field variable 31 close to the conversion surface. Moreover, an average of magnetic field variable values at continuous two times is a magnetic field variable value in the EAS analysis. That is, an average of a total of 8 values of four close magnetic field values at the previous time and four close magnetic field values at the subsequent time is stored as the magnetic field variable value close to the conversion surface.

Next, the additional analysis for improving precision will be described.

In the additional analysis for improving precision, using the above-described additional analysis model for improving precision, the analysis calculation is performed by the FDTD-MAS method. A value of the magnetic field variable close to the conversion surface corresponding one to one to the magnetic field variable close to the conversion surface in the EAS analysis is stored in the magnetic-field-close-to-the-conversion-surface file (IAS magnetic field file 133) every magnetic field calculation time in the EAS analysis.

(2.6 EAS Analysis)

Next, the EAS analysis will be described.

The analysis in the FDTD method has linearity as described in the above section (2.1). Therefore, in the EAS analysis, if a waveform of a wave source in the analysis condition used in the IAS analysis is subjected to the conversion for keeping the linearity indicated by the following expression (10), the value of the electric field variable on the conversion surface becomes one obtained by subjecting the value stored in IAS electric field file 132 for storing the electric field variable value on the conversion surface to the conversion indicated by Expression (10). Moreover, the value of the magnetic field variable close to the conversion surface becomes one obtained by subjecting the value stored in IAS magnetic field file 133 for storing the magnetic field variable value close to the conversion surface to the conversion indicated by Expression (10).

$$f'(t)=\alpha f(t-t0) \quad (10)$$

where t is a present analysis time, t0 is a value that is a non-negative integral multiple of the time step in the EAS, and $\alpha$ is an arbitrary real number. If $t-t0 \leq 0$, $f(t)=0$.

Moreover, if different wave sources inside of the same conversion surface are induced simultaneously, the electric field variable value on the conversion surface and the magnetic field variable value close to the conversion surface are also calculated in a linear sum of the electric field values on the conversion surface and the magnetic field values close to the conversion surface after the conversion indicated by Expression (10).

In this manner, in each of the conversion surfaces, by performing the linear conversion from the values stored in IAS electric field file 132, and IAS magnetic field file 133, electric field variable value u0 on the conversion surface and magnetic field variable value u0 close to the conversion surface on the assumption that there exists neither structural body nor wave source in the conversion surface outside can be calculated.

In the EAS analysis, as shown in FIG. 1, for the conversion surface outside electric field variable and the conversion surface outside magnetic field variable, the entire electromagnetic field distribution (electromagnetic field value) u is calculated in view of a structural body and a wave source in the conversion surface outside. Moreover, as for the conversion surface inside electric field variable and conversion surface inside magnetic field variable, error distribution e between entire electromagnetic field distribution u and electromagnetic field distribution u0 on the conversion surface and close to the conversion surface on the assumption that there are no structural body, wave source and the like in the conversion surface outside is calculated.

If there are a plurality of conversion surfaces, for all the outside electric field variables of all the conversion surfaces and the outside magnetic field variables of all the conversion surfaces, entire electromagnetic field distribution u is calculated. In the following description, with a conversion surface r, an electromagnetic field distribution in the conversion surface inside, on the conversion surface, and close to the conversion surface on the assumption that there exists neither structural body nor wave source in the conversion surface outside is represented by u0 (r), an error distribution between entire electromagnetic field distribution u and electromagnetic field distribution u0(r) is represented by e(r).

Hereinafter, a calculation method will be described.

(Initial State)

In an initial state (time t<0), for all the values of the electromagnetic field variables, $u0(r)=u=e(r)=0$. At this time, for all the conversion surfaces r, a relationship indicated by the following expression (11) is established between the electromagnetic field distributions, u, u0(r), e(r).

$$u=u0(r)+e(r) \quad (11)$$

Moreover, a variable n representing a time on a time step $\Delta t$ basis is initialized to zero.

(Electric Field Calculation)

The calculation of an electric field value at a time $t=n\Delta t$ is performed.

First, for the conversion surface inside electric field variable of each conversion surface r, an electric field variable value $E^n(e(r))$ of error distribution e(r) is calculated as follows, where an error component caused in the electromagnetic field distribution closest to the conversion surface by the influence resulting from performing the EAS analysis on the assumption that there are a structural body and the like in the conversion surface outside is a wave source.

To calculate electric field variable value $E^n(e(r))$, as seen from Expression (3) and the like, a magnetic field variable value close to the conversion surface $H^{n-1/2}(e(r))$, a magnetic field variable value in the conversion surface inside $N^{n-1/2}(e(r))$ at time $t=(n-\frac{1}{2})\Delta t$, and an electric field variable value in the conversion surface inside $E^{n-1}(e(r))$ at the time $t=(n-1/)\Delta t$ are required.

Here, it is assumed that at or before the last time $t=(n-\frac{1}{2})\Delta t$, the above-described expression (11) is established. Since it is assumed that Expression (11) is established, the electric field variables other than the electric field variables on the conversion surface among the conversion surface inside electric field variables can be calculated by the normal FDTD method, because all the close magnetic fields exist in the conversion surface inside. For the conversion surface inside magnetic field variables, the foregoing is true. Therefore, magnetic field variable value close to the conversion surface $H^{n-1/2}(e(r))$ at time $t=(n-\frac{1}{2})\Delta t$ needs to be found.

Now, since it is assumed that Expression (11) is established, the following expression (12) is established among a magnetic field variable value close to the conversion surface $H^{n-1/2}$ (u), a magnetic field variable value close to the conversion surface $H^{n-1/2}(u0(r))$, and magnetic field variable value close to the conversion surface $H^{n1/2}(e(r))$ at time $t=(n-\frac{1}{2})\Delta t$.

$$H^{n-1/2}(u)=H^{n-1/2}(u0(r))+H^{n-1/2}(e(r)) \quad (12)$$

Here, magnetic field variable value close to the conversion surface $H^{n-1/2}(u0(r))$ is a value stored as the magnetic field value close to conversion surface in the IAS analysis. Moreover, magnetic field variable value close to the conversion surface $H^{n-1/2}(u)$ is entire electromagnetic field distribution u calculated at time $t=(n-\frac{1}{2})\Delta t$. Accordingly, magnetic field variable value close to the conversion surface $H^{n-1/2}(e(r))$ can be calculated from the following expression (13) derived from Expression (12).

$$H^{n-1/2}(e(r))=H^{n-1/2}(u)-H^{n-1/2}(u0(r)) \quad (13)$$

Thereby, as described above, $E''(e(r))$ is calculated by Expressions (3), (4), (5).

Next, for all the conversion surface outside electric field variables, an electric field variable value $E''(u)$ is calculated in view of the structural body and the wave source in the conversion surface outside. Since the magnetic field variables close to these electric field variables are conversion surface outside magnetic field variables in all the conversion surfaces, conversion surface outside magnetic field variable $H^{n-1/2}(u)$ is fixed at last time $t=(n-\frac{1}{2})\Delta t$. Using these values, $E''(u)$ is calculated by Expressions (3), (4), (5).

With the calculation as described above, if at time $t=(n-\frac{1}{2})\Delta t$, Expression (11) is established, Expression (11) is also established at time $t=n\Delta t$.

(Magnetic Field Calculation)

The calculation of a magnetic field value at a time $t=(n+\frac{1}{2})\Delta t$ is performed.

First, for the conversion surface inside magnetic field variable of each conversion surface r, a magnetic field variable value $H^{n+1/2}(e(r))$ of error distribution $e(r)$ is calculated, where an error component caused in the electromagnetic field distribution closest to the conversion surface by the influence resulting from performing the EAS analysis on the assumption that there are a structural body and the like in the conversion surface outside is a wave source. Since the electric field variables closest to these magnetic field variables are conversion surface inside electric field variables in all the conversion surfaces, conversion surface inside electric field variable $E''(e(r))$ is fixed at last time $t=n\Delta t$.

Using these values, $H^{n+1/2}(e(r))$ is calculated by Expressions (6), (7), (8).

Next, for all the conversion surface outside magnetic field variables, magnetic field variable value $H^{n+1/2}(u)$, which is a value in view of the structural body and the wave source in the conversion surface outside, is calculated. In order to calculate magnetic field variable value $H^{n+1/2}(u)$, as seen from Expression (6) and the like, an electric field value on the conversion surface $E''(u)$, conversion surface outside electric field variable value $E''(u)$ in all the conversion surfaces at time $t=n\Delta t$, and conversion surface outside magnetic field variable value $H^{n-1/2}(u)$ in all the conversion surfaces at time $t=(n-\frac{1}{2})\Delta t$ are required.

Here, it is assumed that at or before last time $t=n\Delta t$, the above-described expression (11) is established. Since it is assumed that Expression (11) is established, the magnetic field variables other than the magnetic field variables close to the conversion surface among the conversion surface outside magnetic field variables can be calculated by the normal FDTD method, because all the close electric fields exist in the conversion surface outside. For the conversion surface outside electric field variables, the foregoing is true. Therefore, electric field variable value on the conversion surface $E''(u)$ at time $t=n\Delta t$ needs to be found.

Now, since it is assumed that Expression (11) is established, at time $t=n\Delta t$, the following expression (14) is established among an electric field variable value on the conversion surface $E''(u0(r))$, electric field variable value on the conversion surface $E''(e(r))$, and electric field variable value on the conversion surface $E''(u)$.

$$E''(u)=E''(u0(r))+E''(e(r)) \quad (14)$$

Here, electric field variable value on the conversion surface $E''(u0(r))$ is a value stored as the electric field value on the conversion surface in the IAS analysis. Moreover, electric field variable value on the conversion surface $E''(e(r))$ is calculated in the electric field calculation at time $t=n\Delta t$. Accordingly, electric field variable value on the conversion surface $E''(u)$ can be calculated from Expression (14).

Thereby, as described above, $H^{n+1/2}(u)$ is calculated by Expressions (6), (7), (8) as described above.

With the calculation as described above, if at time $t=(n-\frac{1}{2})\Delta t$, Expression (11) is established, Expression (11) is also established at time $t=n\Delta t$.

In the above-described (Electric Field Calculation) and (Magnetic Field Calculation), to satisfy Expression (11) until the time immediately before the electric field and the magnetic field are calculated is conditioned. In this case, if in the initial state (t<0), Expression (11) is established, and Expression (11) is established until the last time, Expression (11) will be established in the next time, and thus, it is found that Expression (11) is established at every time, and that the EAS analysis can be continuously performed by the above-described procedure.

In the EAS analysis processing described in the foregoing, the conversion surface inside electric field variable calculation in the respective conversion surfaces r, and the outside electric field variable calculation in all the conversion surfaces, the conversion surface inside magnetic field variable calculation in the respective conversion surfaces r, and the outside magnetic field variable calculation in all the conversion surfaces are performed separately. However, since the respective electric field variables and magnetic field variables are arranged so as not to overlap, the calculation can also be advanced collectively. In this case, at the time of the electric field calculation processing, the normal FDTD electric field calculation processing is first performed for the entire analysis domain, and then, for each of the electric field variables on the conversion surface, correction calculation of the electric field on the conversion surface is performed. An electric field variable value E' after the correction is calculated by the following expressions (15), (16), (17).

$$E_x^m(i,j,k) = E_x^n(i,j,k) - \frac{\frac{\Delta t}{\varepsilon}}{1+\frac{\sigma \Delta t}{2\varepsilon}} \left\{ \frac{H_z^{n-\frac{1}{2}}(i,j,k) - H_z^{n-\frac{1}{2}}(i,j-1,k)}{\Delta y} - \frac{H_y^{n-\frac{1}{2}}(i,j,k) - H_y^{n-\frac{1}{2}}(i,j,k-1)}{\Delta z} \right\} \quad (15)$$

-continued $$E'^n_y(i,j,k) = E^n_y(i,j,k) - \frac{\frac{\Delta t}{\varepsilon}}{1+\frac{\sigma \Delta t}{2\varepsilon}} \left\{ \frac{H_x^{n-\frac{1}{2}}(i,j,k) - H_x^{n-\frac{1}{2}}(i,j,k-1)}{\Delta z} - \frac{H_z^{n-\frac{1}{2}}(i,j,k) - H_z^{n-\frac{1}{2}}(i-1,j,k)}{\Delta x} \right\} \quad (16)$$

$$E'^n_z(i,j,k) = E^n_z(i,j,k) - \frac{\frac{\Delta t}{\varepsilon}}{1+\frac{\sigma \Delta t}{2\varepsilon}} \left\{ \frac{H_y^{n-\frac{1}{2}}(i,j,k) - H_y^{n-\frac{1}{2}}(i-1,j,k)}{\Delta x} - \frac{H_x^{n-\frac{1}{2}}(i,j,k) - H_x^{n-\frac{1}{2}}(i,j-1,k)}{\Delta y} \right\} \quad (17)$$

$H''^{n-1/2}_x(i,j,k)$, $H''^{n-1/2}_y(i,j,k)$, and $H''^{n-1/2}_z(i,j,k)$ in Expressions (15), (16), (17) are each a magnetic field variable value $H(u0(r))$ on the assumption that there is no structural body, wave source and the like in the conversion surface outside, if $(i,j,k)$ is an index representing a magnetic field variable close to the conversion surface in the conversion surface r, and otherwise, they are zero.

Moreover, at the time of the magnetic field calculation processing, for the entire analysis domain, the normal magnetic field calculation processing is first performed, and then, for magnetic field variables that are outside magnetic field variables of all the conversion surfaces and close magnetic field variables of any one of the conversion surfaces, the correction calculation of the magnetic field close to the conversion surface is performed. A magnetic field variable value H' after the correction is calculated by the following expressions (18), (19), (20).

$$H'^{n+\frac{1}{2}}_x(i,j,k) = H^{n+\frac{1}{2}}_x(i,j,k) - \frac{\Delta t}{\mu} \sum_r \left\{ \frac{E^n_z(i,j+1,k) - E^n_z(i,j,k)}{\Delta y} - \frac{E^n_y(i,j,k+1) - E^n_y(i,j,k)}{\Delta z} \right\} \quad (18)$$

$$H'^{n+\frac{1}{2}}_y(i,j,k) = H^{n+\frac{1}{2}}_y(i,j,k) - \frac{\Delta t}{\mu} \sum_r \left\{ \frac{E^n_x(i,j,k+1) - E^n_x(i,j,k)}{\Delta z} - \frac{E^n_z(i+1,j,k) - E^n_z(i,j,k)}{\Delta x} \right\} \quad (19)$$

$$H'^{n+\frac{1}{2}}_z(i,j,k) = H^{n+\frac{1}{2}}_z(i,j,k) - \frac{\Delta t}{\mu} \sum_r \left\{ \frac{E^n_y(i+1,j,k) - E^n_y(i,j,k)}{\Delta x} - \frac{E^n_x(i,j+1,k) - E^n_x(i,j,k)}{\Delta y} \right\} \quad (20)$$

$E''^n_x(i,j,k)$, $E''^n_y(i,j,k)$, and $E''^n_z(i,j,k)$ in Expressions (18), (19), (20) are electric field variable value $E(u0(r))$ on the assumption that there is no structural body, wave source and the like in the conversion surface outside, if $(i,j,k)$ is an index representing a magnetic field variable close to the conversion surface in the conversion surface r, and otherwise, they are zero.

Figure 29:
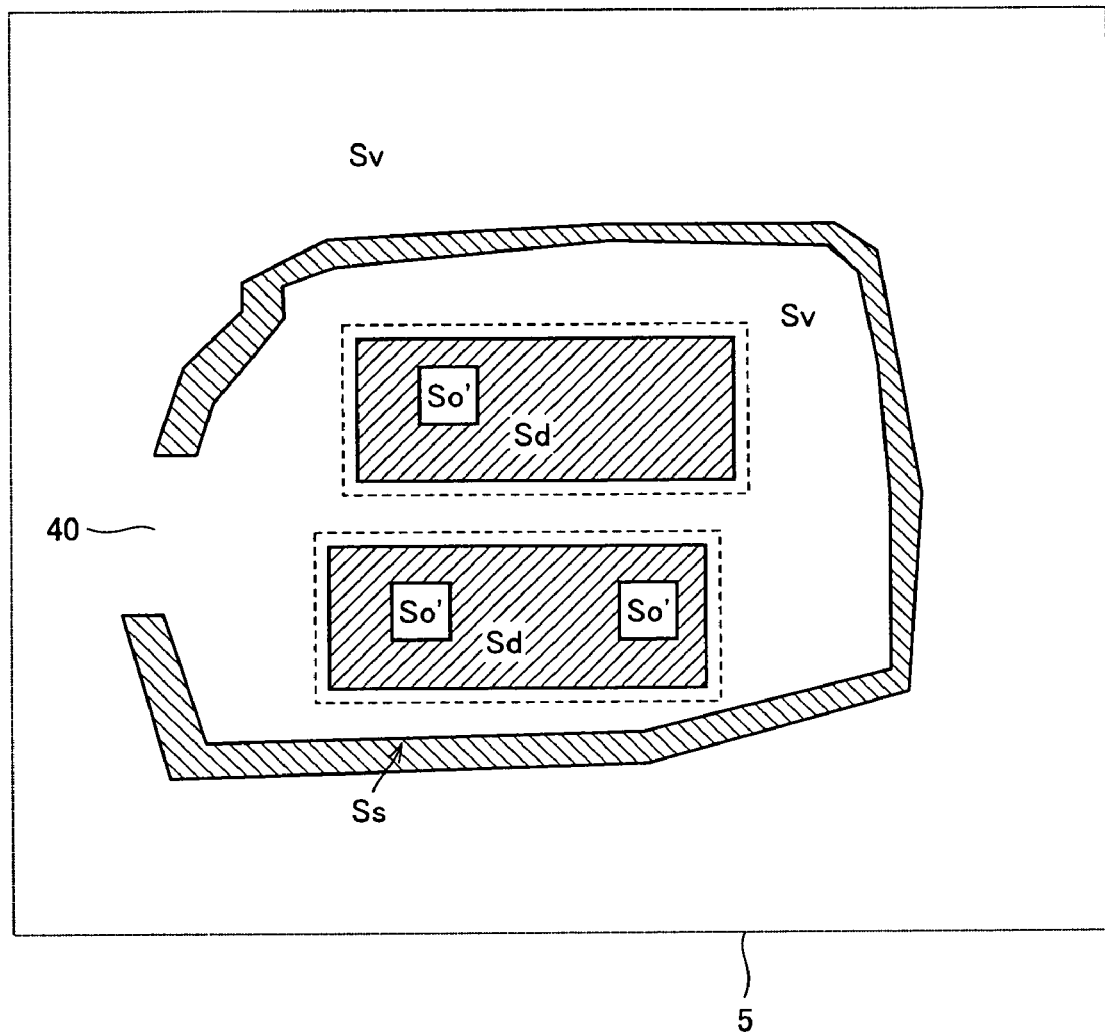
FIG. 29 is a diagram showing an EAS analysis model different from that of FIG. 20.

FIG. 29 is a diagram showing an EAS analysis model different from that of FIG. 20.

As shown in FIG. 29, an opening portion 40 is provided in rough structural body Ss on the EAS shown in FIG. 20. Even in this case, according to the above-described method, the result of the IAS analysis and the result of the additional analysis for improving precision that are performed in the analysis space in FIG. 3 can be utilized. Therefore, the IAS analysis and the additional analysis for improving precision do not need to be performed again.

In the above description, in the case where the additional analysis for improving precision is not performed, since in the EAS analysis, the relationships of Expressions (3) to (8) are not established between $E^n(u0(r))$ and $H^{n-1/2}(u0(r))$ in a strict sense, an error is caused in the EAS calculation in the present invention based on the premise that Expressions (3) to (8) are established in a strict sense. Consequently, in the additional analysis for improving precision, with the electric field value on the conversion surface calculated in the IAS analysis used as a radiation source, an analysis by the FDTD-MAS method in the same cell size as that of EAS without arranging no structure outside is performed, by which the value of $H^{n-1/2}(u0(r))$ having the relationships of Expressions (3) to (8) established in a strict sense with respect to the electric field value on the conversion surface $E^n(u0(r))$ calculated in the IAS analysis is calculated, thereby enabling high precision analysis.

(3. Implementation on Computer 100 of Electromagnetic Field Analysis according to the Embodiment)

First Embodiment

The electromagnetic field analysis method of the above-described invention can be implemented as computer software by the following procedures. First, for the case where the additional analysis for improving precision is not performed, the procedures will be discussed as a first embodiment.

Figure 30:
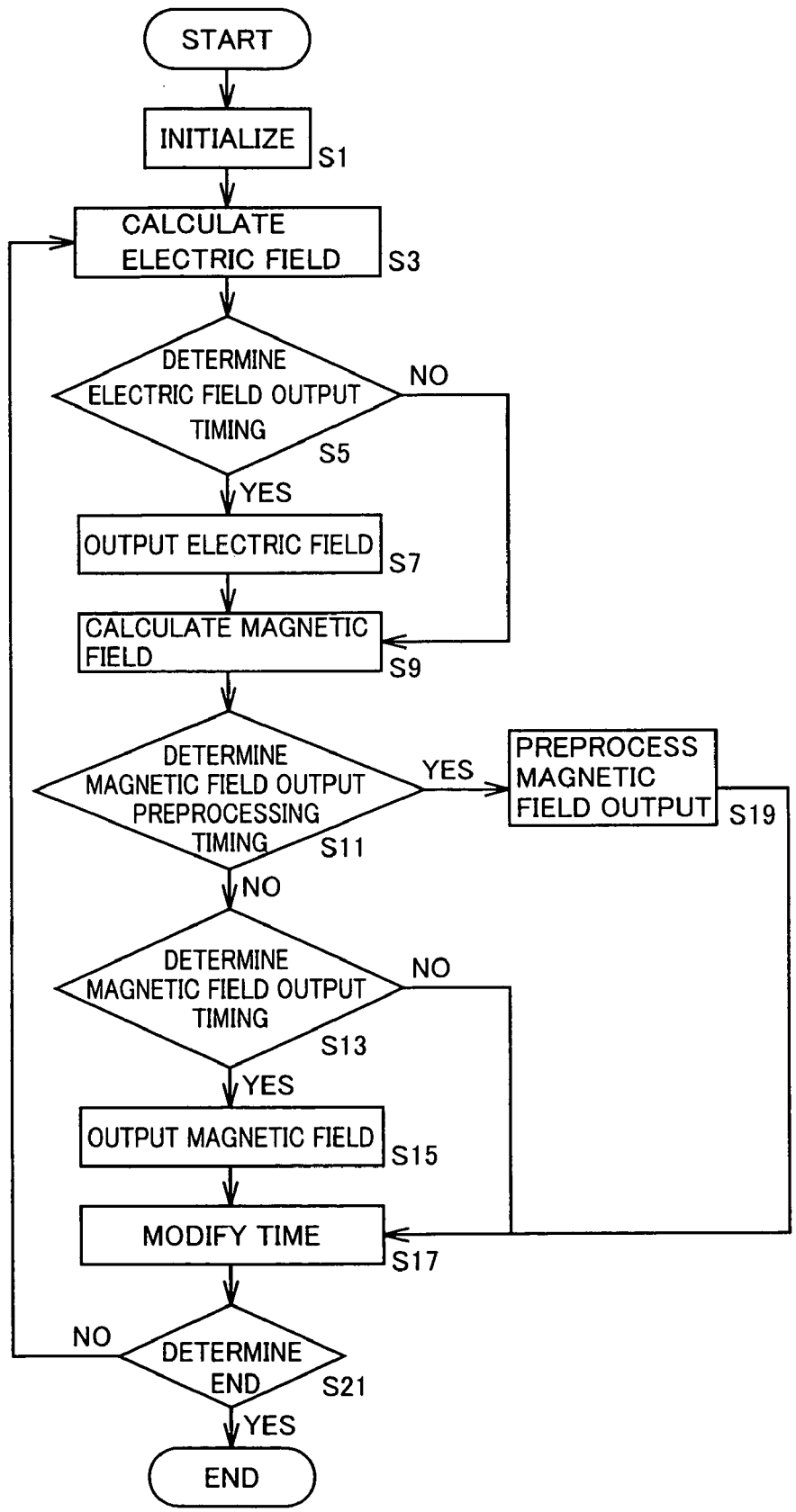
FIG. 30 is a flowchart specifically showing a flow of IAS analysis processing in a first embodiment.

FIG. 30 is a flowchart specifically showing a flow of the IAS analysis processing.

Referring to FIG. 30, the flow of the IAS analysis processing will be described. CPU 120 performs the following processing in accordance with program 131 for performing the electromagnetic field analysis.

In step S1, CPU 120 reads analysis condition 130 from hard disk 124, and sets coefficient Ra indicating a cell size ratio between the IAS cell and the EAS cell. Based on the analysis condition regarding the IAS analysis, initialization processing described in the following 1 to 3 is performed.

1. Coefficient Initialization of Electric Field and Magnetic Field Variables in FDTD Method The coefficients for modifying calculation of the electric field and magnetic field variables in the FDTD method as indicated by Expressions (1), (2) are calculated from the medium information, and cell size, time step width and the like in an existing position of each electric field and magnetic field variable, which have been written in analysis condition 130.

2. Initial Value Setting of Electric Field and Magnetic Field Variables

Each electric field and magnetic field variable is initialized to zero.

3. Initialization of Variable n Representing Time on a Time-Step Basis

'n' is initialized to initial value zero.

Subsequently, in step S3, CPU 120 performs the electric field calculation at time $n\Delta t$ in the FDTD method for each electric field variable.

In step S5, CPU 120 determines the timing of electric field output. More specifically, whether or not variable n is an integral multiple of coefficient Ra. For example, in the case of the implementation in C language, a determination expression "n % Ra==0" (a remainder when variable n is divided by coefficient Ra is zero) is used. If it is determined that this determination expression is true (in step S5, YES), CPU 120 performs the processing in step S7. On the other hand, if it is determined that this determination expression is false (in step S5, NO), CPU 120 performs the processing in step S9.

In step S7, CPU 120 finds an electric field variable value in a position corresponding to an electric field variable on the conversion surface by the calculation to write the same in IAS electric field file 132. At this time, if coefficient Ra is an even number, an average of two close electric field values of the electric field variables on the conversion surface is written. On the other hand, if coefficient Ra is an odd number, the electric field variable value existing in the same position is written.

Subsequently, in step S9, CPU 120 performs magnetic field calculation processing at time $(n+\frac{1}{2})\Delta t$ in the FDTD method for each magnetic field variable.

In step S11, CPU 120 determines the timing of magnetic field output preprocessing. For example, in the case of the implementation in C language, a determination expression "(Ra %2==0)&&(n % Ra==Ra/2−1)" (a remainder when coefficient Ra is divided by 2 is zero and a remainder when variable n is divided by coefficient Ra is Ra/2−1) is used. If it is determined that this determination expression is true (in step S11, YES), CPU 120 performs the processing in step S19. On the other hand, if it is determined that this determination expression is false (in step S11, NO), CPU 120 performs the processing in step S13.

In step S11, CPU 120 performs the magnetic field output preprocessing. Here, an average value of four close magnetic field values in a position corresponding to a magnetic field variable close the conversion surface at the relevant time is written in hard disk 124 as a magnetic field variable close to the conversion surface at the relevant time. The processing goes to step S17.

In step S13, CPU 12 performs the timing determination of the magnetic field output. For example, in the case of the implementation in C language, a determination expression "n % Ra==Ra/2" (a remainder when variable n is divided by coefficient Ra is Ra/2) is used. If it is determined that this determination expression is true (in step S13, YES), CPU 12 performs the processing in step S15. On the other hand, if it is determined that this determination expression is false (in step S13, NO), CPU 120 performs the processing in step S17.

In step 15, CPU 120 finds a magnetic field variable value in a position corresponding to a magnetic field variable close to the conversion surface by the calculation to write the same in IAS magnetic field file 133. At this time, if coefficient Ra is an even number, an average of four close magnetic field values in the position corresponding to the magnetic field variable close to the conversion surface at the relevant time is derived, and this value and the average value of the four close magnetic field values in the position corresponding to the relevant magnetic field variable, which has been written in hard disk 124 in step S11, are written. On the other hand, if coefficient Ra is an odd number, the magnetic field value corresponding to the magnetic field variable close to the conversion surface is written.

In step S17, CPU 120 adds 1 to variable n to modify the analysis time.

Next, in step S21, CPU 120 performs analysis end determination based on analysis end condition information specified in advance. For example, a number of steps N specified by analysis condition 130 and variable n are compared, and if n>N, the end is determined. If it is determined that the end condition is not satisfied (in step S21, NO), the processing returns to step S3. On the other hand, if it is determined that the end condition is satisfied (in step S21, YES), the processing is ended.

In this manner, the IAS analysis is performed.

Figure 31:
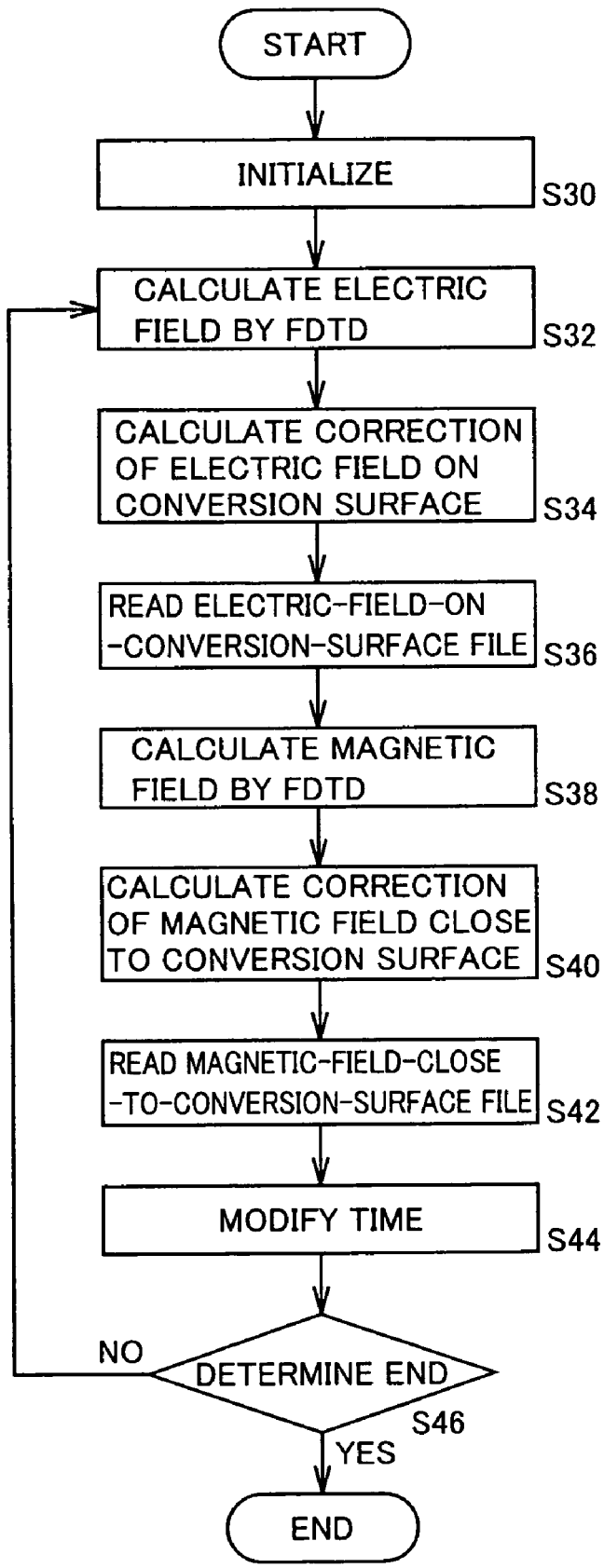
FIG. 31 is a flowchart specifically showing a flow of EAS analysis processing.

FIG. 31 is a flowchart specifically showing a flow of the EAS analysis processing.

Referring to FIG. 31, the flow of the EAS analysis processing will be described. CPU 120 performs the following processing in accordance with program 131 for performing the electromagnetic field analysis.

In step S30, CPU 120 reads analysis condition 130 from hard disk 124, and based on the analysis condition regarding the EAS analysis, initialization processing described in the following 4 to 6 is performed.

4. Coefficient Initialization of Electric Field and Magnetic Field Variables in FDTD Method The coefficients for modifying calculation of the electric field and magnetic field variables in the FDTD method as indicated in Expressions (1), (2) are calculated from the medium information, and cell size, time step width and the like in an existing position of each electric field and magnetic field variable, which have been written in analysis condition 130.

5. Initial Value Setting of Electric Field and Magnetic Field Variables

Each electric field and magnetic field variable is initialized to zero. Moreover, the electric field variable value on the conversion surface and the magnetic field variable value close to the conversion surface in each of the conversion surfaces are initialized to zero.

6. Initialization of Variable n Representing Time on a Time-Step Basis

'n' is initialized to initial value zero.

Subsequently, in step S32, CPU 120 performs the electric field calculation processing at time $n\Delta t$ in the FDTD method for each electric field variable.

In step S34, CPU 120 performs correction calculation of the electric field on the conversion surface for the electric field variables on the conversion surface in each of the conversion surfaces by Expressions (15), (16), (17).

Subsequently, in step S36, CPU 120 initializes all the electric field variables on the conversion surface in each of the conversion surfaces to 0. Next, as described using Expression (10), for the electric field variables on the conversion surface in each of the conversion surfaces, an electric field variable on the conversion surface at the time corresponding to a time t'=t−t0 is read from IAS electric field file 132, and after being multiplied by $\alpha$, is added to the value stored in EAS electric field file 134. The addition result is written in EAS electric field file 134. If t<0, zero is used in place of the value read from the file.

In step S38, CPU 120 performs magnetic field calculation processing at time $(n+\frac{1}{2})\Delta t$ in the FDTD method for each magnetic field variable.

Subsequently, in step S40, CPU 120 performs the correction calculation of the magnetic field close to the conversion surface for magnetic field variables that are outside magnetic field variables of all the conversion surfaces and close magnetic field variables of any one of the conversion surfaces by Expressions (18), (19), (20).

Subsequently, in step S42, CPU 120 initializes all the magnetic field variables close to the conversion surface in each of the conversion surfaces to 0. Next, as described using Expression (10), for the magnetic field variables close to the conversion surface in each of the conversion surfaces, a magnetic field variable close to the conversion surface at the time corresponding to time t'=t−t0 is read from IAS magnetic field file 133, and after being multiplied by α, is added to the value stored in EAS magnetic field file 135. The added result is written in EAS magnetic field file 135. If t <0, zero is used in place of the value read from the file.

In step S44, CPU 120 adds 1 to variable n to modify the analysis time.

Subsequently, in step S46, CPU 120 performs analysis end determination based on the analysis end condition information specified in advance. For example, number of steps N specified by analysis condition 130 and variable n are compared, and if n>N, the end is determined. If it is determined that the end condition is not satisfied (in step S46, NO), the processing returns to step S32. On the other hand, if it is determined that the end condition is satisfied (in step S46, YES), the processing is ended.

In this manner, the EAS analysis is performed.

Figure 32:
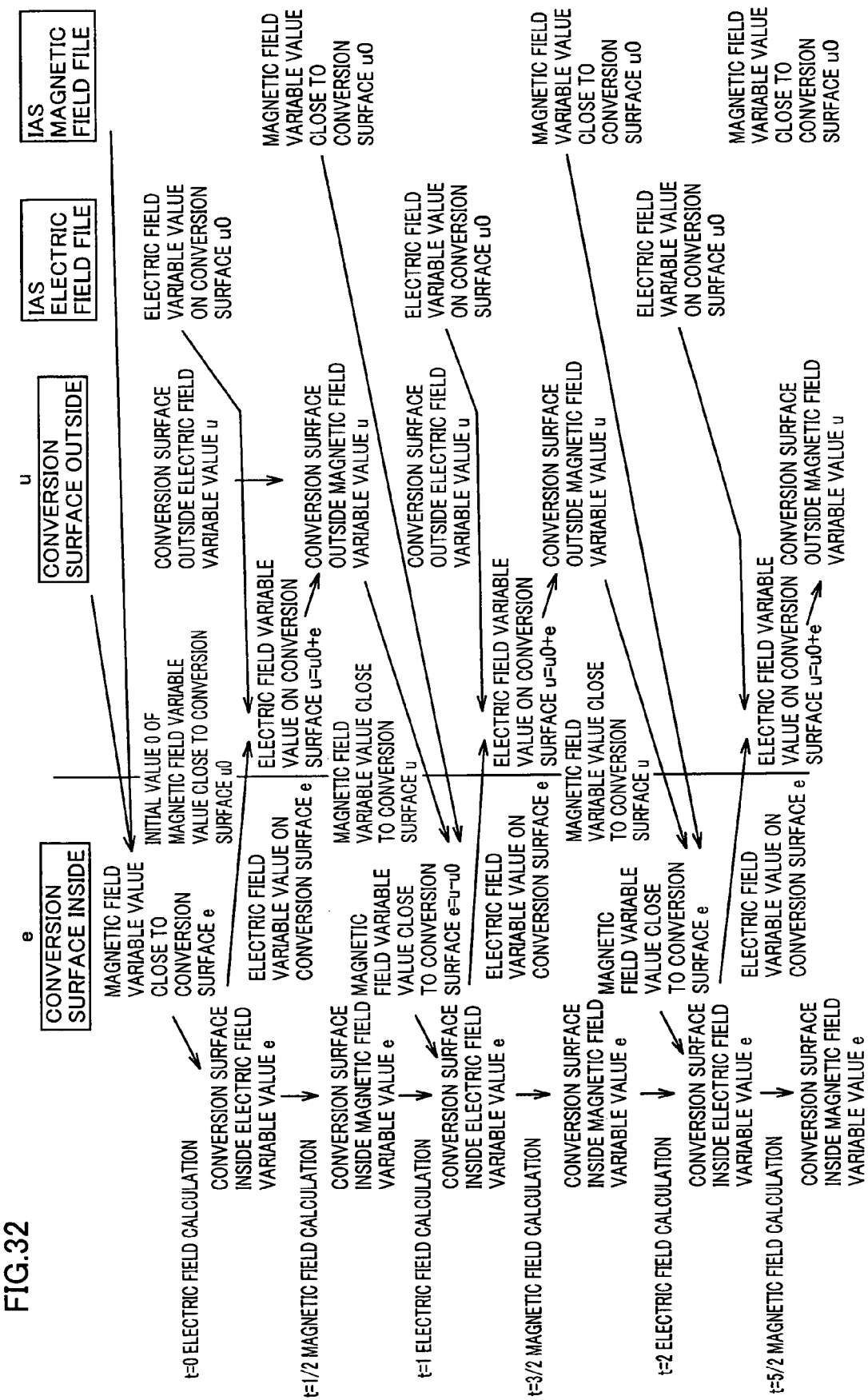
FIG. 32 is a diagram showing one example of the EAS analysis processing in detail.

FIG. 32 is a diagram showing one example of the EAS analysis processing in detail.

As shown in FIG. 32, in the EAS analysis, when the two analyses of the conversion surface outside and the conversion surface inside are performed, the electromagnetic field values on the conversion surface are exchanged at each time to link mutually.

According to the electromagnetic field analysis program according to the above-described present embodiment, the electromagnetic field analysis can be performed efficiently. This allows the analysis to be precisely performed even if an additional structure, wave source, and another IAS domain are placed outside of a closed surface surrounding a portion that includes a fine structure and serves as a radiation source, in the entire analysis domain.

Moreover, according to the electromagnetic field analysis program according to the present embodiment, both the analysis results of the IAS analysis and the EAS analysis are utilized to find the electromagnetic field distribution. This allows the analysis to be efficiently performed without performing any calculation unworthy of utilization.

Moreover, the electromagnetic field analysis program according to the present embodiment, the IAS analysis and the EAS analysis are calculated independently. Thereby, even if the analysis condition (electric characteristics) outside of the conversion surface is changed in the EAS analysis, the result of the IAS analysis can be utilized, which eliminates the need to perform the IAS analysis again.

Second Embodiment

Next, for the case where the additional analysis for improving precision is performed using the additional analysis model for improving precision as described in FIG. 33, the procedures will be discussed as a second embodiment.

Figure 34:
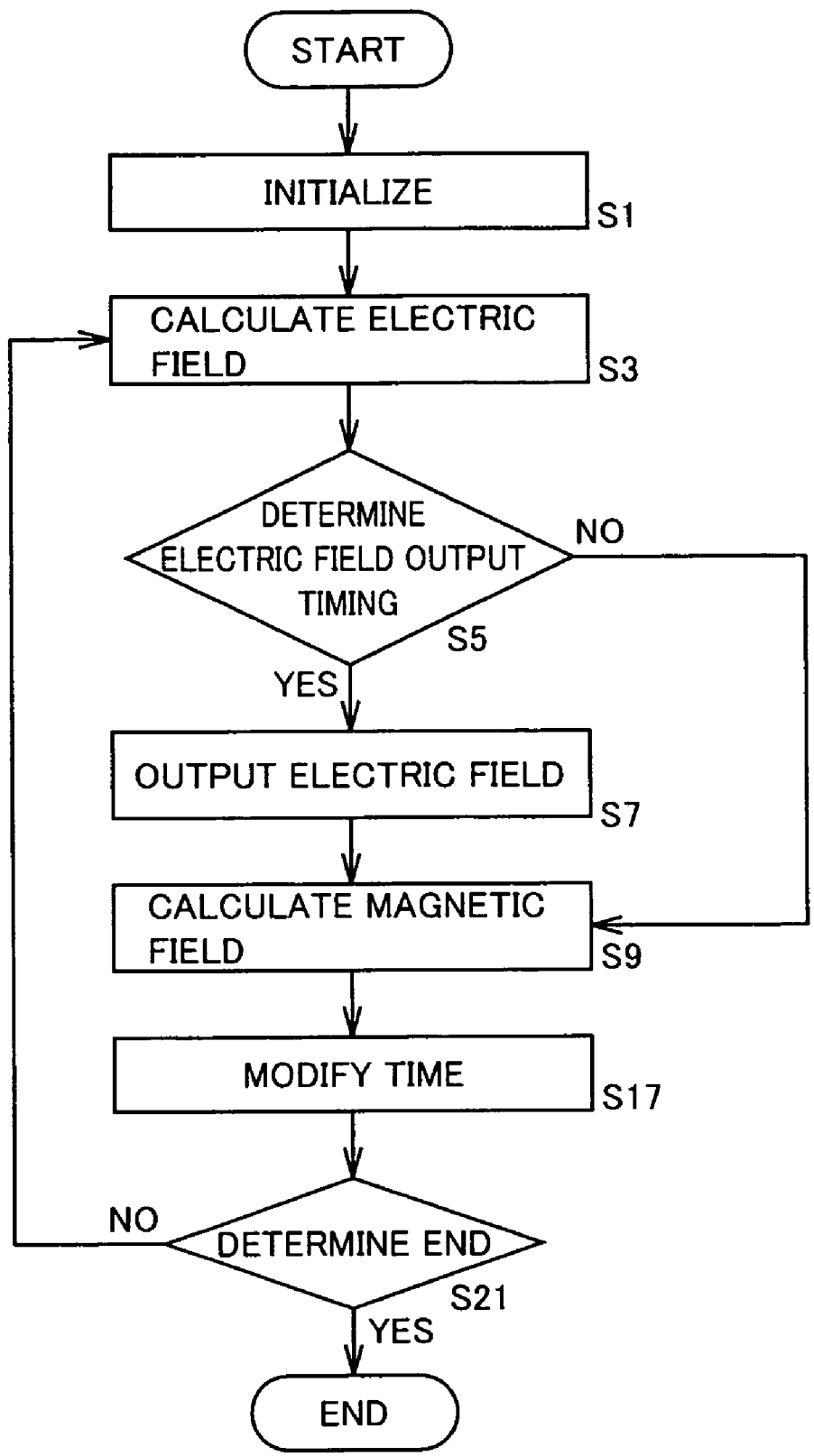
FIG. 34 is a flowchart specifically showing a flow of the IAS analysis processing in a second embodiment.

FIG. 34 is a flowchart specifically showing a flow of the IAS analysis processing.

Referring to FIG. 34, the flow of the IAS analysis processing will be described. CPU 120 performs the following processing in accordance with program 131 for performing the electromagnetic field analysis.

In step S1, CPU 120 reads analysis condition 130 from hard disk 124, and sets coefficient Ra indicating a cell size ratio between the IAS cell and the EAS cell. Based on the analysis condition regarding the IAS analysis, initialization processing described in the following 1 to 3 is performed.

1. Coefficient Initialization of Electric Field and Magnetic Field Variables in FDTD Method The coefficients for modifying calculation of the electric field and magnetic field variables in the FDTD method as indicated by Expressions (1), (2) are calculated from the medium information, and cell size, time step width and the like in an existing position of each electric field and magnetic field variable, which have been written in analysis condition 130.

2. Initial Value Setting of Electric Field and Magnetic Field Variables

Each electric field and magnetic field variable is initialized to zero.

3. Initialization of Variable n Representing Time on a Time-Step Basis

'n' is initialized to initial value zero.

Subsequently, in step S3, CPU 120 performs the electric field calculation at time $n\Delta t$ in the FDTD method for each electric field variable.

In step S5, CPU 120 determines the timing of electric field output. More specifically, whether or not variable n is an integral multiple of coefficient Ra. For example, in the case of the implementation in C language, determination expression "n % Ra==0" (a remainder when variable n is divided by coefficient Ra is zero) is used. If it is determined that this determination expression is true (in step S5, YES), CPU 120 performs the processing in step S7. On the other hand, if it is determined that this determination expression is false (in step S5, NO), CPU 120 performs the processing in step S9.

In step S7, CPU 120 finds an electric field variable value in a position corresponding to an electric field variable on the conversion surface by the calculation to write the same in IAS electric field file 132. At this time, if coefficient Ra is an even number, an average of two close electric field values of the electric field variables on the conversion surface is written. On the other hand, if coefficient Ra is an odd number, the electric field variable value existing in the same position is written.

Subsequently, in step S9, CPU 120 performs magnetic field calculation processing at time $(n+\frac{1}{2})\Delta t$ in the FDTD method for each magnetic field variable.

In step 15, CPU 120 finds a magnetic field variable value in a position corresponding to a magnetic field variable close to the conversion surface by the calculation to write the same in IAS magnetic field file 133. At this time, if coefficient Ra is an even number, an average of four close magnetic field values in the position corresponding to the magnetic field variable close to the conversion surface at the relevant time is derived, and this value and the average value of the four close magnetic field values in the position corresponding to the relevant magnetic field variable, which has been written in hard disk 124 in step S11, are written. On the other hand, if coefficient Ra is an odd number, the magnetic field value corresponding to the magnetic field variable close to the conversion surface is written.

In step S17, CPU 120 adds 1 to variable n to modify the analysis time.

Next, in step S21, CPU 120 performs analysis end determination based on the analysis end condition information specified in advance. For example, number of steps N specified by analysis condition 130 and variable n are compared, and if n>N, the end is determined. If it is determined that the end condition is not satisfied (in step S21, NO), the processing returns to step S3. On the other hand, if it is determined that the end condition is satisfied (in step S21, YES), the processing is ended.

In this manner, the IAS analysis is performed.

Figure 35:
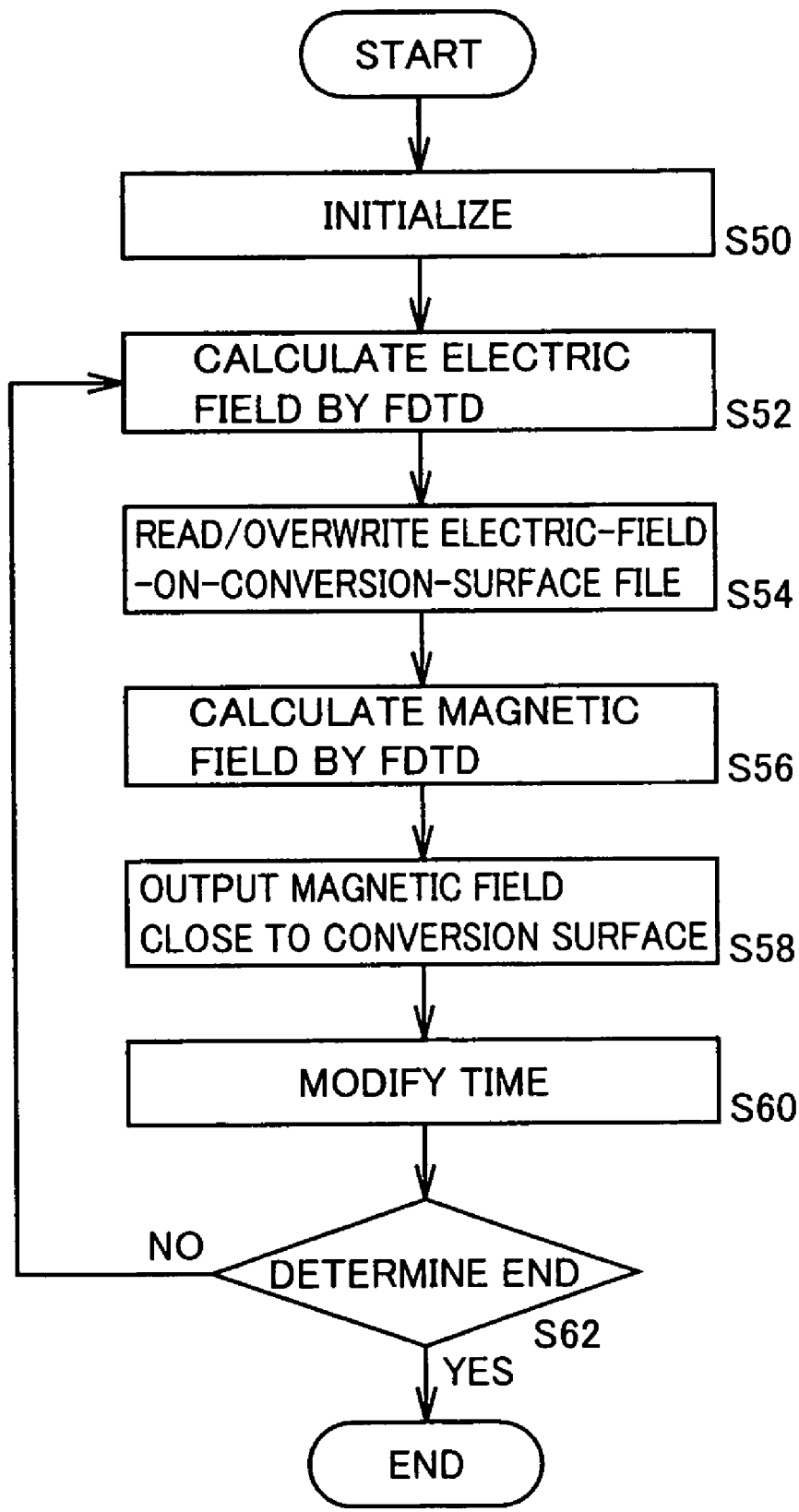
FIG. 35 is a flowchart specifically showing a flow of the additional analysis processing for improving precision.

FIG. 35 is a flowchart specifically showing a flow of the additional analysis processing for improving precision.

Referring to FIG. 35, the flow of the additional analysis processing for improving precision will be described. CPU 120 performs the following processing in accordance with program 131 for performing the electromagnetic field analysis.

In step S50, CPU 120 reads analysis condition 130 from hard disk 124, and based on the analysis condition regarding the additional analysis for improving precision, initialization processing described in the following 4 to 6 is performed.

4. Coefficient Initialization of Electric Field and Magnetic Field Variables in FDTD Method The coefficients for modifying calculation of the electric field and magnetic field variables in the FDTD method as indicated in Expressions (1), (2) are calculated from the medium information, and cell size, time step width and the like in an existing position of each electric field and magnetic field variable, which have been written in analysis condition 130.

5. Initial Value Setting of Electric Field and Magnetic Field Variables

Each electric field and magnetic field variable is initialized to zero.

6. Initialization of Variable n Representing Time on a Time-Step Basis

'n' is initialized to initial value zero.

Next, in step S52, CPU 120 performs the electric field calculation processing at time nΔt in the FDTD method for each electric field variable.

Subsequently, in step S54, CPU 120 reads the electric field variable on the conversion surface from IAS electric field file 132 to overwrite the electric field variable in the corresponding position with the value. If t<0, zero is used in place of the value read from the file.

In step S56, CPU 120 performs magnetic field calculation processing at time (n+n+½)Δt in the FDTD method for each magnetic field variable.

Next, in step S58, the magnetic field variable, which is the magnetic field variable close to the conversion, is written in IAS magnetic field file 133.

In step S60, CPU 120 adds 1 to variable n to modify the analysis time.

Subsequently, in step S62, CPU 120 performs analysis end determination based on the analysis end condition information specified in advance. For example, number of steps N specified by analysis condition 130 and variable n are compared, and if n>N, the end is determined. If it is determined that the end condition is not satisfied (in step S62, NO), the processing returns to step S52. On the other hand, if it is determined that the end condition is satisfied (in step S62, YES), the processing is ended.

As described above, the additional analysis for improving precision is performed.

Since the EAS analysis processing is the same as that of the first embodiment, its description is not given.

According to the electromagnetic field analysis program according to the above-described present embodiment, the electromagnetic field analysis can be performed efficiently. This allows the analysis to be precisely performed even if an additional structure, wave source, and another IAS domain are placed outside of a closed surface surrounding a portion that includes a fine structure and serves as a radiation source, in the entire analysis domain.

Moreover, according to the electromagnetic field analysis program according to the present embodiment, the analysis results of the IAS analysis, the additional analysis for improving precision, and the EAS analysis are utilized to find the electromagnetic field distribution. This allows the analysis to be efficiently performed without performing any calculation unworthy of utilization.

Moreover, the electromagnetic field analysis program according to the present embodiment, the radiation calculation from IAS by the IAS analysis and the additional analysis for improving precision, and the EAS analysis are calculated independently. Thereby, even if the analysis condition (electric characteristics) outside of the conversion surface is changed in the EAS analysis, the results of the IAS analysis and the additional analysis for improving precision can be utilized, which eliminates the need to perform the IAS analysis, and the additional analysis for improving precision again.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A non-transitory computer-readable medium having instructions stored thereon, such that when the instructions are read and executed by a processor, the processor is configured to perform an electromagnetic field analysis by performing the steps of:

a first electromagnetic field analysis step of dividing a first analysis space surrounded by a closed surface and including a first wave source of an electromagnetic field in a first cell size to determine a first electromagnetic field distribution inside of said closed surface, on said closed surface and close to the outside of said closed surface; and a second electromagnetic field analysis step of dividing a second analysis space including said first analysis space in a second cell size larger than said first cell size to determine a second electromagnetic field distribution inside of said closed surface, and on said closed surface, and a third electromagnetic field distribution outside of said closed surface, said second electromagnetic field analysis step including a step of determining the second electromagnetic field distribution, where a differential electromagnetic field distribution between said third electromagnetic field distribution and said first electromagnetic field distribution close to the outside of said closed surface is a second wave source, for inside of said closed surface, and on the closed surface, and said second electromagnetic field analysis step including a step of determining the third electromagnetic field distribution, where an electromagnetic field distribution obtained by synthesizing said first electromagnetic field distribution and said second electromagnetic field distribution on said closed surface is a third wave source, for outside of said closed surface.

2. The non-transitory computer-readable medium according to claim 1, wherein said first electromagnetic field analysis step includes a step of performing the electromagnetic field analysis on the assumption that there is no structural body outside of said closed surface.

3. The non-transitory computer-readable medium according to claim 2, wherein
said second electromagnetic field analysis step includes a step of performing the electromagnetic field analysis on the assumption that there is a structural body outside of said closed surface.

4. A non-transitory computer-readable medium having instructions stored thereon, such that when the instructions are read and executed by a processor, the processor is configured to perform an electromagnetic field analysis by performing the steps of:
a first electromagnetic field analysis step of dividing a first analysis space surrounded by a closed surface and including a first wave source of an electromagnetic field in a first cell size to determine a first electromagnetic field distribution inside of said closed surface, and on said closed surface;
a second electromagnetic field analysis step of dividing a second analysis space including said first analysis space in a second cell size larger than said first cell size to determine a second electromagnetic field distribution close to the outside of said closed surface; and
a third electromagnetic field analysis step of dividing a third analysis space including said first analysis space in said second cell size to determine a third electromagnetic field distribution inside of said closed surface, and on said closed surface, and a fourth electromagnetic field distribution outside of said closed surface,
said third electromagnetic field analysis step including a step of determining the third electromagnetic field distribution, where a differential electromagnetic field distribution between said fourth electromagnetic field distribution and said second electromagnetic field distribution close to the outside of said closed surface is a second wave source, for inside of said closed surface, and on the closed surface, and
said third electromagnetic field analysis step including a step of determining the fourth electromagnetic field distribution, where an electromagnetic field distribution obtained by synthesizing said first electromagnetic field distribution and said third electromagnetic field distribution on said closed surface is a third wave source, for outside of said closed surface.

5. The non-transitory computer-readable medium according to claim 4, wherein
said first electromagnetic field analysis step includes a step of performing the electromagnetic field analysis on the assumption that there is no structural body outside of said closed surface.

6. The non-transitory computer-readable medium according to claim 5, wherein
said second electromagnetic field analysis step includes a step of performing the electromagnetic field analysis on the assumption that there is no structural body outside of said closed surface.

7. The non-transitory computer-readable medium according to claim 6, wherein
said third electromagnetic field analysis step includes a step of performing the electromagnetic field analysis on the assumption that there is a structural body outside of said closed surface.

8. A method for performing an electromagnetic field analysis, wherein
the method comprising:
a first electromagnetic field analysis step of dividing a first analysis space surrounded by a closed surface and including a first wave source of an electromagnetic field in a first cell size to determine a first electromagnetic field distribution inside of said closed surface, on said closed surface and close to the outside of said closed surface; and
a second electromagnetic field analysis step of dividing a second analysis space including said first analysis space in a second cell size larger than said first cell size to determine a second electromagnetic field distribution inside of said closed surface, and on said closed surface, and a third electromagnetic field distribution outside of said closed surface, wherein a processor performs the dividing in the second electromagnetic field analysis step, and
said second electromagnetic field analysis step including a step of determining the second electromagnetic field distribution, where a differential electromagnetic field distribution between said third electromagnetic field distribution and said first electromagnetic field distribution close to the outside of said closed surface is a second wave source, for inside of said closed surface, and on the closed surface, and
said second electromagnetic field analysis step including a step of determining the third electromagnetic field distribution, where an electromagnetic field distribution obtained by synthesizing said first electromagnetic field distribution and said second electromagnetic field distribution on said closed surface is a third wave source, for outside of said closed surface.

9. A method for performing an electromagnetic field analysis, wherein
the method comprising:
a first electromagnetic field analysis step of dividing a first analysis space surrounded by a closed surface and including a first wave source of an electromagnetic field in a first cell size to determine a first electromagnetic field distribution inside of said closed surface, and on said closed surface;
a second electromagnetic field analysis step of dividing a second analysis space including said first analysis space in a second cell size larger than said first cell size to determine a second electromagnetic field distribution close to the outside of said closed surface; and
a third electromagnetic field analysis step of dividing a third analysis space including said first analysis space in said second cell size to determine a third electromagnetic field distribution inside of said closed surface, and on said closed surface, and a fourth electromagnetic field distribution outside of said closed surface, wherein a processor performs the dividing in the third electromagnetic field analysis step, and
said third electromagnetic field analysis step including a step of determining the third electromagnetic field distribution, where a differential electromagnetic field distribution between said fourth electromagnetic field distribution and said second electromagnetic field distribution close to the outside of said closed surface is a second wave source, for said inside of closed surface, and on the closed surface, and
said third electromagnetic field analysis step including a step of determining the fourth electromagnetic field distribution, where an electromagnetic field distribution obtained by synthesizing said first electromagnetic field distribution and said third electromagnetic field distribution on said closed surface is a third wave source, for outside of said closed surface.

* * * * *